(12) United States Patent
Casey et al.

(10) Patent No.: US 11,013,093 B2
(45) Date of Patent: *May 18, 2021

(54) CONTROLLING LIGHTING LOADS TO ACHIEVE A DESIRED LIGHTING PATTERN

(71) Applicant: Lutron Technology Company LLC, Coopersburg, PA (US)

(72) Inventors: Craig Alan Casey, Coopersburg, PA (US); Brent Protzman, Easton, PA (US); James P Steiner, Royersford, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/808,005

(22) Filed: Mar. 3, 2020

(65) Prior Publication Data

US 2020/0205275 A1    Jun. 25, 2020

Related U.S. Application Data

(63) Continuation of application No. 16/371,242, filed on Apr. 1, 2019, now Pat. No. 10,616,979, which is a
(Continued)

(51) Int. Cl.
*H05B 47/19* (2020.01)
*G06K 9/20* (2006.01)
(Continued)

(52) U.S. Cl.
CPC .............. *H05B 47/19* (2020.01); *G01V 8/20* (2013.01); *G05B 15/02* (2013.01);
(Continued)

(58) Field of Classification Search
CPC ...... H05B 47/19; H05B 47/105; H05B 45/10; H05B 47/11; H05B 45/20; G05B 15/02;
(Continued)

(56) References Cited

U.S. PATENT DOCUMENTS 5,248,919 A    9/1993  Hanna et al.
7,391,297 B2   6/2008  Cash et al.
(Continued)

FOREIGN PATENT DOCUMENTS

CN   104869301   8/2015
CN   105007674   10/2015
(Continued)

*Primary Examiner* — Don P Le
(74) *Attorney, Agent, or Firm* — Flaster Greenberg, P.C.

(57) ABSTRACT

A visible light sensor may be configured to sense environmental characteristics of a space using an image of the space. The visible light sensor may be controlled in one or more modes, including a daylight glare sensor mode, a daylighting sensor mode, a color sensor mode, and/or an occupancy/vacancy sensor mode. In the daylight glare sensor mode, the visible light sensor may be configured to decrease or eliminate glare within a space. In the daylighting sensor mode and the color sensor mode, the visible light sensor may be configured to provide a preferred amount of light and color temperature, respectively, within the space. In the occupancy/vacancy sensor mode, the visible light sensor may be configured to detect an occupancy/vacancy condition within the space and adjust one or more control devices according to the occupation or vacancy of the space. The visible light sensor may be configured to protect the privacy of users within the space via software, a removable module, and/or a special sensor.

20 Claims, 33 Drawing Sheets

Related U.S. Application Data continuation of application No. 15/838,305, filed on Dec. 11, 2017, now Pat. No. 10,278,268.

(60) Provisional application No. 62/432,477, filed on Dec. 9, 2016.

(51) Int. Cl.

| | | |
|---|---|---|
| *H05B 45/10* | (2020.01) | |
| *H05B 45/20* | (2020.01) | |
| *H05B 47/11* | (2020.01) | |
| *H05B 47/105* | (2020.01) | |
| *G06T 7/11* | (2017.01) | |
| *G06T 7/246* | (2017.01) | |
| *G01V 8/20* | (2006.01) | |
| *G06T 5/20* | (2006.01) | |
| *G06T 5/50* | (2006.01) | |
| *H04N 1/40* | (2006.01) | |
| *G05B 15/02* | (2006.01) | |
| *G06K 9/00* | (2006.01) | |
| *H04N 5/232* | (2006.01) | |
| *H04N 7/18* | (2006.01) | |
| *F24F 120/10* | (2018.01) | |
| *F24F 130/30* | (2018.01) | |
| *F24F 11/88* | (2018.01) | |
| *F24F 11/56* | (2018.01) | |
| *F24F 110/10* | (2018.01) | |

(52) U.S. Cl.
CPC ........... *G06K 9/00771* (2013.01); *G06K 9/20* (2013.01); *G06K 9/2027* (2013.01); *G06K 9/2081* (2013.01); *G06T 5/20* (2013.01); *G06T 5/50* (2013.01); *G06T 7/11* (2017.01); *G06T 7/246* (2017.01); *H04N 1/40012* (2013.01); *H04N 5/23206* (2013.01); *H04N 5/23216* (2013.01); *H04N 5/23245* (2013.01); *H05B 45/10* (2020.01); *H05B 45/20* (2020.01); *H05B 47/105* (2020.01); *H05B 47/11* (2020.01); *F24F 11/56* (2018.01); *F24F 11/88* (2018.01); *F24F 2110/10* (2018.01); *F24F 2120/10* (2018.01); *F24F 2130/30* (2018.01); *G06T 2207/10004* (2013.01); *G06T 2207/10016* (2013.01); *G06T 2207/10024* (2013.01); *G06T 2207/10048* (2013.01); *G06T 2207/20224* (2013.01); *G06T 2207/30196* (2013.01); *G06T 2207/30232* (2013.01); *H04N 7/185* (2013.01); *H04N 2201/0084* (2013.01)

(58) Field of Classification Search
CPC ............. G06K 9/2081; G06K 9/00771; G06K 9/2027; G06K 9/20; H04N 5/23206; H04N 5/23245; H04N 5/23216; H04N 1/40012; H04N 7/185; H04N 2201/0084; G01V 8/20; G06T 7/246; G06T 5/50; G06T 7/11; G06T 5/20; G06T 2207/10016; G06T 2207/10004; G06T 2207/10024; G06T 2207/30196; G06T 2207/10048; G06T 2207/20224; G06T 2207/30232; F24F 2120/10; F24F 2130/30; F24F 11/56; F24F 11/88; F24F 2110/10
USPC ...................................................... 315/152
See application file for complete search history.

(56) References Cited

U.S. PATENT DOCUMENTS

| | | |
|---|---|---|
| 7,643,908 B2 | 1/2010 | Quirino et al. |
| 7,781,713 B2 | 8/2010 | Papamichael et al. |
| 7,940,167 B2 | 5/2011 | Steiner et al. |
| 8,009,042 B2 | 8/2011 | Steiner et al. |
| 8,184,004 B2 | 5/2012 | Roosli |
| 8,199,010 B2 | 6/2012 | Sloan et al. |
| 8,228,184 B2 | 7/2012 | Blakeley et al. |
| 8,288,981 B2 | 10/2012 | Zaharchuk et al. |
| 8,410,706 B2 | 4/2013 | Steiner et al. |
| 8,451,116 B2 | 5/2013 | Steiner et al. |
| 8,610,570 B2 | 12/2013 | Roosli |
| 8,760,293 B2 | 6/2014 | Steiner |
| 8,878,439 B2 | 11/2014 | Noguchi et al. |
| 8,950,461 B2 | 2/2015 | Adams et al. |
| 8,965,107 B1 | 2/2015 | Schpok et al. |
| 9,049,756 B2 | 6/2015 | Klusmann et al. |
| 9,064,394 B1 | 6/2015 | Trundle |
| 9,084,310 B2 | 7/2015 | Bedell et al. |
| 9,148,937 B2 | 9/2015 | Steiner et al. |
| 9,232,610 B2 | 1/2016 | Gritti |
| 9,277,629 B2 | 3/2016 | Steiner et al. |
| 9,295,112 B2 | 3/2016 | Knapp |
| 9,425,978 B2 | 8/2016 | Frei et al. |
| 9,536,152 B2 | 1/2017 | Skans et al. |
| 9,536,154 B2 | 1/2017 | Skans et al. |
| 9,746,371 B1 | 8/2017 | Kumar |
| 9,756,710 B2 | 9/2017 | Ghanoun et al. |
| 9,826,598 B2* | 11/2017 | Roberts .................... F21V 5/04 |
| 9,878,447 B2 | 1/2018 | Thibodeau et al. |
| 2001/0015409 A1 | 8/2001 | Mahler et al. |
| 2004/0160199 A1* | 8/2004 | Morgan .................. F21S 4/20 |
| | | 315/312 |
| 2005/0111700 A1 | 5/2005 | O'Boyle et al. |
| 2007/0132846 A1 | 6/2007 | Broad et al. |
| 2008/0092075 A1 | 4/2008 | Jacob et al. |
| 2009/0206983 A1 | 8/2009 | Knode et al. |
| 2011/0071675 A1 | 3/2011 | Wells et al. |
| 2012/0153840 A1 | 6/2012 | Dahlen et al. |
| 2012/0313588 A1 | 12/2012 | Carberry et al. |
| 2012/0319596 A1 | 12/2012 | Nanahara et al. |
| 2013/0026947 A1 | 1/2013 | Economy et al. |
| 2013/0030589 A1 | 1/2013 | Pessina et al. |
| 2013/0088154 A1 | 4/2013 | Van et al. |
| 2014/0015417 A1 | 1/2014 | Iwai et al. |
| 2014/0042913 A1 | 2/2014 | Yang et al. |
| 2014/0071677 A1 | 3/2014 | Pickard et al. |
| 2014/0132475 A1 | 5/2014 | Bhutani et al. |
| 2014/0156079 A1 | 6/2014 | Courtney et al. |
| 2014/0180486 A1 | 6/2014 | Newman, Jr. et al. |
| 2014/0191665 A1 | 7/2014 | Gommans et al. |
| 2014/0265568 A1 | 9/2014 | Crafts et al. |
| 2014/0265863 A1 | 9/2014 | Gajurel et al. |
| 2014/0267008 A1 | 9/2014 | Jain et al. |
| 2014/0305602 A1 | 10/2014 | Kirby et al. |
| 2014/0312777 A1 | 10/2014 | Shearer et al. |
| 2015/0015775 A1 | 1/2015 | Nagata et al. |
| 2015/0076992 A1 | 3/2015 | Walma |
| 2015/0222861 A1 | 8/2015 | Fujii et al. |
| 2015/0279051 A1 | 10/2015 | Kovesi et al. |
| 2015/0368967 A1 | 12/2015 | Lundy et al. |
| 2016/0027262 A1 | 1/2016 | Skotty et al. |
| 2016/0047164 A1 | 2/2016 | Lundy et al. |
| 2016/0054023 A1 | 2/2016 | Baker et al. |
| 2016/0056629 A1 | 2/2016 | Baker et al. |
| 2016/0120009 A1* | 4/2016 | Aliakseyeu ......... G06F 3/04842 |
| | | 315/131 |
| 2016/0150617 A1 | 5/2016 | Montagne |
| 2016/0191864 A1 | 6/2016 | Siminoff et al. |
| 2016/0224036 A1 | 8/2016 | Baker et al. |
| 2016/0249439 A1 | 8/2016 | Recker et al. |
| 2016/0278188 A1 | 9/2016 | Karc et al. |
| 2016/0353549 A1 | 12/2016 | Walma, Jr. |
| 2016/0374176 A1* | 12/2016 | Van Der Poel ........ H05B 47/11 |
| 2017/0038787 A1 | 2/2017 | Baker et al. |
| 2017/0048950 A1* | 2/2017 | Deese .................. H05B 47/175 |

(56) References Cited

U.S. PATENT DOCUMENTS

| | | |
|---|---|---|
| 2017/0171941 A1 | 6/2017 | Steiner |
| 2017/0223802 A1 | 8/2017 | Vacha et al. |
| 2017/0231066 A1* | 8/2017 | Roberts .................. G01C 3/08 |
| 2017/0353699 A1 | 12/2017 | Wang |
| 2018/0063485 A1 | 3/2018 | Sannala |

FOREIGN PATENT DOCUMENTS

| | | |
|---|---|---|
| JP | 2002-289377 A | 10/2002 |
| WO | WO 2001/099474 A1 | 12/2001 |
| WO | WO 2015/039035 A1 | 3/2015 |

\* cited by examiner

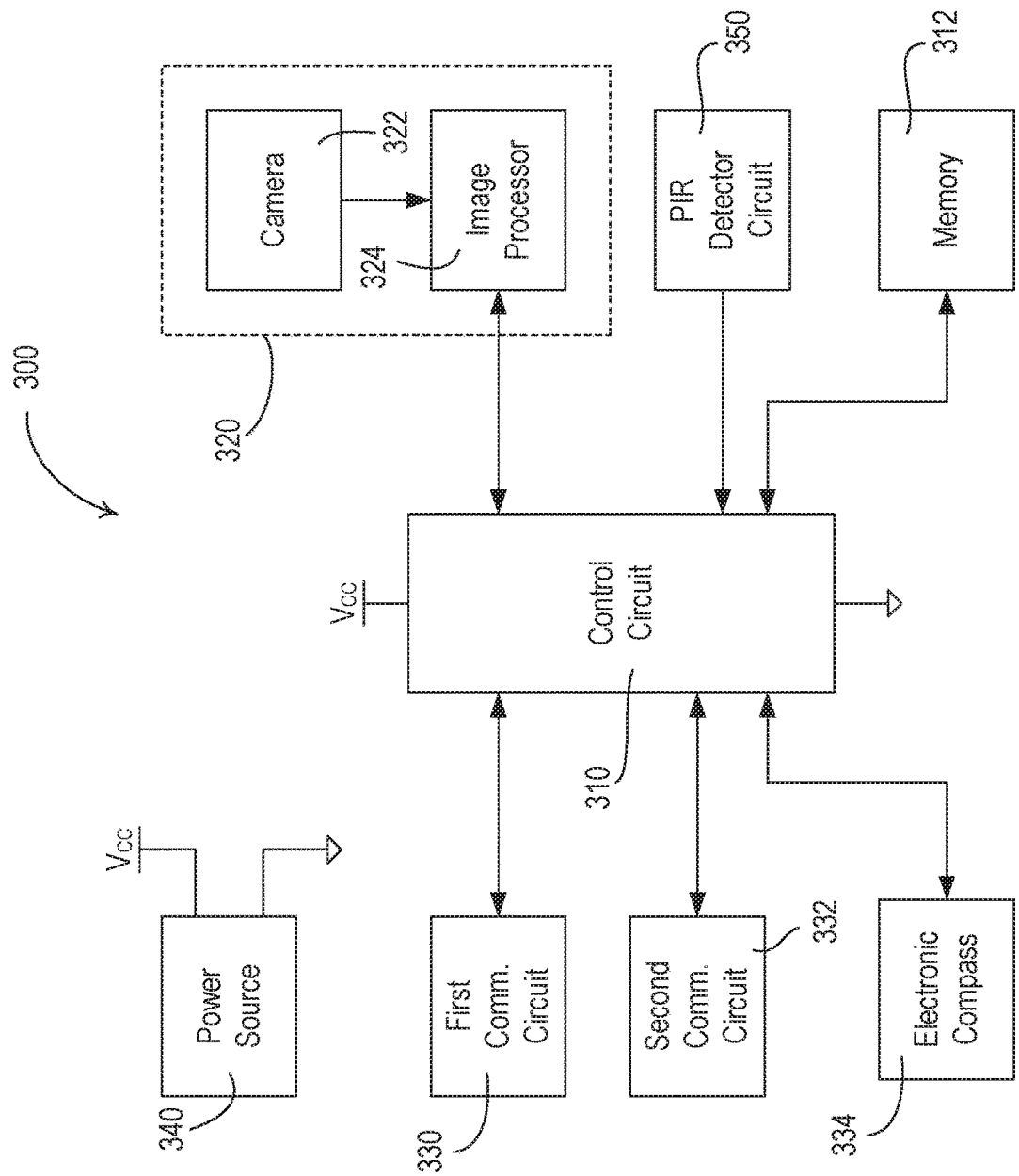

CONTROLLING LIGHTING LOADS TO ACHIEVE A DESIRED LIGHTING PATTERN

CROSS-REFERENCE TO RELATED APPLICATIONS

This application is a continuation of U.S. patent application Ser. No. 16/371,242, filed on Apr. 1, 2019, which is a continuation of U.S. patent application Ser. No. 15/838,305, filed on Dec. 11, 2017, now U.S. Pat. No. 10,278,268, issued on Apr. 30, 2019, which claims priority from U.S. Provisional Patent Application No. 62/432,477, filed Dec. 9, 2016 which are each hereby incorporated by reference in their entireties.

BACKGROUND

A user environment, such as a residence or an office building, for example, may be configured using various types of load control systems. A lighting control system may be used to control the lighting loads providing artificial light in the user environment. A motorized window treatment control system may be used to control the natural light provided to the user environment. An HVAC system may be used to control the temperature in the user environment.

Each load control system may include various control devices, including input devices and load control devices. The load control devices may receive digital messages, which may include load control instructions, for controlling an electrical load from one or more of the input devices. The load control devices may be capable of directly controlling an electrical load. The input devices may be capable of indirectly controlling the electrical load via the load control device.

Examples of load control devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of input devices may include remote control devices, occupancy sensors, daylight sensors, glare sensors, color temperature sensors, temperature sensors, and/or the like. Remote control devices may receive user input for performing load control. Occupancy sensors may include infrared (IR) sensors for detecting occupancy/vacancy of a space based on movement of the users. Daylight sensors may detect a daylight level received within a space. Glare sensors may be positioned facing outside of a building (e.g., on a window or exterior of a building) to identify the position of the sun when in view of the glare sensor. Color temperature sensors determine the color temperature within a user environment based on the wavelengths and/or frequencies of light. Temperature sensors may detect the current temperature of the space.

As described herein, current load control systems implement many input devices, including a number of different sensors. The use of many input devices causes the load control systems to take readings from multiple different types of devices and control loads based on many different types of input.

The input devices in current load control systems may also be inefficient for performing their independent functions in the load control systems. For example, current load control systems may receive input from a glare sensor that indicates that glare is being received from the sun, but load control systems may attempt to reduce or eliminate the amount of glare within the user environment using prediction algorithms to predict the portions of the user environment that are being affected by glare. Attempting to reduce or eliminate the amount of glare within the user environment using these prediction algorithms may be unreliable.

The daylight sensors and the color temperature sensors in the load control systems may also be inefficient for gathering accurate information for performing load control. Current use of daylight sensors and color temperature sensors rely on the accuracy of the location of the sensor for detecting how the intensity of light affects the user environment. It may be desirable to have more accurate ways of determining how the actual intensity and color of light provided within the user environment affects a user within the environment.

As the occupancy/vacancy sensor generally senses the presence or absence of a person within the user environment using passive infra-red (PIR) technology, the occupancy/vacancy sensor may fail to detect the occupancy of a room due to the lack of movement by a user. The occupancy/vacancy sensor senses the presence of a person using the heat movement of the person. The vacancy sensor determines a vacancy condition within the user environment in the absence of the heat movement of a person for a specified timeout period. The occupancy/vacancy sensor may detect the presence or absence of a user within the user environment, but the sensor may fail to provide accurate results. For example, the occupancy/vacancy sensor may detect other heat sources within a user environment and inaccurately determine that the heat sources are emanating from a person. Further, the occupancy/vacancy sensor is unable to identify a person that is not moving, or that is making minor movements, within the user environment. Thus, it may be desirable to otherwise determine occupancy/vacancy within a user environment.

As complex load control systems generally include many different types of input devices for gathering information about a load control environment, the processing and communicating of information in such systems can be inefficient. Additionally, as the information collected by many input devices may be inaccurate, the control of loads according to such information may also be inaccurate.

SUMMARY

The present disclosure relates to a load control system for controlling the amount of power delivered to one or more electrical load, and more particularly, to a load control system having a visible light sensor for detecting occupancy and/or vacancy conditions in a space.

As described herein, a sensor for sensing environmental characteristics of a space comprises a visible light sensing circuit configured to record an image of the space and a control circuit responsive to the visible light sensing circuit. The control circuit may be configured to detect at least one of an occupancy condition and a vacancy condition in the space in response to the visible light sensing circuit, and to measure a light level in the space in response to the visible light sensing circuit.

The visible light sensor may perform differently depending on the mode in which the visible light sensor is operating. For example, the visible light sensor may detect and/or adjust an environmental characteristic within a space based on the mode in which the visible light sensor is operating. The visible light sensor may operate in a particular mode for a period of time and/or the visible light sensor may switch from one mode to another mode after the same, or different, period of time. The modes in which the visible light sensor may operate may include a sunlight glare sensor mode, a daylighting sensor mode, a color temperature sensor mode, an occupancy/vacancy sensor mode, etc.

The control circuit may be configured to detect a first environmental characteristic of the space by applying a first mask to focus on a first region of interest of the image, and to detect a second environmental characteristic of the space by applying a second mask to focus on a second region of interest of the image. The control circuit may be configured to apply the first mask to focus on the first region of interest of the image in order to detect at least one of an occupancy condition and a vacancy condition in the space. The control circuit may be configured to apply the second mask to focus on the second region of interest of the image in order to measure a light level in the space.

The control circuit may be configured to perform a number of sequential sensor events for sensing a plurality of environmental characteristics in response to the image. Each sensor event may be characterized by one of the plurality of environmental characteristics to detect during the sensor event and a respective mask. The control circuit may be configured to perform one of the sensor events to detect the respective environmental characteristic by applying the respective mask to the image to focus on a region of interest and process the portion of the image in the region of interested using to a predetermined algorithm for sensing the respective environmental characteristic.

Lighting fixtures may be controlled by the visible light sensor to obtain a predefined light profile across a surface of a space. An image of the space may be retrieved by a visible light sensor. A lighting level may be determined for a first sub-area and a second sub-area within the space. A first lighting fixture and a second lighting fixture may be determined that affect the lighting level for the first sub-area and the second sub-area. The first lighting fixture and the second lighting fixture may be determined to have the greatest impact on the lighting level of the first sub-area and the second sub-area, respectively.

The first lighting fixture and the second lighting fixture may be adjusted to achieve a first target light level in the first sub-area and a second target light level in the second sub-area. The lighting level of each sub-area may be limited by an upper-limit lighting level, so as not to allow for the lighting level to exceed an upper limit, and without dropping below the target light level.

During a configuration procedure, prior to an operation for performing load control, a light contribution may be determined for each lighting fixture of the plurality of lighting fixtures that affects the lighting level for the sub-areas of a task surface or other portion of a space. The target light levels may be obtained from the predefined light profile. The predefined light profile may be a uniform light profile in which the target light levels are the same for each sub-area, or may be a gradient profile in which the target light levels are the different.

BRIEF DESCRIPTION OF THE DRAWINGS

FIG. 3 is a block diagram of an example visible light sensor.

DETAILED DESCRIPTION

Figure 1:
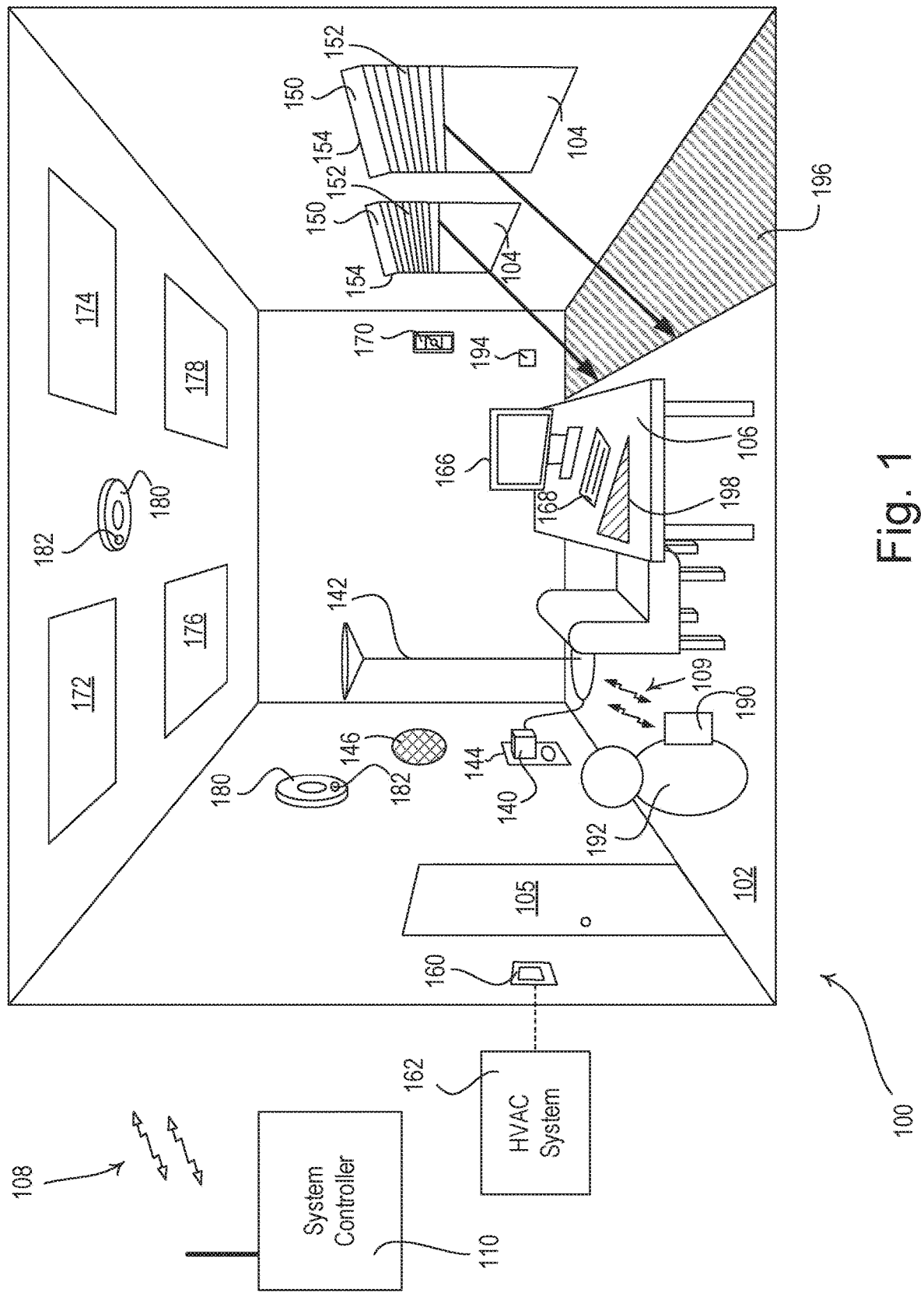
FIG. 1 is a diagram of an example load control system having a visible light sensor.

FIG. 1 is a simple diagram of an example load control system 100 for controlling the amount of power delivered from an alternating-current (AC) power source (not shown) to one or more electrical loads. The load control system 100 may be installed in a room 102 of a building. The load control system 100 may comprise a plurality of control devices configured to communicate with each other via wireless signals, e.g., radio-frequency (RF) signals 108. Alternatively or additionally, the load control system 100 may comprise a wired digital communication link coupled to one or more of the control devices to provide for communication between the load control devices. The control devices of the load control system 100 may comprise a number of control-source devices (e.g., input devices operable to transmit digital messages in response to user inputs, occupancy/vacancy conditions, changes in measured lighting intensity, etc.) and a number of control-target devices (e.g., load control devices operable to receive digital messages and control respective electrical loads in response to the received digital messages). A single control device of the load control system 100 may operate as both a control-source and a control-target device.

The control-source devices may be configured to transmit digital messages directly to the control-target devices. In addition, the load control system 100 may comprise a system controller 110 (e.g., a central processor or load controller) operable to communicate digital messages to and from the control devices (e.g., the control-source devices and/or the control-target devices). For example, the system controller 110 may be configured to receive digital messages from the control-source devices and transmit digital messages to the control-target devices in response to the digital messages received from the control-source devices. The control-source and control-target devices and the system controller 110 may be configured to transmit and receive the RF signals 108 using a proprietary RF protocol, such as the ClearConnect® protocol. Alternatively, the RF signals 108 may be transmitted using a different RF protocol, such as, a standard protocol, for example, one of WIFI, ZIGBEE, Z-WAVE, KNX-RF, ENOCEAN RADIO protocols, or a different proprietary protocol.

The load control system 100 may comprise one or more load control devices, e.g., a lighting control device (e.g., dimmer switch, LED driver, ballast, etc.) for controlling for controlling one or more of lighting fixtures 172, 174, 176, 178. Each of the lighting fixtures 172, 174, 176, 178 may comprise a lighting load (e.g., a light-emitting diode (LED) light source) and a respective lighting control device (e.g., an LED driver) for controlling the lighting load of the lighting fixture.

The lighting control devices (e.g., the LED drivers for the lighting fixtures 172, 174, 176, 178) may be configured to wirelessly receive digital messages via the RF signals 108 (e.g., from the system controller 110) and to control the lighting load 122 in response to the received digital messages. Examples of lighting control devices operable to transmit and receive digital messages is described in greater detail in commonly-assigned U.S. Patent Application Publication No. 2009/0206983, published Aug. 20, 2009, entitled COMMUNICATION SYSTEM FOR A RADIO-FREQUENCY LOAD CONTROL SYSTEM, the entire disclosure of which is hereby incorporated by reference.

The lighting control devices (e.g., the LED drivers for the lighting fixtures 172, 174, 176, 178) may receive instructions for controlling the color temperature of the corresponding lighting loads. Examples of LED drivers configured to control the color temperature of LED light sources are described in greater detail in commonly-assigned U.S. Patent Application Publication No. 2014/0312777, published Oct. 23, 2014, entitled SYSTEMS AND METHODS FOR CONTROLLING COLOR TEMPERATURE, the entire disclosure of which is hereby incorporated by reference. The load control system 100 may further comprise other types of remotely-located load control devices, such as, for example, electronic dimming ballasts for driving fluorescent lamps.

The load control system 100 may comprise a plug-in load control device 140 for controlling a plug-in electrical load, e.g., a plug-in lighting load (such as a floor lamp 142 or a table lamp) and/or an appliance (such as a television or a computer monitor). For example, the floor lamp 142 may be plugged into the plug-in load control device 140. The plug-in load control device 140 may be plugged into a standard electrical outlet 144 and thus may be coupled in series between the AC power source and the plug-in lighting load. The plug-in load control device 140 may be configured to receive digital messages via the RF signals 108 (e.g., from the system controller 110) and to turn on and off or adjust the intensity of the floor lamp 142 in response to the received digital messages.

Alternatively or additionally, the load control system 100 may comprise controllable receptacles for controlling plug-in electrical loads plugged into the receptacles. The load control system 100 may comprise one or more load control devices or appliances that are able to directly receive the wireless signals 108 from the system controller 110, such as a speaker 146 (e.g., part of an audio/visual or intercom system), which is able to generate audible sounds, such as alarms, music, intercom functionality, etc.

The load control system 100 may comprise one or more daylight control devices, e.g., motorized window treatments 150, such as motorized cellular shades, for controlling the amount of daylight entering the room 102. Each motorized window treatment 150 may comprise a window treatment fabric 152 hanging from a headrail 154 in front of a respective window 104. Each motorized window treatment 150 may further comprise a motor drive unit (not shown) located inside of the headrail 154 for raising and lowering the window treatment fabric 152 for controlling the amount of daylight entering the room 102. The motor drive units of the motorized window treatments 150 may be configured to receive digital messages via the RF signals 108 (e.g., from the system controller 110) and adjust the position of the respective window treatment fabric 152 in response to the received digital messages. The load control system 100 may comprise other types of daylight control devices, such as, for example, a cellular shade, a drapery, a Roman shade, a Venetian blind, a Persian blind, a pleated blind, a tensioned roller shade systems, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Patent Application Publication No. 2014/0305602, published Oct. 16, 2014, entitled INTEGRATED ACCESSIBLE BATTERY COMPARTMENT FOR MOTORIZED WINDOW TREATMENT, the entire disclosures of which are hereby incorporated by reference.

The load control system 100 may comprise one or more temperature control devices, e.g., a thermostat 160 for controlling a room temperature in the room 102. The thermostat 160 may be coupled to a heating, ventilation, and air conditioning (HVAC) system 162 via a control link (e.g., an analog control link or a wired digital communication link). The thermostat 160 may be configured to wirelessly communicate digital messages with a controller of the HVAC system 162. The thermostat 160 may comprise a temperature sensor for measuring the room temperature of the room 102 and may control the HVAC system 162 to adjust the temperature in the room to a setpoint temperature. The load control system 100 may comprise one or more wireless temperature sensors (not shown) located in the room 102 for measuring the room temperatures. The HVAC system 162 may be configure to turn a compressor on and off for cooling the room 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the room 102. The thermostat 160 may be configured to receive digital messages via the RF signals 108 (e.g., from the system controller 110) and adjust heating, ventilation, and cooling in response to the received digital messages.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a controllable electrical receptacle or controllable power strip for controlling one or more plug-in loads; a motor control unit for controlling a motor load, such as a ceiling fan or an exhaust fan; a drive unit for controlling a projection screen; motorized interior or exterior shutters; an air conditioner; a compressor; an electric baseboard heater controller; a variable air volume controller; a fresh air intake controller; a ventilation controller; hydraulic valves for use with radiators and radiant heating systems; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; an alternative energy controller; and/or another load control device.

The load control system 100 may comprise one or more input devices, e.g., such as a remote control device 170 and/or a visible light sensor 180. The input devices may be fixed or movable input devices. The system controller 110 may be configured to transmit one or more digital messages to the load control devices (e.g., a lighting control device of the lighting fixtures 172, 174, 176, 178, the plug-in load control device 140, the motorized window treatments 150, and/or the thermostat 160) in response to the digital messages received from the remote control device 170 and/or the visible light sensor 180. The remote control device 170 and/or the visible light sensor 180 may be configured to transmit digital messages directly to the lighting control device of the lighting fixtures 172, 174, 176, 178, the plug-in load control device 140, the motorized window treatments 150, and/or the temperature control device 160.

The remote control device 170 may be configured to transmit digital messages via the RF signals 108 to the system controller 110 (e.g., directly to the system controller 110) in response to an actuation of one or more buttons of the remote control device 170. For example, the remote control device 170 may be battery-powered. The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential controllers, commercial controllers, industrial controllers, and/or any combination thereof.

The system controller 110 may be coupled to a network, such as a wireless or wired local area network (LAN), e.g., for access to the Internet. The system controller 110 may be wirelessly connected to the network, e.g., using Wi-Fi technology. The system controller 110 may be coupled to the network via a network communication bus (e.g., an Ethernet communication link). The system controller 110 may be configured to communicate via the network with one or more network devices, e.g., a mobile device 190, such as, a personal computing device and/or a wearable wireless device. The mobile device 190 may be located on an occupant 192, for example, may be attached to the occupant's body or clothing or may be held by the occupant. The mobile device 190 may be characterized by a unique identifier (e.g., a serial number or address stored in memory) that uniquely identifies the mobile device 190 and thus the occupant 192. Examples of personal computing devices may include a smart phone (for example, an iPhone® smart phone, an Android® smart phone, or a Blackberry® smart phone), a laptop, and/or a tablet device (for example, an iPad® hand-held computing device). Examples of wearable wireless devices may include an activity tracking device (such as a FitBit® device, a Misfit® device, and/or a Sony Smartband® device), a smart watch, smart clothing (e.g., OMsignal® smartwear, etc.), and/or smart glasses (such as Google Glass® eyewear). In addition, the system controller 110 may be configured to communicate via the network with one or more other control systems (e.g., a building management system, a security system, etc.).

The mobile device 190 may be configured to transmit digital messages to the system controller 110, for example, in one or more Internet Protocol packets. For example, the mobile device 190 may be configured to transmit digital messages to the system controller 110 over the LAN and/or via the internet. The mobile device 190 may be configured to transmit digital messages over the internet to an external service (e.g., If This Then That (IFTTT®) service), and then the digital messages may be received by the system controller 110. The mobile device 190 may transmit and receive RF signals 109 via a Wi-Fi communication link, a Wi-MAX communications link, a Bluetooth communications link, a near field communication (NFC) link, a cellular communications link, a television white space (TVWS) communication link, or any combination thereof to communicate with the system controller, for example. Alternatively, or additionally, the mobile device 190 may be configured to transmit RF signals according to a proprietary protocol. The load control system 100 may comprise other types of network devices coupled to the network, such as a desktop personal computer, a Wi-Fi or wireless-communication-capable television, or any other suitable Internet-Protocol-enabled device. Examples of load control systems operable to communicate with mobile and/or network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The system controller 110 may be configured to determine the location of the mobile device 190 and/or the occupant 192. The system controller 110 may be configured to control (e.g., automatically control) the load control devices (e.g., the lighting control devices of the lighting fixtures 172, 174, 176, 178, the plug-in load control device 140, the motorized window treatments 150, and/or the temperature control device 160) in response to determining the location of the mobile device 190 and/or the occupant 192.

One or more of the control devices of the load control system 100 may transmit beacon signals, for example, RF beacon signals transmitted using a short-range and/or low-power RF technology, such as BLUETOOTH® technology. The load control system 100 may also comprise at least one beacon transmitting device 194 for transmitting the beacon signals. The mobile device 190 may be configured to receive a beacon signal when located near a control device that is presently transmitting the beacon signal. A beacon signal may comprise a unique identifier identifying the location of the load control device that transmitted the beacon signal. Since the beacon signal may be transmitted using a short-range and/or low-power technology, the unique identifier may indicate the approximate location of the mobile device 190. The mobile device 190 may be configured to transmit the unique identifier to the system controller 110, which may be configured to determine the location of the mobile device 190 using the unique identifier (e.g., using data stored in memory or retrieved via the Internet). An example of a load control system for controlling one or more electrical loads in response to the position of a mobile device and/or occupant inside of a building is described in greater detail in commonly-assigned U.S. Patent Application Publication No. 2016/0056629, published Feb. 25, 2016, entitled LOAD CONTROL SYSTEM RESPONSIVE TO LOCATION OF AN OCCUPANT AND MOBILE DEVICES, the entire disclosure of which is hereby incorporated by reference.

The visible light sensor 180 may comprise a camera directed into the room 102 and may be configured to record images (e.g., still images and/or videos) of the room 102. For example, the visible light sensor 180 may be mounted to a ceiling of the room 102, and/or may be mounted to a wall of the room (as shown in FIG. 1). The visible light sensor 180 may comprise a fish-eye lens. If the visible light sensor 180 is mounted to the ceiling, the images recorded by the camera may be top down views of the room 102.

Figure 2A:
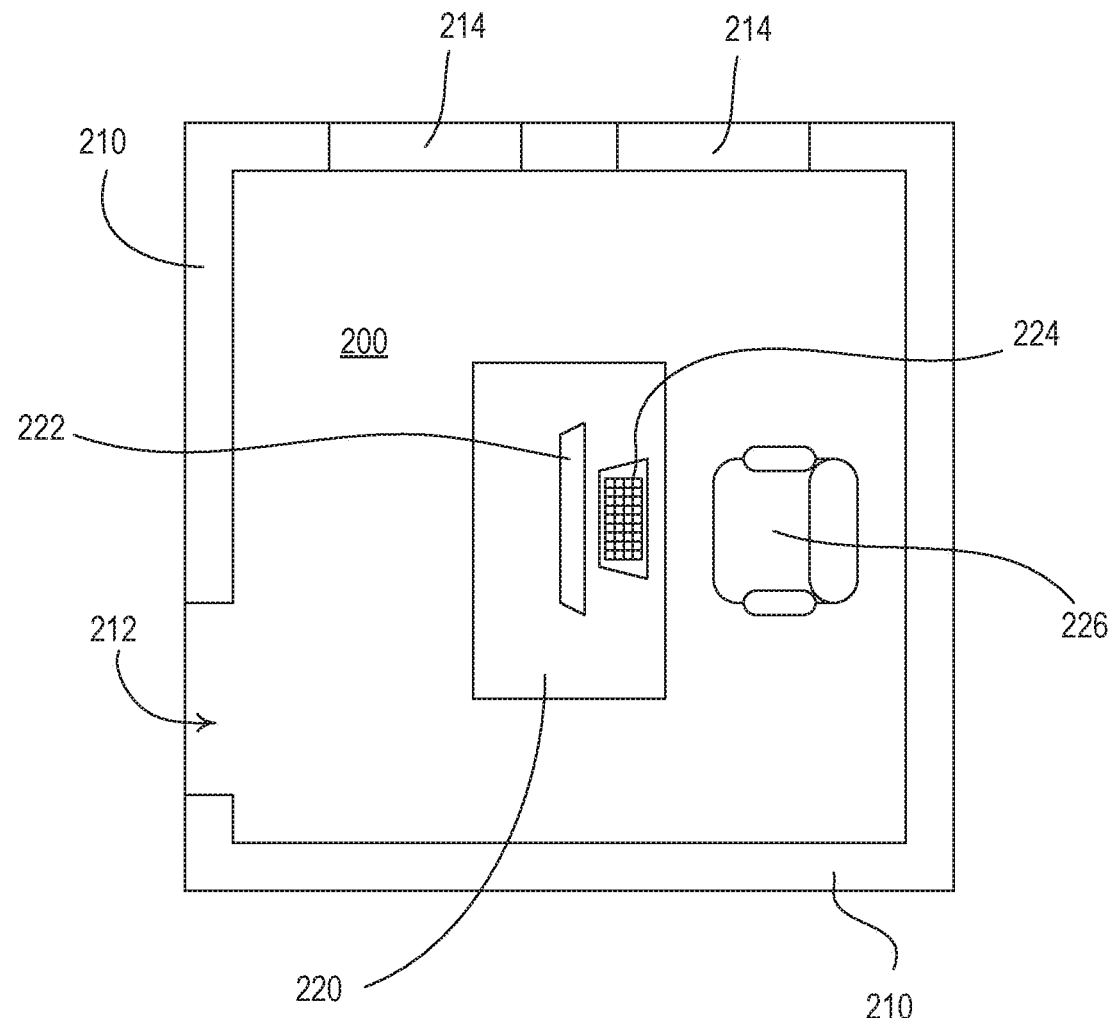
FIGS. 2A-2G show example images of a room that may be recorded by a camera of a visible light sensor.

FIGS. 2A-2G show simplified example images of a room 200 that may be recorded by the camera of the visible light sensor. As shown in FIG. 2A, the room 200 may comprise room features. Room features may include walls 210 having a doorway 212 and windows 214. The room 200 may include a desk 220 on which a computer monitor 222 and a keyboard 224 may be located. The room 200 may also include a chair 226 on which an occupant of the room 200 may typically be positioned to use the computer monitor 222 and the keypad 224. The example images of the room 200 shown in FIGS. 2A-2G are provided for informative purposes and may not be identical to actual images captured by the visible light sensor 180. Since the visible light sensor 180 may have a fish-eye lens, the actual images captured by the camera may warped images and may not be actual two-dimensional images as shown in FIGS. 2A-2G. In addition, the example image of the room 200 shown in FIGS. 2A-2G show the walls 210 having thickness and actual images captured by the visible light sensor 180 may show the interior surfaces of the room 102.

Referring again to FIG. 1, the visible light sensor 180 may be configured to process images recorded by the camera and transmit one or more messages (e.g., digital messages) to the load control devices in response to the processed images. The visible light sensor 180 may be configured to detect one or more environmental characteristics of a space (e.g., the room 102 and/or the room 200) from the images. For example, the control circuit of the visible light sensor 180 may be configured to evaluate an image and determine one or more environmental characteristics within a room (e.g., room 102) depicted in the image.

Environmental characteristics may include one or more details of the image, such as a movement, lighting intensity (e.g., lighting intensity from sunlight 196 and/or artificial light), color temperature, occupancy and/or vacancy condition, etc., depicted within the image. Lighting intensity may include a percentage of the light output by a lighting control device. As described herein, the lighting intensity may include a lighting intensity from sunlight 196, artificial light, a percentage of the light output by a lighting control device, reflected light, luminance and/or illuminance. Luminance may include the amount of light reflected from one or more surfaces and/or may indicate the luminous power that may be perceived by the visible light sensor. Illuminance may include the amount of light falling onto and/or spreading over one or more surface areas. Luminance may be a measurable quantity. The visible light sensor 180 may determine an illuminance based (e.g., using a correction factor) on a measured luminance. Luminance and illuminance may correlate to the lighting intensity of a lighting fixture. For example, adjusting the lighting intensity of a lighting fixture may affect the quantity (e.g., measurable quantity) of the illuminance (e.g., the amount of light falling onto and/or spreading over one or more surface areas). As the quantity of the illuminance changes, the luminance may change.

The visible light sensor 180 may be configured to determine environmental characteristics within the room using one or more algorithms or image analysis techniques. For example, the visible light sensor 180 may be configured to determine environmental characteristics within the room using background subtraction and/or background maintenance. The visible light sensor 180 may use background subtraction to detect objects that change within an image. For example, background subtraction may be used for detecting movement within an image and/or for detecting an occupancy/vacancy condition within the image. Background maintenance may be used to perform background subtraction. Example algorithms that may be used to perform background maintenance may include adjacent frame difference algorithms, mean and threshold algorithms, mean and covariance algorithms, mixture of Gaussian algorithms, normalized block correlation algorithms, as well as others. The visible light sensor 180 may also, or alternatively, provide the images to the system controller 110 or another computing device for performing imaging analysis to determine environmental characteristics and/or to control electrical loads/load control devices as described herein.

The visible light sensor 180 may comprise a communication circuit for transmitting and receiving the RF and/or wired signals. For example, the visible light sensor 180 may comprise a communication circuit for transmitting and receiving the RF signals 108 and/or the RF signals 109. The visible light sensor 180 may be configured to process one or more images recorded by the camera and transmit a digital message to the load control devices and/or to the system controller 110. The digital messages may include control instructions for controlling an electrical load at a corresponding load control device. The digital messages may also, or alternatively, include indications of environmental characteristics identified in the images, from which control instructions may be generated for controlling an electrical load at a load control device. The visible light sensor 180 may transmit the digital message to the load control devices and/or system controller on a periodic basis and/or based on another triggering event. The visible light sensor 180 may transmit the digital message to the load control devices in response to a characteristic of the one or more images (e.g., in response to one or more environmental characteristics determined from the images). For example, the visible light sensor 180 may be configured to detect a movement, lighting intensity (e.g., lighting intensity from sunlight 196 and/or artificial light), color temperature, and/or occupancy/vacancy condition in the room 102 using the camera. The visible light sensor 180 may transmit a digital message to the load control devices and/or the system controller 110 via the RF signals 108 (e.g., using the proprietary protocol) in response to detecting the movement, lighting intensity (e.g., lighting intensity from sunlight 196 and/or artificial light), color temperature, and/or occupancy/vacancy conditions.

The visible light sensor 180 may operate to configure and/or control the load control system 100. The visible light sensor 180 may generate images and identify and/or define objects in the images for enabling control of the devices in the load control system. The visible light sensor 180 may identify movements, light intensities, color temperatures, occupancy/vacancy conditions from the objects in the images. The load control system 100 may be configured according to the defined objects, movements, light intensities, color temperatures, occupancy/vacancy conditions and rules that are defined thereon.

The visible light sensor 180 may be configured to operate in one or more sensor modes (e.g., an occupancy/vacancy sensor mode, a daylighting sensor mode, a color sensor mode, a daylight glare sensor mode, an occupant count sensor mode, etc.). The visible light sensor 180 may execute different algorithms to process the images in each of the sensor modes to determine data to transmit to the load control devices. The visible light sensor 180 may transmit digital messages via the RF signals 108 (e.g., using the proprietary protocol) in response to the images. The visible light sensor 180 may send the digital messages (e.g., control instructions) directly to the load control devices and/or to the system controller 110 which may then communicate the messages to the load control devices. The visible light sensor 180 may comprise a first communication circuit for transmitting and/or receiving the RF signals 108 using a proprietary protocol.

A user 192 may configure the visible light sensor 180 to perform actions within the room 102 according to the daylight glare sensor mode, daylighting sensor mode, color sensor mode, occupancy/vacancy sensor mode, and/or occupant count sensor mode. The user 192 may configure the visible light sensor 180 to perform actions according to the daylight glare sensor mode, daylighting sensor mode, color sensor mode, occupancy/vacancy sensor mode, and/or occupant count sensor mode within one or more regions of interest within the room 102. For example, the user 192 may configure the visible light sensor 180 to set the total lighting intensity (e.g., artificial light and/or sunlight 196) to a preferred total illuminance a task area, based on the user 192 entering the room 102, exiting the room 102, and/or residing within the room 102. The user 192 may additionally, or alternatively, configure the visible light sensor 180 to set the color temperature to a preferred color temperature, based on the user 192 entering the room 102, exiting the room 102, and/or residing within the room 102. The visible light sensor 180 may apply one or more digital masks within room 102 when in different modes. Each sensor mode may have different masks that may be applied when the visible light sensor 180 operates in the corresponding mode.

The visible light sensor 180 may be configured to perform a plurality of sensor events to detect various environmental characteristics of the space. For example, to perform a sensor event, the visible light sensor 180 may be configured to operate in one or more sensor modes. Each sensor mode, when executed, may detect one or more sensor events. A sensor event may be detected using an algorithm that identifies one or more environmental characteristics in an image. For example, in an occupancy/vacancy sensor mode, a sensor event may include entry of a user into a doorway of a room, movement detected within a predefined area of a room, or another occupancy/vacancy sensor event that may be detected from the environmental characteristics of the space. In addition, the visible light sensor 180 may configured to obtain from memory certain pre-configured control parameters (e.g., sensitivity, baseline values, threshold values, limit values, etc.) that may be used by the algorithm to detect the environmental characteristic during the sensor event.

The visible light sensor 180 may be configured to focus on one or more regions of interest in the image recorded by the camera when processing the image to detect the environmental characteristic during the sensor event. For example, certain areas of the image recorded by the camera may be masked (e.g., digitally masked), such that the visible light sensor 180 may not process the portions of the image in the masked areas. When certain environmental characteristics of a sensor event are identified in the unmasked portion of the image, a control strategy may be triggered. The control strategy may be an algorithm for performing control (e.g., generating control instruction) of one or more load control devices based on the detected environmental characteristics.

A region of interest may be a region within the room 102 that may be relevant to the environmental characteristics within the room 102. For example, a region of interest may be the door 105 (e.g., or other room features), a user task area (e.g., the desk 106, monitor 166, and/or keyboard 168), a user's path from the door 105 to the user task area, etc. The visible light sensor 180 may be configured to determine one or more environmental characteristics present at the region of interest. For example, the visible light sensor 180 may be configured to determine lighting intensity at a user task area. The visible light sensor 180 may determine the lighting intensity at the user task area, for example, to determine if the lighting intensity present at the task area is a preferred lighting intensity. As another example, the visible light sensor 180 may be configured to determine an occupancy/vacancy condition at the path from the door 105 to the user task area. The visible light sensor may be configured to determine the occupancy/vacancy condition to adjust control devices (e.g., lighting fixtures 172, 174, 176, 178) based on whether the user 192 is entering the room 102, exiting the room 102, or residing within the room 102.

The visible light sensor 180 may be configured to provide a mask (e.g., digital mask) within the room 102. The visible light sensor 180 may be configured to apply a mask (e.g., a predetermined digital mask that may be stored in memory) to focus on a specific region of interest, and process the portion of the image in the region of interest. In addition, the visible light sensor 180 may be configured to focus on multiple regions of interest in the image at the same time (e.g., as shown in FIGS. 2B-2G). For example, the visible light sensor 180 may provide a mask over the door 105 in the room 102. With the door 105 being masked, the visible light sensor 180 may disregard the door 105 and/or movement located at the door 105. If a portion of the room 102 is masked, the visible light sensor 180 may focus on one or more regions of interest. For example, if a door 105 is masked, the visible light sensor 180 may focus on a user task area, such as the desk 106, monitor 166, and keyboard 168 (e.g., a user area that is not masked). Specific mask(s) may be defined for each sensor event.

Image processing (e.g., digital image processing) may be performed to digitally mask one or more portions of the room 102. For example, image processing may digitally mask one or more portions of the room 102 by selecting a set of pixels within the image for which processing by the visible light sensor 180 may, or may not, take place. The visible light sensor 180 may record an image of the room 102 and digitally mask a portion (e.g., the door 105) of the room 102 by disregarding one or more of the pixels of the image that represent the portion of the room 102 to be digitally masked.

A mask may be used to disregard portions of a space (e.g., the room 102) that may be less relevant, or less relevant for a period of time, for controlling the load control system 100. For example, a mask may be used to disregard portions of the room (e.g., the door 105 within room 102 and/or internal windows in the room 102) to block activity (e.g., walking and/or lighting in a hallway adjacent to room 102) occurring outside of the room 102. The visible light sensor 180 may mask the door 105 within room 102 and/or internal windows in the room 102 by disregarding pixels of the room 102 that depict objects and/or activity near the door 105.

The mask may be used to disregard one or more objects within the room 102. For example, a mask may be used to disregard portions of the room other than the door 105 within room 102. The door 105 may be monitored to identify an occupancy condition. For example, the visible light sensor 180 may be configured to monitor an occupancy condition by identifying users walking in and/or out of the door 105 of the room 102. The visible light sensor 180 may control the load control system 100 according to the occupancy condition. The visible light sensor 180 may be unresponsive to a movement and/or user in the masked areas when determining an occupancy/vacancy condition in the room 102. The visible light sensor 180 may be configured to exclude detection of motion within one or more portions of the room 102 if a movement and/or user within the portion of the room 102 is irrelevant to the load control system 100.

The visible light sensor 180 may be configured to dynamically change between the sensor modes, apply digital masks to the images, and control parameters depending upon the present sensor event. For example, the visible light sensor 180 may be configured to sequentially and/or periodically step through the different sensor modes during operation (e.g., the occupancy/vacancy sensor mode, the daylighting sensor mode, the color sensor mode, the daylight glare sensor mode, the occupant count mode, etc.). Each sensor event may be characterized by a sensor mode (e.g., specifying an algorithm to use), one or more control parameters, and/or one or more digital masks. The sensor event may be detected during a sensor mode when environmental characteristics are identified in an unmasked area of the image.

The visible light sensor 180 may be configured to cycle through the different sensor modes during operation after expiration of a period of time (e.g., via a round robin technique, such as giving each sensor mode a predefined amount of time in sequence before returning to the first sensor mode of the sequence). The visible light sensor 180 may be configured to change its sensor mode depending upon the present environmental characteristic being identified from the images, or changes in an environmental characteristic being identified from the images. For example, the visible light sensor 180 may be configured to change its sensor mode depending on user movements, light levels inside of the room 102, daylight levels outside of the room 102, color temperature, daylight glare, etc. The visible light sensor 180 may be configured to change its sensor mode depending on an occupancy/vacancy condition. For example, the visible light sensor 180 may operate in the occupancy/vacancy sensor mode if the room 102 is vacant and no other sensor modes may be used during a vacancy condition. The sensor modes may be organized according to a prioritized set, for example, that is defined during configuration of the visible light sensor 180.

The visible light sensor 180 may apply different masks to portions of the room 102. The different masks may operate during different modes of operation or relate to different objects for performing control. The different masks may operate during the same sensor mode or relate to the same objects for performing control. For example, the visible light sensor 180 may be configured to identify an environmental characteristic of a first region of interest by applying a first mask to objects other than the first region of interest. The first mask may allow the visible light sensor to, for example, focus on a first region of interest and detect a color intensity within the first region of interest. The visible light sensor 180 may be configured to disregard environmental characteristics of a second region of interest by applying the second mask to disregard objects other than the second region of interest. For example, the second mask may relate to disregarding a movement in an area other than the second region of interest. The visible light sensor 180 may be configured to apply the first mask to focus on the first region of interest of the image in order to detect at least one of a movement, a color temperature, an occupancy/vacancy condition, etc. in the first region of interest. The visible light sensor 180 may be configured to apply the second mask to disregard the second region of interest of the image in order to disregard a lighting intensity, a color temperature, an occupancy/vacancy condition, etc. in the second region of interest.

A first region of interest may be a region in which a user performs a task, such as a user's task area. For example, the first region of interest may include a user's desk 106, monitor 166, and/or keyboard 168. The second region of interest may be a region in which the user performs a task, or the second region of interest may be a region of control unrelated to the user performing a task. For example, a second region of interest may be doorway 105, window 104, and/or another location within a space in which the control circuit is to disregard a movement, lighting intensity (e.g., lighting intensity from sunlight 196 and/or artificial light), color temperature, and/or occupancy/vacancy condition. The visible light sensor 180 may be configured to apply a first mask to the first region of interest (e.g., the user's desk 106, monitor 166, and/or keyboard 168) and/or the visible light sensor 180 may be configured to apply a second mask to the second region of interest (e.g., doorway 108, window 104).

Objects may be identified and/or defined with each of the one or more regions of interest using the images of the regions. Movements, light intensities, color temperatures, and/or occupancy/vacancy conditions may be determined from the objects identified and/or defined with the regions of interest. For example, a lighting intensity may be defined within the region of interest relating to the user's desk 106 that may be different than the lighting intensity that may be defined within the region of interest relating to the pathway from the door 105 to the user's desk. Portions of a region of interest may be defined as a portion within one or more other regions of interest. For example, keyboard 168 may be defined as a region of interest and/or a desk 106 may be defined as a separate region of interest even though the keyboard 168 is located within the region of interest defined by the desk 106. Although a region of interest may be located within another region of interest, each of the regions of interest may be individually defined and/or controlled via the visible light sensor 180 (e.g., via control instructions and/or indications). For example, although the keyboard 168 is located within the region of interest defined by the desk 106, the load control devices providing lighting to the keyboard 168 may be defined and/or controlled independently from the load control devices providing lighting to the desk 106.

The visible light sensor 180 may be configured to focus on multiple regions of interest when detecting an occupancy/vacancy condition within room 102. The visible light sensor 180 may be configured to apply one or more masks to one or more portions of the room 102. For example, the visible light sensor 180 may be configured to apply a first mask to a first portion of a room 102 (e.g., the window 104) to focus on motion within a first region of interest (e.g., the user's desk 106), a second mask to a second portion of the room 102 (e.g., the desk 106) to focus on motion within a second region of interest (e.g., a path from the door 105 to the user's desk 106), and a third mask to a third portion of the room 102 to disregard motion within a third region of interest (e.g., a doorway, such as door 105). The visible light sensor 180 may be configured to control one or more control devices based on the occupancy/vacancy condition. For example, the visible light sensor 180 may be configured to determine a user 192 is occupying a region of interest and the visible light sensor 180 may be configured to provide lighting (e.g., from lighting fixtures 172, 174, 176, 178) at the region of interest.

The visible light sensor 180 may be configured to operate in the occupancy/vacancy sensor mode to determine an occupancy and/or vacancy condition in the space in response to detection of movement within one or more regions of interest. While in the occupancy/vacancy sensor mode, the visible light sensor 180 may be configured to use an occupancy and/or vacancy detection algorithm to determine that the space is occupied in response to the amount of movement and/or the velocity of movement exceeding an occupancy threshold.

The visible light sensor 180 may compare a recorded image of the room 102 with one or more other recorded images (e.g., previously recorded images and/or subsequently recorded images) of the room 102 to determine whether there are differences. For example, the visible light sensor 180 may compare a recorded image of the room 102 with one or more other recorded images of the room 102 to determine if a user 192 has entered the room and/or if the user 192 has exited the room 102. For example, if a user 192 appears in an image of the room 102 the visible light sensor 180 may determine that an occupancy condition has occurred. If the user disappears from an image of the room 102 the visible light sensor 180 may determine that a vacancy condition has occurred.

During a sensor event for detecting occupancy and/or vacancy, the visible light sensor 180 may be configured to apply a predetermined mask to focus on one or more regions of interest in one or more images recorded by the camera and determine occupancy or vacancy of the space based on detecting or not detecting motion in the regions of interest. The visible light sensor 180 may be responsive to movement in the regions of interest and not be responsive to movement in the masked-out areas.

Figure 2B:
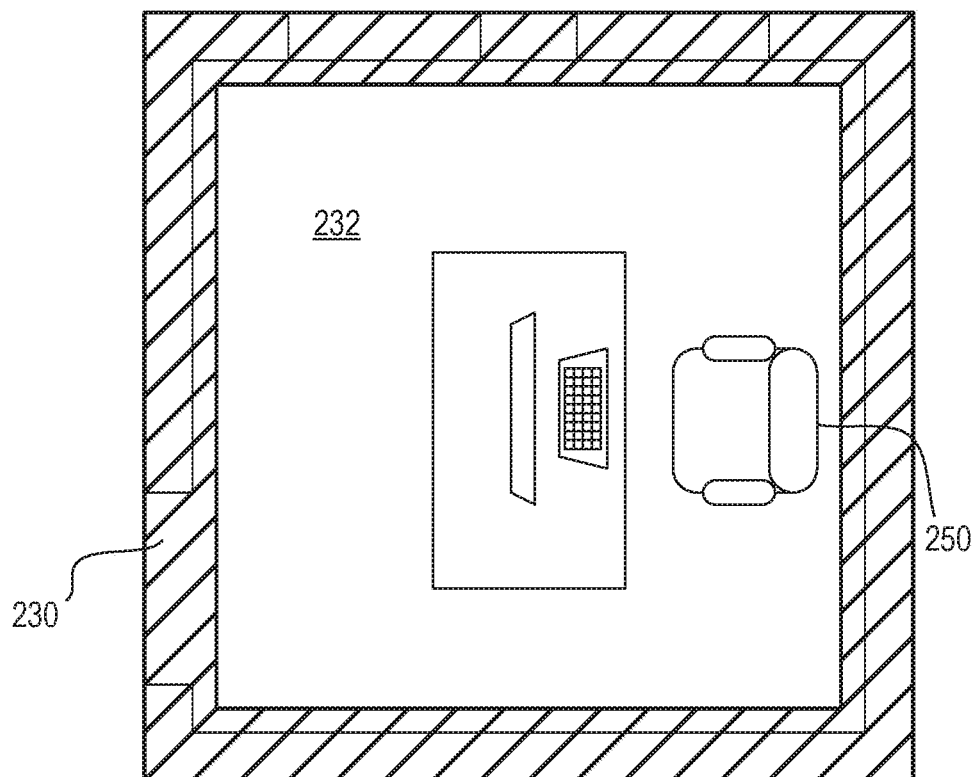

As shown in FIG. 2B, the visible light sensor 180 may be configured to apply a mask 230 to an image of the room 200 to exclude detection of motion in the doorway 212 and/or the windows 214, and may focus on a region of interest 232 that include the interior space of the room 200. The visible light sensor 180 may be configured to apply a first mask to focus on a first region of interest, apply a second mask to focus on a second region of interest, and determine occupancy or vacancy based on movement detected in either of the regions of interest. In addition, the visible light sensor 180 may be configured to focus on multiple regions of interest in the image at the same time by applying different masks to the image(s).

Also, or alternatively, the visible light sensor 180 may identify a user path when the visible light sensor 180 is in the occupancy/vacancy sensor mode. The user path may be a predefined location and/or direction within the room 200 that the user 192 may be located and/or that the user 192 may move within the room 200. For example, the user path may be a position and/or direction that a user 200 may take, or has been identified as taking, when walking from the doorway 212 towards the chair 250. The user path may be illuminated when occupancy/vacancy is identified in the room 200.

The visible light sensor 180 may be configured to adjust certain control parameters (e.g., sensitivity) to be used by the occupancy and/or vacancy algorithm depending upon the present sensor event. The occupancy threshold may be dependent upon the sensitivity. For example, the visible light sensor 180 may be configured to be more sensitive or less sensitive to movements in a first region of interest than in a second region of interest.

Figure 2C:
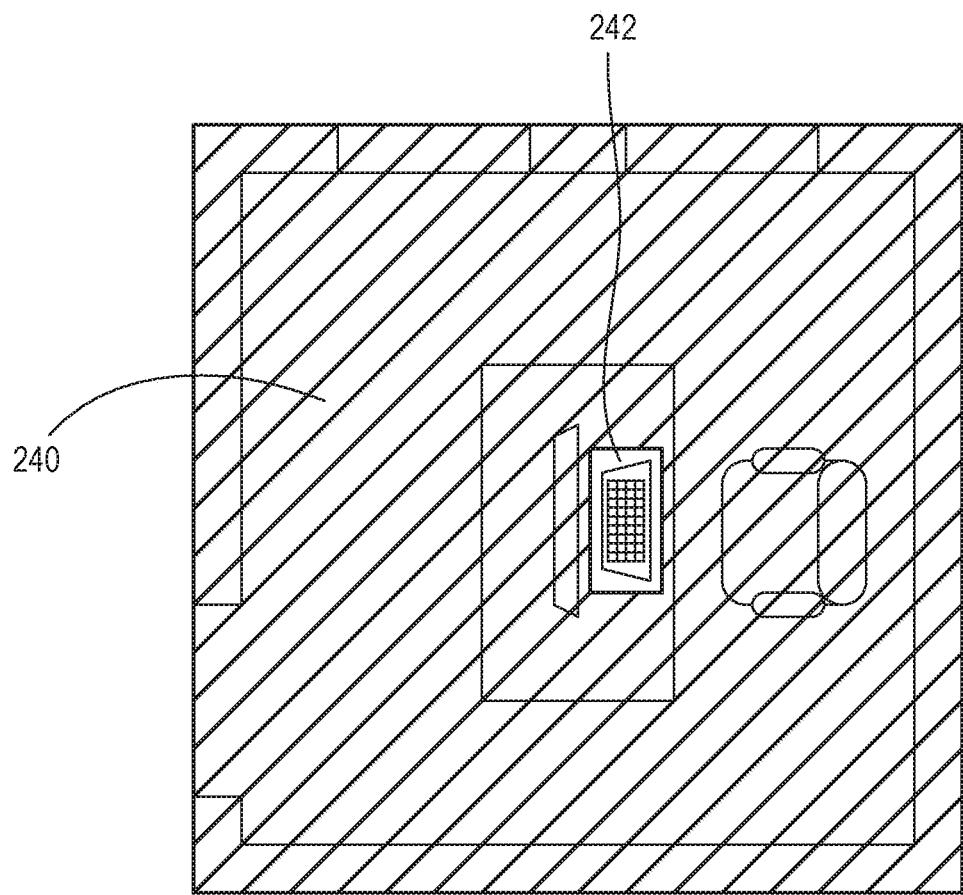

As shown in FIG. 2C, the visible light sensor 180 may be configured to increase the sensitivity and apply a mask 240 to focus on a region of interest 242 around the keyboard 224 to be more sensitive to movements around the keyboard. In other words, by using masks that focus on "smaller" vs "larger" (e.g., the keyboard vs. the desk surface on which the keyboard may sit), the visible light sensor 180 may be configured to increase and/or decrease the sensitivity of detected or not detected movements. In addition, through the use of masks, visible light sensor 180 may be configured to not simply detect movement in the space, but detect where that movement occurred.

Figure 2D:
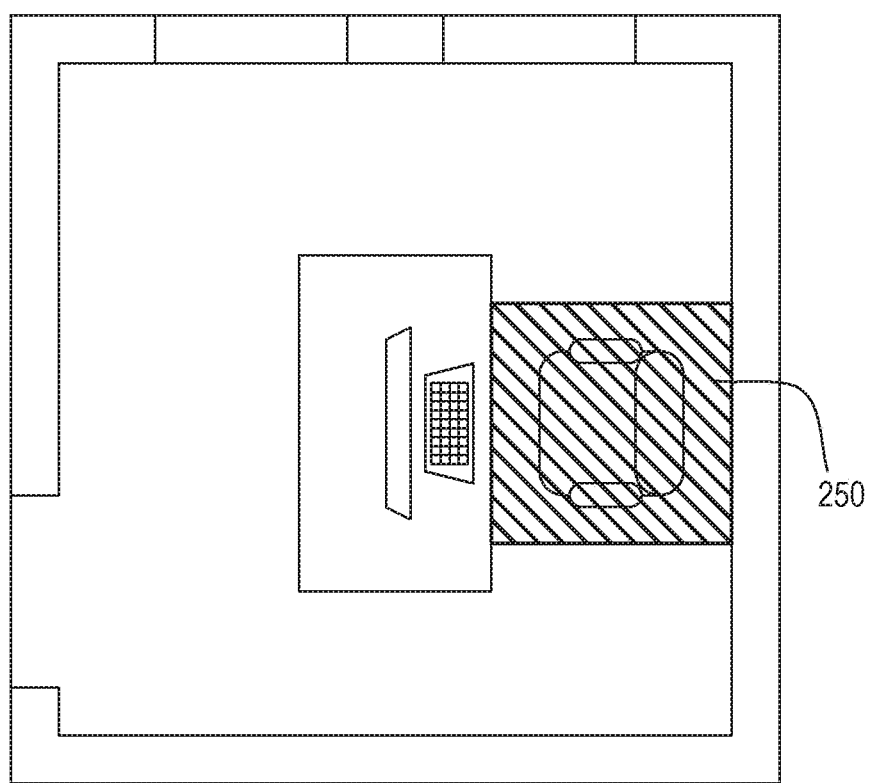

The visible light sensor 180 may be configured to determine an occupancy and/or vacancy condition in the space in response to an occupant moving into or out of a bounded area. For example, as shown in FIG. 2D, the visible light sensor 180 may be configured to determine an occupancy condition in the room 200 in response to the occupant crossing a boundary of a bounded area 250 surrounding the chair 226 to enter the bounded area. After the occupant crosses the boundary, the visible light sensor 180 may assume that the space is occupied (e.g., independent of other sensor events of occupancy and/or vacancy) until the occupant leaves the bounded area 250. The visible light sensor 180 may not be configured to determine an occupancy condition in the room 200 until the occupant crosses the boundary of the bounded area 250 to exit the bounded area. After the occupant leaves the bounded area, the visible light sensor 180 may be configured to detect a vacancy condition, for example, in response to determining that there is no movement in the region of interest 232 as shown in FIG. 2B. Thus, the visible light sensor 180 may maintain the occupancy condition even if the movement of the occupant comprises fine movements (e.g., if the occupant is sitting still or reading in the chair 226) or no movements (e.g., if the occupant is sleeping in a bed).

The bounded area may surround other structures in different types of rooms (e.g., other than the room 200 shown in FIG. 2D). For example, if the bounded area surrounds a hospital bed in a room, the system controller 110 may be configured to transmit an alert to the hospital staff in response to the detection of movement out of the region of interest (e.g., indicating that the patient got up out of the bed). In addition, the visible light sensor 180 may be configured count the number of occupants entering and exiting a bounded area.

Referring again to FIG. 1, the visible light sensor 180 may transmit digital messages to the system controller 110 via the RF signals 108 (e.g., using the proprietary protocol) in response to detecting the occupancy or vacancy conditions. The system controller 110 may be configured to turn the lighting loads (e.g., lighting loads in lighting fixtures 172, 174, 176, 178 and/or the lighting load in the floor lamp 142) on and off in response to receiving an occupied command and a vacant command, respectively. Alternatively, the visible light sensor 180 may transmit digital messages (e.g., including control instructions) directly to the lighting control devices for the lighting loads (e.g., lighting control devices for the lighting fixtures 172, 174, 176, 178, plug-in load control device 140, etc.). The visible light sensor 180 may operate as a vacancy sensor, such that the lighting loads are only turned off in response to detecting a vacancy condition (e.g., and not turned on in response to detecting an occupancy condition). Examples of RF load control systems having occupancy and vacancy sensors are described in greater detail in commonly-assigned U.S. Pat. No. 8,009, 042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The visible light sensor 180 may be configured to adjust (e.g., via control instructions) one or more light sources (e.g., lighting fixtures 172, 174, 176, 178) during the occupancy/vacancy mode based on an occupancy and an activity being performed within the room 102. For example, the visible light sensor 180 may determine that user 192 is occupying the room 102 and that the user 192 is typing or writing on a task area (e.g., desk 106). The visible light sensor 180 may adjust the lighting fixtures 172, 174, 176, 178 to provide a desired amount of lighting to the desk 106 according to the identified activity. For example, the visible light sensor 180 may be configured to provide more lighting to the desk 106 when the user 192 is writing or typing at the desk 106 than when the user 192 is not occupying the room 102 or when the user 192 is performing another activity at the desk 106.

The visible light sensor 180 may also be configured to operate in the daylighting sensor mode to measure a lighting level (e.g., illuminance or luminance due to daylight and/or artificial light) at a location of the space. For example, the visible light sensor 180 may apply a digital mask to focus on a specific location in the space (e.g., on a task area, such as a surface or a table 106 as shown in FIG. 1) and may use a daylighting algorithm to measure the lighting level at the location. Since the camera of the visible light sensor 180 is directed towards the surface, the visible light sensor may be configured to measure the luminance (e.g., reflected light level) at the surface. The visible light sensor 180 may be configured to calculate lighting level levels using image data. Image data may include data associated with the lighting level and/or color of pixels in the image. The visible light sensor 180 may calculate the illuminance (e.g., lighting level shining on the surface) from the measured luminance using a conversion factor. The conversion factor may be determined during a calibration procedure of the visible light sensor 180. For example, the illuminance at the task surface may be measured by a light meter and may be transmitted to the visible light sensor 180. The visible light sensor 180 may be configured to measure the luminance at the surface and may be configured to determine the conversion factor as a relationship between the illuminance measured by the light meter and the luminance measured by the visible light sensor.

Figure 2E:
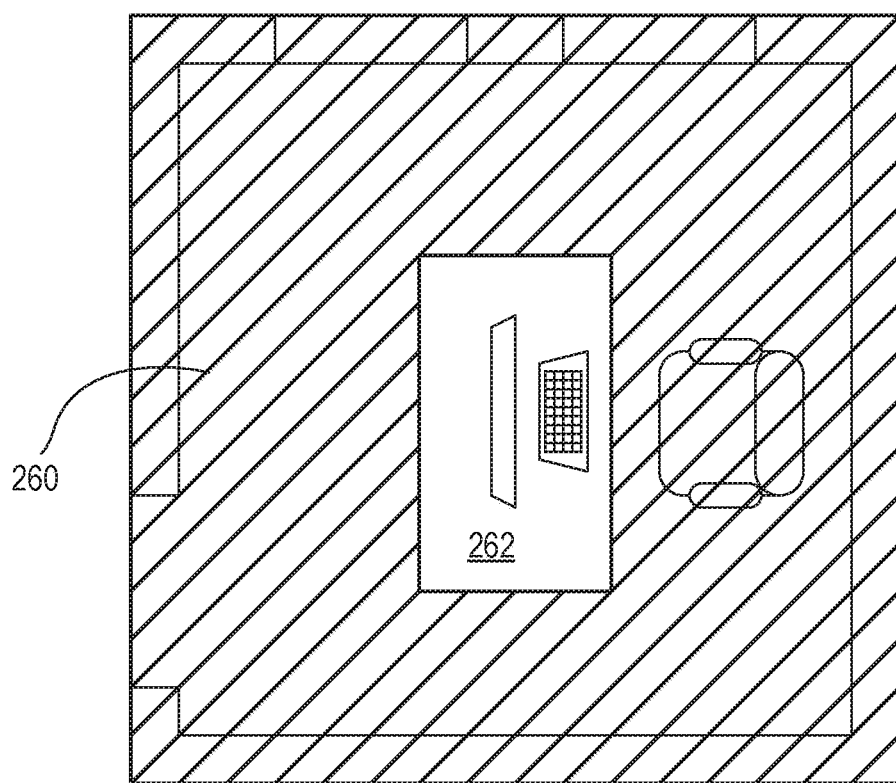

As shown in FIG. 2E, the visible light sensor 180 may be configured to apply a mask 260 to focus on a region of interest 262 that includes the surface of the desk 220. The visible light sensor 180 may be configured to integrate light intensities values of the pixels of the image across the region of interest 262 to determine a measured lighting intensity or color at the surface of the desk.

The visible light sensor 180 may disregard the objects within the room if it is determined that the objects are inconsistent with other objects within the room 102. For example, the visible light sensor 180 may disregard objects (e.g., one or more pieces of white paper, books, monitors, keyboards, computers, or other objects) located on the desk 220. The objects located on a desk 220 may be presented with brightness or color that is different from the brightness or color being reflected off of the desk 220 on which the objects are located. The visible light sensor 180 may determine that the objects on the desk 220 are not a part of the desk. Thus, when identifying attributes of the desk 220 (e.g., the size, shape, location, etc.), the visible light sensor 180 may mask the objects located on the desk 220. The objects on the desk 220 may be masked to control the load control system 100 according to the intensity or color reflected off of the uncovered portions of the desk 220.

Referring again to FIG. 1, the visible light sensor 180 may transmit digital messages (e.g., including the measured lighting intensity) to the system controller 110 via the RF signals 108 for controlling the intensities of the lighting loads (e.g., lighting loads in lighting fixtures 172, 174, 176, 178 and/or the lighting load in the floor lamp 142) in the load control environment 100 in response to the measured lighting intensity. The visible light sensor 180 may be configured to focus on multiple regions of interest in the image recorded by the camera and measure the lighting intensity in each of the different regions of interest. Alternatively, the visible light sensor 180 may transmit digital messages directly to the lighting control devices for the lighting loads (e.g., lighting control devices for the lighting fixtures 172, 174, 176, 178, plug-in load control device 140, etc.). The visible light sensor 180 may be configured to adjust certain control parameters (e.g., gain) based on the region of interest in which the lighting intensity is presently being measured. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR;

and U.S. Pat. No. 8,451,116, issued May 28, 2013, entitled WIRELESS BATTERY-POWERED DAYLIGHT SENSOR, the entire disclosures of which are hereby incorporated by reference.

The visible light sensor 180 may determine whether the lighting intensity at the region of interest is different (e.g., higher, lower) than a preferred total lighting intensity at the region of interest. For example, the visible light sensor 180 may be configured to determine if the lighting intensity presented on a user's task area (e.g., a desk 106, predefined distance around the user 192, monitor 166, etc.) is a preferred total lighting intensity. The preferred total lighting intensity may be provided as a default preferred total intensity. The preferred total lighting intensity may be provided by the user 192 (e.g., via mobile device 190 used by the user).

The system controller 110 may be configured to determine a degradation in the light output of one or more of the lighting loads (e.g., lighting loads in lighting fixtures 172, 174, 176, 178 and/or the lighting load in the floor lamp 142) in the space, and to control the intensities of the lighting loads to compensate for the degradation (e.g., lumen maintenance). For example, the system controller 110 may be configured to individually turn on each lighting load (e.g., when it is dark at night) and measure the magnitude of the lighting intensity at a location (e.g., on the table 106 or the desk 220). For example, the system controller 110 may be configured to turn on the lighting loads at night and control the visible light sensor 180 to record an image of the room, to apply a mask to focus on a region of interest that the lighting loads illuminate (e.g., the surface of table 106 or the desk 220), to measure the lighting intensity in that region of interest, and to communicate that value to the system controller 110. The system controller 110 may store this value as a baseline value. At a time and/or date thereafter, the system controller 110 may repeat the measurement and compare the measurement to the baseline value. If the system controller 110 determines there to be a degradation, it may control one or more of the lighting loads to compensate for the degradation, alert maintenance, etc.

Figure 2F:
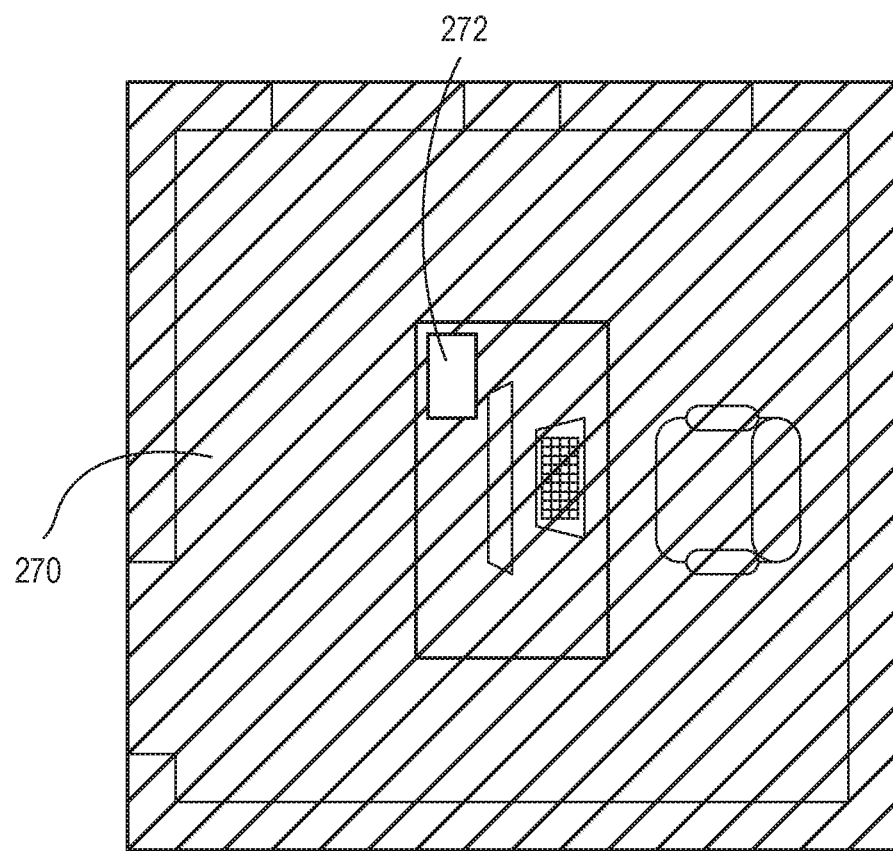

The visible light sensor 180 may also be configured to operate in the color sensor mode to detect a color (e.g., measure a color temperature) of the light emitted by one or more of the lighting loads in the space (e.g., to operate as a color sensor and/or a color temperature sensor). For example, as shown in FIG. 2F, the visible light sensor 180 may be configured to apply a mask 270 to focus on a region of interest 272 (that includes a portion of the surface of the desk 220) and may use a color sensing algorithm to determine a measured color and/or color temperature in the room 200. For example, the visible light sensor 180 may integrate color values of the pixels of the image across the region of interest 272 to determine the measured color and/or color temperature in the room 200. The region of interest 272 may include a portion of the desk having a known color (e.g., white), or a color wheel having colors for which RGB values may be identified.

Referring again to FIG. 1, the visible light sensor 180 may transmit digital messages (e.g., including the measured color temperature) to the system controller 110 via the RF signals 108 for controlling the color (e.g., the color temperatures) of the lighting loads (e.g., lighting loads in lighting fixtures 172, 174, 176, 178 and/or the light in the floor lamp 142) in response to the measured lighting intensity (e.g., color tuning of the light in the space). Alternatively, the visible light sensor 180 may transmit digital messages directly to the lighting loads. An example of a load control system for controlling the color temperatures of one or more lighting loads is described in greater detail in commonly-assigned U.S. Patent Application Publication No. 2014/0312777, published Oct. 23, 2014, entitled SYSTEMS AND METHODS FOR CONTROLLING COLOR TEMPERATURE, the entire disclosure of which is hereby incorporated by reference.

Figure 2G:
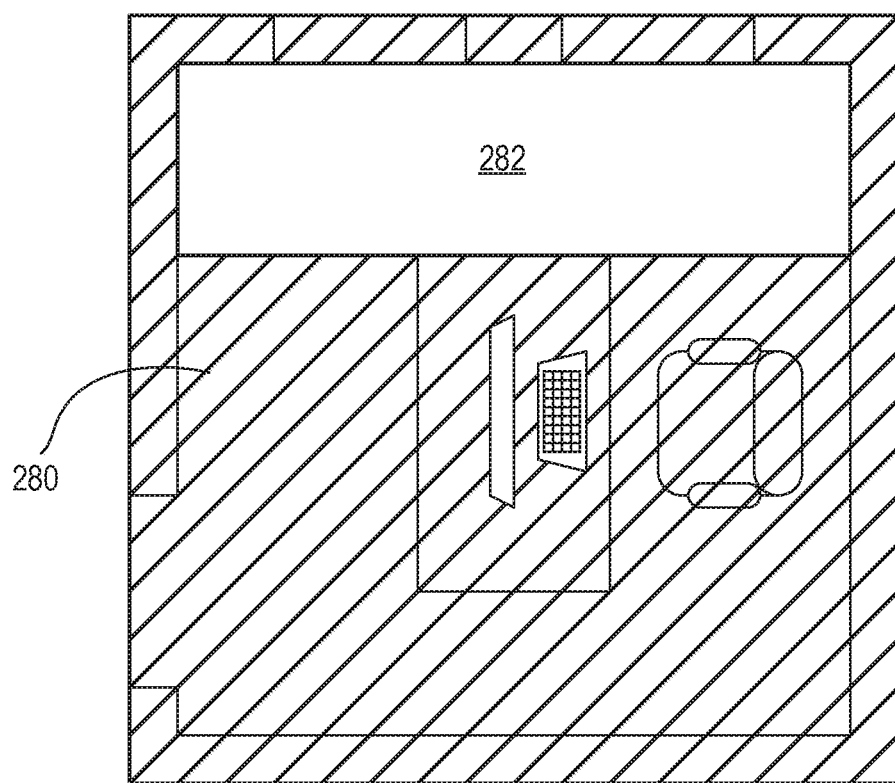

The visible light sensor 180 may be configured to operate in a daylight glare sensor mode. For example, the visible light sensor 180 may be configured execute a glare detection algorithm to determine a depth of direct sunlight penetration into the space from the image recorded by the camera. As shown in FIG. 2G, the visible light sensor 180 may be configured to apply a mask 280 to focus on a region of interest 282 on the floor of the room 200 near the windows 214 to detect the depth of direct sunlight penetration into the room.

Referring again to FIG. 1, the visible light sensor 180 may mask one or more objects in the room 102, besides the task area, when in the daylight glare sensor mode. For example, the masked images from the visible light sensor 180 may show the desk 106, keyboard 168, and monitor 166 when the visible light sensor 180 is in the daylight glare sensor mode. Also, or alternatively, the visible light sensor 180 may mask one or more objects in the room 102, outside of a predefined area around the task area, when in the daylight glare sensor mode. The visible light sensor 180 may retain the task area and/or the predefined area around the task area to determine whether sunlight penetration has reached the task area and/or the predefined area around the task area.

Based on a detection and/or measurement of the depth of direct sunlight penetration into the room, the visible light sensor 180 may transmit digital messages to the system controller 110 via the RF signals 108 to limit the depth of direct sunlight penetration into the space, for example, to prevent direct sunlight from shining on a surface (e.g., the table 106 or the desk 220). The system controller 110 may be configured to lower the window treatment fabric 152 of each of the motorized window treatments 150 to prevent the depth of direct sunlight penetration from exceeded a maximum sunlight penetration depth. Alternatively, the visible light sensor 180 may be configured to directly control the window treatments 150 to lower of the window treatment fabric 152. Examples of methods for limiting the sunlight penetration depth in a space are described in greater detail in commonly-assigned U.S. Pat. No. 8,288,981, issued Oct. 16, 2012, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference.

During daylight glare sensor mode, the visible light sensor 180 may be configured to control the covering material 152 of the motorized window treatments 150 to prevent daylight glare from reaching a region of interest, such as the user's task area. The visible light sensor 180 may determine whether an intensity of light presented at a region of interest is a preferred intensity of light. For example, a user 192 may desire that sunlight 196 be prevented from reaching a region of interest that is a task area (e.g., a desk 106, predefined distance around the user 192, monitor 166, etc.). The visible light sensor 180 may be configured to determine if an undesired amount of sunlight is being presented to a region of interest (e.g., task area) by comparing the lighting intensity and/or color temperature presented near a window 104 with the lighting intensity and/or color temperature presented on another portion of the room 102 that is away from a window 104. For example, it may be determined that the light presented near a window 104 is a result of sunlight 196 (e.g., based on the images, the color temperature of the light in the images, the control settings for the lighting fixtures near the window, etc.) and it may be determined that the light presented away from a window 104 is the result of sources of light other than sunlight 196 (e.g., based on the images, the color temperature of the light in the images, the control settings for the lighting fixtures away from the window, etc.).

The visible light sensor 180 may be configured to focus on daylight entering the space through, for example, one or both of the windows 104 (e.g., to operate as a window sensor). The system controller 110 may be configured to control the lighting loads (e.g., lighting loads in lighting fixtures 172, 174, 176, 178 and/or the light in the floor lamp 142) in response to the magnitude of the daylight entering the space. The system controller 110 may be configured to override automatic control of the motorized window treatments 150, for example, in response to determining that it is a cloudy day or an extremely sunny day. Alternatively, the visible light sensor 180 may be configured to directly control the window treatments 150 to lower of the window treatment fabric 152. Examples of load control systems having window sensors are described in greater detail in commonly-assigned U.S. Patent Application Publication No. 2014/0156079, published Jun. 5, 2014, entitled METHOD OF CONTROLLING A MOTORIZED WINDOW TREATMENT, the entire disclosure of which is hereby incorporated by reference.

The visible light sensor 180 may be configured to detect a glare source (e.g., sunlight reflecting off of a surface) outside or inside the space in response to the image recorded by the camera. The system controller 110 may be configured to lower the window treatment fabric 152 of each of the motorized window treatments 150 to eliminate the glare source. Alternatively, the visible light sensor 180 may be configured to directly control the window treatments 150 to lower of the window treatment fabric 152 to eliminate the glare source.

The visible light sensor 180 may also be configured to operate in the occupant count mode and may execute an occupant count algorithm to count the number of occupants a particular region of interest, and/or the number of occupants entering and/or exiting the region of interest. The occupant count algorithm may identify an environmental characteristics and/or may that trigger a sensor event for executing a control strategy. For example, the system controller 110 may be configured to control the HVAC system 162 in response to the number of occupants in the space. The system controller 110 may be configured to control one or more of the load control devices of the load control system 100 in response to the number of occupants in the space exceeding an occupancy number threshold. Alternatively, the visible light sensor 180 may be configured to directly control the HVAC system 162 and other load control devices.

The operation of the load control system 100 may be programmed and configured using, for example, the mobile device 190 or other network device (e.g., when the mobile device is a personal computing device). The mobile device 190 may execute a graphical user interface (GUI) configuration software for allowing a user to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the control settings of different load control devices of the load control system (e.g., the lighting fixtures 172, 174, 176, 178, the plug-in load control device 140, the motorized window treatments 150, and/or the thermostat 160). The load control database may comprise information regarding associations between the load control devices and the input devices (e.g., the remote control device 170, the visible light sensor 180, etc.). The load control database may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosure of which is hereby incorporated by reference.

A user 192 may configure the visible light sensor 180 to perform actions within one or more regions of interest the room 102 according to the daylight glare sensor mode, daylighting sensor mode, color sensor mode, occupancy/vacancy sensor mode, and/or occupancy count mode. For example, the user 192 may configure the visible light sensor 180 to set the total lighting intensity (e.g., artificial light and/or sunlight) to a preferred total illuminance on a task area, based on the user 192 entering the room 102, exiting the room 102, and/or residing within the room 102. The user 192 may additionally, or alternatively, configure the visible light sensor 180 to set the color temperature to a preferred color temperature, based on the user 192 entering the room 102, exiting the room 102, and/or residing within the room 102.

The user 192 may provide user preferences (e.g., total intensity preferences, color temperature preferences, etc.) using one or more input devices, such as mobile device 190. For example, in the daylight glare sensor mode, the user 192 may input a preferred amount of sunlight that may present on the user task area when the user 192 is entering the room 102, exiting the room 102, and/or residing within the room 102. In the daylighting sensor mode, the user 192 may input a preferred lighting intensity that lighting fixtures 172, 174, 176, 178 may present on the user task area (e.g., desk 106, monitor 166, a predefined area around user 192, etc.) when the user 192 is entering the room 102, exiting the room 102, and/or residing within the room 102. In the color sensor mode, the user 192 may input a preferred amount of color temperature that may present at the user task area when the user 192 is entering the room 102, exiting the room 102, and/or residing within the room 102.

An image may be provided to the visible light sensor 180, via the mobile device 190, so that the visible light sensor 180 may identify the user 192 entering the room 102, exiting the room 102, and/or residing within the room 102. The image may be recorded via a camera feature of the mobile device 190. The image may be provided by an external server that stores images of one or more users 192. For example, a company's database may include identification photographs of employees of the company. The visible light sensor 180 may be configured to receive the identification photographs for identification of a user 192. The visible light sensor 180 may also, or alternatively, be configured to record an image of the user 192 for identification of the user 192. For example, during configuration of the visible light sensor 180, the user 192 may provide user preferences to the visible light sensor 180. The visible light sensor 180 may record an image of the user 192 while the user 192 is configuring the visible light sensor 180. For example, the visible light sensor 180 may record an image of the user 192 while the user 192 is providing user preferences to the visible light sensor 180. In recording an image of the user 192 while the user 192 is configuring the visible light sensor 180, the visible light sensor 180 may make an association between the user 192 and the user preferences being used for configuration of the visible light sensor 180. The visible light sensor 180 may record a still image of the user 192. The visible light sensor 180 may record the user 192 performing a movement, such as walking within the room 102 and/or performing an action (e.g., typing on the keyboard 166 and/or writing on the desk 106) on the task surface or within a predefined distance of the task surface.

The visible light sensor 180 may comprise a second communication circuit for transmitting and receiving the RF signals 109 (e.g., directly with the mobile device 190 using a standard protocol, such as Wi-Fi or Bluetooth). During the configuration procedure of the load control system 100, the visible light sensor 180 may be configured to record an image of the space and transmit the image to the mobile device 190 (e.g., directly to the network device via the RF signals 109 using the standard protocol). The mobile device 190 may display the image on the visual display and a user 192 may configure the operation of the visible light sensor 180 to set one or more configuration parameters (e.g., configuration data) of the visible light sensor. For example, for different environmental characteristic to be sensed for performing control by the visible light sensor 180 (e.g., occupant movements, light level inside of the room, daylight level outside of the room), the user 192 may indicate different regions of interest on the image by tracing (such as with a finger or stylus) masked areas on the image displayed on the visual display. The visible light sensor 180 may be configured to establish different masks and/or control parameters depending upon the environmental characteristic to be sensed (e.g., occupant movements, light level inside of the room, daylight level outside of the room, color temperature, etc.).

After configuration of the visible light sensor 180 is completed at the mobile device 190, the mobile device 190 may transmit configuration data to the visible light sensor (e.g., directly to the visible light sensor via the RF signals 109 using the standard protocol). The visible light sensor 180 may store the configuration data in memory, such that the visible light sensor may operate appropriately during normal operation. For example, for each sensor event the visible light sensor 180 is to monitor, the mobile device 190 may transmit to the visible light sensor 180 the sensor mode for the event, one or more masks defining regions of interest for the event, possibly an indication of the algorithm to be used to sense the environmental characteristic of the event, and one or more control parameters for the event.

The configuration data may include a room identifier or other identifier that is stored for the configuration of the space. The configuration data for a given room identifier or other identifier of a space may be used as a template (e.g., a configuration template) for configuring the visible light sensor and/or load control within a similar space. A configuration template may be copied and applied to other spaces for performing load control. The configuration template may include similar masks, regions of interest, control strategies, etc.

The visible light sensor 180 may be configured to provide a predefined lighting intensity at one or more regions of interest. The predefined lighting intensity may be the same or different among the regions of interest. The visible light sensor 180 may identify the sunlight and/or the artificial light that comprises the lighting intensity provided to the one or more regions of interest within the room 102. The visible light sensor 180 may increase or decrease the lighting intensity, or change the color temperature, of the lighting fixtures 172, 174, 176, 178 on a gradient across the room (e.g., from the windows 104, the door 105, a projector screen, a television, or other presentation region).

The visible light sensor 180 may be configured to identify one or more of the regions of interest within the room 102 using objects located within the room 102. For example, the visible light sensor 180 may be configured to identify a task area (e.g., a desk 106) using the size, shape, and/or location of the desk 106. That is, if the visible light sensor 180 identifies an object having a predefined shape (e.g., rectangular or circular), size, and/or location within the room 102, the visible light sensor 180 may be configured to determine that the object is a desk. Predefined sizes and/or shapes may be stored in memory for comparison against the size of the objects identified in the images. The visible light sensor 180 may be configured to determine other objects within the room 102, for example, the door 105 and/or window 104, using the size, location, and/or orientation of the object. The visible light sensor 180 may determine that an object is a door 105 if the object is the predefined size of a door, located at a wall of the room 102, and/or the orientation of the object represents a predefined orientation of a door.

The visible light sensor 180 may be configured to determine a lighting intensity (e.g., sunlight, artificial light) that may be presented to one or more regions of interest. For example, the visible light sensor 180 may be configured to determine sunlight that may be presented to a region of interest. The visible light sensor 180 may be configured to determine the sunlight that may be presented to a region of interest during configuration of the load control system 100 and/or during use of the load control system 100. For example, the visible light sensor 180 may determine that an undesired amount of sunlight is being presented at a first region of interest, such as a user's task area, during configuration and/or control of the load control system 100. The visible light sensor 180 may determine the identification and/or location of a user task area by identifying a predefined location around the user 192. For example, the visible light sensor 180 may determine the identification and/or location of a user task area by identifying a predefined a location around the user 192 for a predefined period of time each day.

The visible light sensor 180 may determine the identification and/or location of a user task area automatically (e.g., using the size, location, and/or shape of the user area). For example, the visible light sensor 180 may define a desk 106 using predefined sizes, shapes, and/or colors of desks. The visible light sensor 180 may identify a particular user's task area using attributes of the task area, and/or the visible light sensor 180 may identify a particular user's task area using ancillary objects (e.g., photos, mugs) placed on the user's task area. The visible light sensor 180 may be configured to control (e.g., via control instructions) one or more control devices using the identification and/or location of the user's task area. For example, the visible light sensor 180 may be configured to determine the location of a user's task area and present (e.g., via control instructions) a preferred lighting intensity from lighting fixtures 172, 174, 176, 178 on the user's task area. The visible light sensor 180 may determine the location of a user's task area and control the covering material 152 of the motorized window treatments 150 so that a preferred amount of daylight glare is presented upon user's task area.

The visible light sensor 180 may be configured to determine whether a user's task area (e.g., desk 106, monitor 166, a predefined area around user 192, etc.) has moved. For example, the visible light sensor 180 may be configured to determine whether a desk 106 has moved from one side of the room 102 to another side of the room 102. The visible light sensor 180 may configured to determine whether one or more other task areas (e.g., desks 106, monitors 166, etc.) have been added to the room 102. For example, the visible light sensor 180 may be configured to compare a recorded image of the room 102 with one or more other recorded images (e.g., previously recorded images and/or subsequently recorded images) of the room 102 to determine whether there are differences, such as movements of task areas and/or additions of task areas, within the room 102. During configuration, the visible light sensor 180 may identify movement of a user, an occupant, furniture, a partition, and/or other objects within the room. The visible light sensor 180 may be configured to control one or more control devices based on movement of one or more of the task areas (e.g., based on movement of the desk 106, monitor 166, etc.). For example, if a user's task area is moved, the visible light sensor 180 may identify such movement and present the preferred lighting intensity and/or allow the preferred daylight glare at the updated location of the task area.

The fixtures within the different regions of interest may be identified by the location of the lighting levels within the image. Different fixtures may be mapped to different portions of the images generated from the visible light sensor 180. The dimming level in the different regions of interest may be adjusted by a predefined amount or may be adjusted to different dimming levels based on the difference in lighting levels identified between the different regions. For example, the visible lighting sensor 180 may change the dimming level of the lighting fixtures 174, 178 by 25% when the portion of the room 102 that includes the sunlight 196 is determined to be 25% brighter. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The visible light sensor 180 may be configured to determine one or more regions of interest (e.g., zones) within the room 102 by determining the location of control devices positioned within the room 102. For example, the visible light sensor 180 may be configured to determine that lighting control devices that provide a lighting load preferred for presentations are positioned at a particular location within the room 102. The visible light sensor 180 may be configured to identify the presentation lighting loads for a presentation area and determine (e.g., automatically determine) that the location of the presentation lighting loads is located within a presentation region of interest. The visible light sensor 180 may be configured to identify one or more motorized window treatments 150 and determine (e.g., automatically determine) that the location of the motorized window treatments 150 may receive additional lighting intensity (e.g., sunlight).

The visible light sensor 180 may be configured to determine that the lighting control devices that have the same intended function are grouped together in a region of interest (e.g., a zone). For example, a group of functional lighting fixtures within a predefined distance of the windows may be grouped together in a daylighting zone. The visible light sensor 180 may be configured to determine that the lighting control devices that illuminate a portion of the room 102 are grouped together in a region of interest (e.g., a zone). For example, a group of lighting fixtures that illuminate a task area (e.g., desks 106, monitors 166, etc.) are grouped together in a zone. The visible light sensor 180 may be configured to determine that the lighting control devices located near (e.g., within a predefined distance) an object or affecting the lighting level of an object are grouped together in a region of interest (e.g., a zone).

The visible light sensor 180 may be configured to operate in an occupancy/vacancy sensor mode. In the occupancy/vacancy sensor mode, the visible light sensor 180 may be configured to determine an occupancy/vacancy condition (e.g., an environmental characteristic) of one or more regions of interest. For example, the visible light sensor 180 may determine an occupancy/vacancy condition of one or more regions of interest based on detecting a presence or motion, or a lack of presence or motion, in the images captured in the regions of interest. The visible light sensor 180 may determine an occupancy/vacancy condition using one or more algorithms and/or image analysis techniques. For example, the visible light sensor 180 may determine an occupancy/vacancy condition using background subtraction and/or background maintenance, as described herein. The visible light sensor 180 may identify an occupancy/vacancy condition of one or more regions of interest and control a load control device in response to the occupancy/vacancy condition. For example, the visible light sensor 180 may identify an occupancy condition in the room 102 when the user 192 and/or the mobile device 190 enters the room 102 and may send control instructions to the lighting fixtures 172, 174, 176, 178, the plug-in load control device 140, the motorized window treatments 150, and/or the thermostat 160 for controlling an electrical load in response to the occupancy condition. Examples of RF load control systems having occupancy/vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The visible light sensor 180 may fail to identify an occupancy condition based on a movement and/or user presence detected within one or more of the regions of interest in which the visible light sensor 180 is disregarding. For example, the visible light sensor 180 may apply a mask to a doorway and when identifying an occupancy condition the visible light sensor 180 may exclude movement and/or users at the doorway. If a user is not present within the room 102 and is standing outside of the doorway, the visible light sensor 180 may fail to identify an occupancy condition within the room 102. The visible light sensor 180 may determine when the user moves outside of the masked area and into the region of interest in which the visible light sensor 180 is configured to determine an occupancy/vacancy condition. The masking of the doorway, windows, and/or other transparent spaces in the room 102 may prevent a false identification of objects outside of the doorway, windows, and/or other transparent spaces.

The visible light sensor 180 may be configured to turn the lighting loads (e.g., lighting fixtures 172, 174, 176, 178) on and off in response to detecting an occupancy condition and a vacancy condition, respectively. The visible light sensor 180 may operate as a vacancy sensor, such that the lighting loads are turned off in response to detecting a vacancy condition (e.g., and not turned on in response to detecting an occupancy condition).

The visible light sensor 180 may be configured to identify movements within a region of interest at a higher sensitivity than movements in one or more other regions of interest. For example, the visible light sensor 180 may be configured to be more sensitive to movements in an area around a user's task surface (e.g., keyboard) than in an area that is less often used by the user 192. The visible light sensor 180 may be configured to increase the sensitivity to identify fingers moving on a keyboard 168 and/or a user 192 writing on desk 106, for example. The visible light sensor 180 may be unable to detect such minor motion in one or more other regions of interest within the room 102 to prevent false indications of occupancy. If the visible light sensor 180 identifies movement in the regions of interest in which the visible light sensor 180 is more sensitive, the visible light sensor 180 may adjust the fixtures 172, 174, 176, 178 to provide increased lighting to the sensitive areas (e.g., keyboard 168).

The visible light sensor 180 may be configured to determine an occupancy/vacancy condition in the room 102 in response to a user moving into a region of interest or out of a region of interest. For example, a first region of interest may be a bed, an office, or a user task area. A second region of interest may be a path from the first region of interest to a door and/or another room (e.g., an office, a bathroom, etc.). The visible light sensor 180 may be configured to identify zones of lights as being the lights in and/or between regions of interest. The visible light sensor 180 may define the lighting fixtures in the zones in response to a user moving from one location to another (e.g., during a configuration procedure or after identification of such a user movement a predefined number of times). For example, the visible light sensor 180 may be configured to identify the path of a user from a bed to the bathroom. The visible light sensor 180 may be configured to define the lighting fixtures in the areas along the user's path in the same zone for lighting control. The visible light sensor 180 may increase the light intensities provided by the lighting fixtures in response to a user moving in the direction of one of the regions of interest defined in the zone.

The visible light sensor 180 may be used with a passive infrared sensor (PIR) 182. The PIR sensor 182 may be an electronic device that measures infrared (IR) light radiating from one or more objects in the field of view of the PIR sensor 182. The PIR sensor 182 may be used to identify motion within the field of view of the PIR sensor 182. The PIR sensor 182 may consume less power than the visible light sensor 180 and the PIR sensor 182 may be used to detect an occupancy/vacancy condition in the occupancy/vacancy sensor mode. For example, the PIR sensor 182 may be a low-energy occupancy sensing circuit.

The PIR sensor 182 and the visible light sensor may operate in cooperation, as each sensor may identify different types of information. For example, the PIR sensor 182 may operate to trigger the visible light sensor 180, as the PIR sensor 182 may reduce the number of false identifications of occupancy. The PIR sensor 182 may operate to trigger the visible light sensor 180 so that the visible light sensor 180 may be begin recording images and/or controlling one or more control devices within room 102. As the visible light sensor 180 may operate to detect occupancy by the movement of objects within images, the movement of objects other than a user may trigger an occupancy condition at the visible light sensor 180. The PIR sensor 182, however, may detect movement of a user in a room using infrared signals. The infrared signals may be used to trigger the visible light sensing circuit, which may more accurately track objects after occupancy has been determined. For example, an infrared signal may cause the lighting fixtures to turn off when a user makes little or no movement (e.g., minor motion events) for a period of time. The visible light sensor may be able to identify the presence of the user in the images, even though the user may make little or no movement (e.g., minor motion events) for a period of time.

The visible light sensor 180 may conserve power and/or storage used to store images by enabling a visible light sensing circuit when movement is detected by the PIR sensor 182. When movement is detected by the PIR sensor 182, the visible light sensing circuit may be enabled for generating images of the space and detecting users and/or movement. The visible light sensing circuit may operate in place of, or in addition to, the PIR sensor 182 for identifying occupancy and/or vacancy conditions. For example, when the power source to the visible light sensor 180 is a battery, the use of the PIR sensor 182 may limit the increased consumption of power that may be caused by the use of the visible light sensing circuit.

The visible light sensor 180 may use the PIR sensor 182 to assist in identifying users and/or movement in one or more different settings. For example, the visible light sensor 180 may use the PIR sensor 182 in the room 102 to determine occupancy during low light conditions. The PIR sensor 182, for example, may be used to identify a user 192 in bed at night. The visible light sensor 180 may use the PIR sensor 182 if a daylight glare condition prevents and/or decreases the visible light sensor 180 from identifying an occupancy/vacancy condition.

The visible light sensor 180 may identify the presence of a user 192 and the PIR sensor 182 may be used to identify the movement of the user 192. For example, the visible light sensor 180 may identify a user getting into bed and/or the PIR sensor 182 may identify when the user 192 is waking from the bed (e.g., based on a movement of the user 192). The visible light sensor 180 may control one or more control devices (e.g., fixtures 172, 174, 176, 178) based on the user getting into bed and/or waking from bed. For example, the visible light sensor 180 may adjust the control devices using one or more scenes, such as a wakeup scene. A wakeup scene may include, for example, high energy music being played and/or the lighting fixtures 172, 174, 176, 178 incrementally increasing the lighting intensity provided within the room 102.

The visible light sensing circuit of the visible light sensor 180 may be disabled and the PIR sensor 182 may be enabled after a period of time of vacancy in a region of interest. When the PIR sensor 182 detects an occupancy condition in the room 102, the PIR sensor 182 may be configured to enable the visible light sensor 180 to generate images and identify a continued occupancy condition or a vacancy condition. The PIR sensor 182 may enable the visible light sensing circuit of the visible light sensor 180 immediately after detecting an occupancy condition in the room 102. If the visible light sensor 180 is enabled, the visible light sensor 180 may be configured to control one or more control devices based on the occupancy/vacancy condition. For example, the visible light sensor 180 may be configured to determine a user 192 is occupying a region of interest and the visible light sensor 180 may be configured to provide lighting (e.g., from lighting fixtures 172, 174, 176, 178) at the region of interest. The visible light sensor 180 may use the PIR sensor 182 to operate similarly to a daylight sensor. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The visible light sensor 180 may operate in a hospital to configure zones between regions of interest for patients. For example, the visible light sensor 180 may identify movement of a patient from a bed to a bathroom and may configure the lighting fixtures along the path in the same zone for lighting control. The zone may be turned on and/or controlled to a predefined dimming level when the patient is identified as moving in along the path of the defined zone. The visible light sensor 180 10 may be configured to provide an alert, such as a bedside alarm (e.g., flashing the lighting fixtures if an immobile patient attempts to get out of a hospital bed).

If the user 192 is exhibiting a sleep condition (e.g., lack of movement for a predetermined amount of time and/or eyes closed for a predetermined amount of time), the visible light sensor 180 may identify that the user 192 is in a sleep condition and the visible light sensor 180 may transmit a digital message (e.g., including control instructions) to the lighting control devices to reduce the dimming level or turn off the lights. If the user 192 is exhibiting a sleep condition, the motorized window treatments 150 may be lowered to a predefined level or to a fully closed position. If the user 192 is exhibiting a sleep condition, the thermostat 160 may be lowered. If the user 192 is exhibiting a sleep condition, the color temperature of the lighting fixtures 172, 174, 176, 178 may be changed to a warmer (e.g., redder) color temperature to help the user 192 go to sleep, or the color temperature of the lighting fixtures 172, 174, 176, 178 may be changed to a cooler (e.g., bluer) color temperature to help the user 192 stay awake and productive.

If the user 192 is exhibiting an alert condition (e.g., the user 192 is moving for a predefined amount of time and/or the user's eyes are open for a predetermined amount of time), the visible light sensor 180 may determine that the user is in an awake condition and the visible light sensor 180 may transmit a digital message to the lighting control devices to increase the dimming level or turn on the lights. If the user 192 is exhibiting an alert condition, the motorized window treatments 150 may be raised to a predefined level or to a fully opened position, the thermostat 160 may be increased, and/or the color temperature of the lighting fixtures 172, 174, 176, 178 may be changed to a cooler (e.g., bluer) color temperature to help the user 192 stay awake and productive.

The visible light sensor 180 may determine an emergency condition and may control the load control devices in response to the emergency condition. For example, the visible light sensor 180 may identify a user performing an emergency gesture (e.g., waving hands in a predefined manner, moving a mouth in a predefined manner, etc.). The visible light sensor 180 may identify an emergency condition (e.g., the user having fallen, the user bleeding, the user not breathing, etc.). The visible light sensor 180 may determine that there is in an emergency condition using the user's gesture and/or the user's condition. The visible light sensor 180 may transmit a digital message (e.g., including control instructions) to one or more load control devices to provide an emergency signal. For example, the visible light sensor 180 may send a signal to the lighting fixtures 172, 174, 176, 178 to flash on and off or change the color temperature of the lighting fixtures 172, 174, 176, 178 if an emergency condition is detected. The visible light sensor 180 may be configured to send a digital message to caregivers and/or to notify emergency personnel based on the detection of an emergency condition.

The visible light sensor 180 may be configured to generate images that identify individual users. The visible light sensor 180 may identify a user entering, exiting, performing a task, and/or residing within the room 102 using one or more recognition techniques, such as facial recognition, gait recognition, body-type recognition, and/or another image recognition technique. For example, the visible light sensor 180 may be configured to identify a user using the user's facial features identified in the generated images. The visible light sensor 180 may be configured to identify a user using a feature-based approach to facial recognition. In the feature-based approach, the visible light sensor 180 may analyze the image to identify, extract, and/or measure facial features (e.g., distinctive facial features) of the user. For example, the visible light sensor 180 may analyze the image to identify, extract, and/or measure the eyes, mouth, nose, etc., of a user. Using the facial features identified, extracted, and/or measured, the visible light sensor 180 may be configured to compute one or more geometric relationships among the facial features. By computing the geometric relationships among the facial features, the facial features may be converted to a vector of geometric features. Statistical pattern recognition techniques may be employed to match faces using the geometric features. The visible light sensor 180 may also, or alternatively, be configured to identify a user by the speed of the user's gait and/or the length of the user's gait. The visible light sensor may be configured to identify a user who is entering, exiting, performing a task, and/or residing within the room 102.

The visible light sensor 180 may be mounted in one or more locations (e.g., on a wall) and/or orientations to provide an ability to identify a user. For example, a visible light sensor 180 mounted on the wall of the room 102 may be in a better position to identify a user using facial recognition than a visible light sensor 180 that is mounted on the ceiling. One or more visible light sensor 180 devices may be used together to provide a composite identification of a user. For example, a wall mounted visible light sensor 180 may be configured to identify a front profile of a user 192 and a ceiling mounted visible light sensor 180 may be configured to identify a top profile of the user 192. The visible light sensor 180 mounted on the ceiling may better identify the gait of the user. The visible light sensor 180 may be configured to combine the front profile and the top profile of the user to create a composite profile of the user.

The visible light sensor 180 may be configured to control one or more load control devices based the identity of the user 192. For example, the user 192 may desire that a region of interest (e.g., the user's desk 106 area) be provided with a predefined intensity of light, a predefined color temperature of light, and/or a predefined temperature. The visible light sensor 180 may identify when the user 192 enters and/or exits the room 102. The visible light sensor 180 may adjust the lighting fixtures 172, 174, 176, 178 to predefined light intensities and/or color temperatures, using the identity of the user 192. The visible light sensor 180 may adjust the HVAC 162 to a predefined temperature and/or the covering material 152 of the motorized window treatments 150 to predefined settings, using the identity of the user 192 entering, exiting, performing a task, and/or residing in room 102. For example, the visible light sensor 180 may adjust the load control devices to an energy saving setting and/or another preferred setting when the room 102 is vacant.

The visible light sensor 180 may be configured to operate in a daylighting sensor mode. For example, the visible light sensor 180 may be configured to identify an amount of total lighting intensity in the areas of the room 102 controlled by the lighting fixtures 172, 174, 176, 178 and control the dimming level of each of the lighting fixtures 172, 174, 176, 178 to maintain an overall lighting level in the room 102. The total lighting intensity may be determined using one or more algorithm or image analysis techniques. For example, the total lighting intensity may be determined from a red, green, and blue (RGB) image. Using the RGB image, the total lighting intensity may be defined as (0.299*R+ 0.587*G+0.114*B).

The visible light sensor may determine the total lighting intensity of the room 102, or areas within the room 102 (e.g., including artificial light provided by one or more of the lighting control devices located within the room 102 and/or the light provided by the sunlight 196) and adjust the dimming level of the lighting fixtures 172, 174, 176, 178 to enable an overall lighting level to be obtained. The visible light sensor 180 may determine whether the intensity of light in the room 102 is uniform and adjust the dimming level of one or more of the lighting fixtures 172, 174, 176, 178 to obtain a uniform total lighting level in the room 102. The intensity of light provided by the lighting fixtures 172, 174, 176, 178 may not be uniform for one or more reasons, such as improper settings of the lighting control devices, sunlight 196 entering the room 102, one or more of the lighting fixtures 172, 174, 176, 178 being in improper working order, etc. The visible light sensor 180 and/or the system controller 110 may be configured to transmit an RF signal to the lighting fixtures 172, 174, 176, 178 to provide a preferred and/or recommended lighting intensity within the room 102. For example, the visible light sensor 180 may be configured to transmit RF signals 108 to provide a uniform lighting intensity throughout the room 102.

The visible light sensor 180 may transmit digital messages (e.g., including the measured lighting intensity) via the RF signals 108. For example, the visible light sensor 180 may transmit digital messages (e.g., indications of environmental characteristics, from which control instructions may be generated) to the system controller 110 for controlling the intensities of the lighting fixtures 172, 174, 176, 178 in response to the measured lighting intensity. The measured lighting intensity may be identified in different portions of the room 102 based on a relative difference in lighting level identified in the generated images. The visible light sensor 180 may identify the lighting intensity (luminance) in one or more portions of the room 102 by performing an integration technique. For example, the visible light sensor 180 may integrate across a portion of the room 102. The visible light sensor 180 may identify the relative difference in lighting level in the image by determining the lighting intensity (luminance) of the portions of the room 102 and averaging the lighting intensity (luminance) of one or more of the pixels in the selected portions.

The visible light sensor 180 may identify portions of the generated images that include reflected light that is brighter than other portions of the room by a predefined amount. For example, the visible light sensor 180 may identify the sunlight 196 entering the room 102 and dim the lighting fixtures 174, 178 and/or a LED light source on the portion of the room 102 that is affected by the sunlight 196. The visible light sensor 180 may be configured to focus on one or more regions of interest in the image recorded by the camera and measure the relative difference in lighting intensity in each of the different regions of interest generated by the images.

The visible light sensor 180 may be configured to disregard one or more regions of interest in the image recorded by the camera so that lighting intensity in each of the disregarded regions of interest are not considered when performing control. The visible light sensor 180 may adjust the control parameters (e.g., gain) of light sources, based on the region of interest in which the lighting intensity is presently being measured. The visible light sensor 180 may transmit digital messages (e.g., including control instructions) to the system controller 110 for adjusting the lighting fixtures 172, 174, 76, 178 to a preferred lighting intensity, and/or the visible light sensor 180 may transmit digital messages to the system controller 110 for adjusting the lighting fixtures 172, 174, 76, 178 to a uniform lighting intensity.

The fixtures within the different regions of interest may be identified by the location of the lighting levels within the image. Different fixtures may be mapped to different portions of the images generated from the visible light sensor 180. The dimming level in the different regions of interest may be adjusted by a predefined amount or may be adjusted to different dimming levels based on the difference in lighting levels identified between the different regions. For example, the visible lighting sensor 180 and/or the system controller 110 may change the dimming level of the lighting fixtures 174, 178 by 25% when the portion of the room 102 that includes the sunlight 196 is determined to be 25% brighter. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The visible light sensor may determine a baseline amount of total light (e.g., artificial light and/or sunlight) present within the room 102, or portions thereof, by analyzing the brightness of generated images. The baselines may allow the visible light sensor 180 to identify changes in lighting levels within the room 102 for enabling control according to the identified lighting levels. The baseline amount of light may operate during the daylighting sensor mode and/or the daylight glare sensor mode.

The baseline amount of light may be a zero light level, a full light level, and/or a number of interval light levels that may fall between zero light level and full light level. For example, the visible light sensor 180 may determine a baseline having zero light by recording an image of the room 102 with the lighting loads in an off state and sunlight being absent from the room 102 (e.g., at nighttime). The visible light sensor 180 may determine a baseline having zero artificial light by recording an image of the room 102 with the lighting loads in an off state and the covering material 152 of the motorized window treatments 150 in a fully closed state (e.g., during the day). The visible light sensor 180 may determine a baseline having a full artificial light level by recording an image of the room 102 at a time when one or more of the lighting loads are turned on to their full dimming level (e.g., 100% intensity). The visible light sensor 180 may determine a baseline at a full light level by recording an image of the room 102 at a time when one or more of the lighting loads are turned on to their full dimming level (e.g., 100% intensity) and when the covering material 152 of the motorized window treatments 150 are in a closed state and/or open state.

Baseline intervals (e.g., 10%, 20%, 30%, etc., intensities) of artificial light within the room 102 may be provided using one or more combinations of on states of lighting loads within room 102. The visible light sensor 180 may determine baselines having different baseline intervals by recording an image of the room 102 at times in which one or more of the lighting loads are turned on to the respective intervals (e.g., 10%, 20%, 30%, etc., intensities) and when the covering material 152 of the motorized window treatments 150 are in a closed state and/or an open state.

Baseline intervals of artificial light may be provided within one or more regions of interest. For example, baseline intervals may be provided on a user's task area (e.g., a user's desk 106) and/or other regions of interest. The visible light sensor 180 may record one or more images of the room 102 while light sources cycle through lighting intensity levels. For example, the visible light sensor 180 may record images of the room as one or more of lighting fixtures 172, 174, 176, 178 cycle through an increasing lighting intensity of 10%, 25%, 30%, 50%, etc. The lighting fixtures 172, 174, 176, 178 may receive a command (e.g., including control instructions) from the system controller 110 to cycle through the dimming levels (e.g., resting on each dimming level for a period of time or increasing dimming levels over a period of time), or may receive commands (e.g., including control instructions) from the system controller 110 to change from each dimming level. The commands (e.g., including control instructions) may be triggered from the mobile device 190.

The visible light sensor 180 may record an image of the room 102 and determine whether the image of the room 102 is equivalent to one or more baseline images of the room 102. The baseline images may be used to determine target intensity levels, target color levels, color shifts, daylight contribution, etc. For example, the visible light sensor 180 may determine if an amount of light presented within the room 102 is equal to a baseline amount of light recorded within the room 102. If the amount of light is different than a baseline, the visible light sensor 180 may identify the baseline that is the closest to the current lighting level.

The visible light sensor 180 may determine if the light within the room 102 differs from a preferred baseline amount of light within the room 102 by comparing the amount of light within the room 102 with the baseline amount of light within the room. The visible light sensor 180 may control the lighting loads (e.g., lighting fixtures 172, 174, 176, 178) and/or the motorized window treatments 150 to achieve a preferred lighting level that is equivalent to, or greater than, a previously recorded baseline.

The visible light sensor 180 may equate the baseline lighting intensity with a preferred lighting intensity within a space. The preferred artificial lighting intensity may be a lighting intensity defined by a user. For example, the user 192 may prefer a predefined lighting intensity at the users' task area (e.g., a desk 106, a monitor 166, a predefined area around the user 192). The visible light sensor 180 may record an image of the user's task area and determine whether a preferred amount of light is provided to the user's task area. The visible light sensor 180 may determine whether a preferred amount of light is provided to the user's task area by comparing the lighting intensity to a baseline lighting intensity identified as the preferred lighting intensity within the space. If an undesired amount of lighting intensity is provided to the user's task area, the visible light sensor 180 may send a digital message (e.g., including control instructions) to a lighting control device (e.g., light fixtures 174, 178) or motorized window treatments 150 to provide additional or lesser lighting to the user's task area.

The visible light sensor 180 may determine a baseline amount of sunlight presented within a space, using an image. The baseline amount of sunlight may be zero sunlight intensity, full sunlight intensity, and/or a number of intervals that may fall between zero sunlight intensity and full sunlight intensity. For example, the visible light sensor 180 may determine a baseline having zero sunlight intensity by recording an image of the room 102 when sunlight is absent (e.g., at nighttime) and/or the visible light sensor 180 may determine a baseline having zero sunlight by recording an image when the covering material 152 of the motorized window treatments 150 are in a fully closed state. The visible light sensor 180 may determine a baseline having full sunlight intensity by recording an image of the room 102 at a time during the day in which sunlight is predicted to be at a full potential (e.g., using a time of day, time of year, location of the building, direction of the windows 104, position of the sun in the sky, weather conditions, etc.) and/or when the covering material 152 of the motorized window treatments 150 are in an open state.

The visible light sensor 180 may be configured to determine baseline intervals (e.g., 10%, 20%, 30%, etc.) of sunlight within the room 102. Each interval may be detected within the images generated by the visible light sensor by identifying incrementally brighter images as sunlight enters the room 102. Baseline intervals of sunlight within the room 102 may be provided using one or more combinations of secondary conditions that may affect the presence of sunlight (e.g., a time of day, time of year, location of the building, direction of the windows 104, position of the sun in the sky, weather conditions, etc.). Also, or alternatively, baseline intervals of sunlight within the room 102 may be provided using one or more positions of the covering material 152 of the motorized window treatments 150. For example, baseline intervals may be provided in the room 102 at a time of the day in which the sun is predicted to provide full sunlight and/or at which the covering material 152 of the motorized window treatments 150 are closed a predefined amount. The visible light sensor 180 may record one or more image of the room 102 during times of different sunlight strengths and/or using the covering material 152 of the motorized window treatments 150 being opened to different amounts (e.g., opened to 10%, 30%, 50%, 70%, 90% capacity).

The visible light sensor 180 may record an image of the room 102 and determine whether the image of the room 102 is equivalent to one or more baseline images of the room 102. The baseline image of the room 102 may relate to a baseline lighting intensity present within one or more regions of interest within the room 102. For example, the visible light sensor 180 may determine if an amount of sunlight present within one or more regions of interest within the room 102 differs from a baseline amount of sunlight presented at the one or more regions of interest within the room 102. The visible light sensor 180 may determine if the sunlight presented within the room 102 differs from the previously captured baseline amount of sunlight presented within the room 102 by comparing the images. For example, the visible light sensor 180 may determine whether the sunlight in one or more regions of interest within the room 102 has increased, decreased, or stayed the same from a previously captured amount of sunlight presented within the room 102.

The visible light sensor 180 may control the motorized window treatments 150 so that the amount of sunlight 196 present within one or more regions of interest within the room 102 is a preferred amount of sunlight presented within the one or more regions of interest. The visible light sensor 180 may control the motorized window treatments 150 so that the amount of sunlight 196 present within one or more regions of interest within the room 102 is the same, or similar to, a baseline that is stored as having the preferred amount of sunlight. The baseline may be defined during configuration of the load control system 100 and/or updated during (e.g., on a daily, monthly, etc., basis). The visible light sensor 180 may send digital messages (e.g., including control instructions) to the motorized window treatments 150 to adjust the covering material 152 of the motorized window treatments 150 until the preferred amount of sunlight is reached. During adjustment of the covering material 152, the visible light sensor 180 may record images of the room 102 to identify the amount of sunlight present within the one or more regions of interest and the digital messages may continue to be transmitted to continue adjusting the covering material 152, or the covering material 152 may continue to be adjusted until receiving a digital message to stop adjustment.

The visible light sensor 180 may equate the baseline lighting intensity with a preferred lighting intensity of a light source within the room 102. The preferred lighting intensity may be a lighting intensity defined by a user, such as user 192. For example, the user may desire that sunlight be minimized within the room 102 (e.g., due to a heightened sensitivity to sunlight and/or a heightened privacy expectation). That is, the preferred lighting intensity and/or color temperature may be a lighting intensity and/or color temperature with minimized sunlight, e.g., with the covering material 152 of the motorized window treatments 150 being fully closed. The user may desire that a predefined amount of lighting intensity be present within the room 102 and may set the predefined amount of lighting intensity to a baseline lighting intensity.

The visible light sensor 180 may determine if a total lighting intensity present within the room 102 differs from the baseline lighting intensity by comparing the total lighting intensity present within the room 102 with the baseline lighting intensity. The visible light sensor 180 may control the covering material 152 of the motorized window treatments 150 so that the sunlight provided to the room 102 is equivalent to the user's preferred amount of sunlight. The dimming level of the lighting fixtures 172, 174, 176, 178 may be set to achieve a preferred total lighting intensity in the room 102. The amount of power used by the lighting fixtures 172, 174, 176, 178 may be reduced by allowing a greater level of sunlight into the room 102. The daylight glare may be minimized by reducing the level of the covering material 152 of the motorized window treatments 150 and the reduced lighting intensity may be compensated for by the light provided by the lighting fixtures 172, 174, 176, 178.

The visible light sensor 180 may identify a region of interest in which lighting intensity resulting from sunlight 196 may meet the lighting intensity resulting from other sources (e.g., lighting fixtures 172, 174, 176, 178). For example, the visible light sensor 180 may identify a point and/or a line at which sunlight may cease to enter the room 102 (e.g., due to the level of the covering material 152 on the motorized window treatments 150). The visible light sensor 180 may be configured to adaptively determine whether lighting intensity resulting from sunlight presented at a region of interest (e.g., task area) is a preferred intensity of light. The visible light sensor 180 may be configured to control one or more devices based on whether the lighting intensity resulting from sunlight present at the region of interest (e.g., task area) is a preferred intensity of light. For example, the visible light sensor 180 may be configured to determine the location of a user's task area and the preferred lighting intensity resulting from sunlight at the task area. The visible light sensor 180 may adjust the covering material 152 on the motorized window treatments 150 so that the lighting intensity resulting from sunlight presented on the user's task area is similar to and/or equivalent to the preferred intensity of sunlight at the task area.

A user may desire that sunlight be present within the room 102, but that the sunlight be prevented from one or more regions of interest within the room 102. For example, a user may desire that sunlight be present within the room 102 but the sunlight prevented from a user area (e.g., desk 106) of the room 102. The visible light sensor 180 may control the motorized window treatments 150 to determine the level at which the covering material 152 may be opened to provide sunlight at one or more regions of interest and prevent sunlight at one or more regions of interest. The visible light sensor 180 may consider secondary conditions (e.g., a time of day, time of year, location of the building, direction of the windows 104, position of the sun in the sky, weather conditions, etc.) in determining the amount of which the covering material 152 may be opened to provide sunlight at one or more regions of interest and prevent sunlight at one or more regions of interest. For example, the visible light sensor 180 may determine that on a cloudy day, in June, at 1:00 p.m., the covering material 152 of the motorized window treatments 150 should be closed 40% so that sunlight 196 is prevented from reaching the desk 106. The visible light sensor 180 may determine whether a user task area (e.g., desk 106, monitor 166, predefined area around the user 192, etc.) is moved and the visible light sensor 180 may control the motorized window treatments 150 so that sunlight 196 is prevented from reaching the user task area.

The visible light sensor 180 may be configured to adjust one or more lighting fixtures 172, 174, 176, 178 so that the lighting intensity present at a region of interest is equal to a preferred or recommended lighting intensity. The preferred lighting intensity may be defined by a user 192. The recommended lighting intensity may be defined by the manufacturer or lighting designer. The preferred lighting intensity and/or the recommended lighting intensity may be defined when the load control system 100 is being configured and may be updated during operation.

The visible light sensor 180 may define the preferred lighting intensity to be used within the room 102 after identifying the user. For example, the visible light sensor 180 may identify the user 192 via an image of the user 192 within the room 102, via a mobile device 190 used by the user 102 within the room 102, and/or using another identification procedure (e.g., via audio identification, login identification, etc.). The visible light sensor 180 may be configured to transmit a digital message to the lighting fixtures 172, 174, 176, 178 so that the lighting fixtures 172, 174, 176, 178 may present light intensities that correspond to the preferred lighting intensity of the user 192. For example, the visible light sensor 180 may be configured to transmit a digital message to lighting fixture 174 and lighting fixture 178 to provide additional lighting to the user's keyboard 168 and/or desk 106, if such lighting is preferred by the user 192.

The visible light sensor 180 may be configured to adjust lighting sources to compensate for additional or deficient artificial lighting or natural lighting (e.g., sunlight). For example, an increased lighting intensity, such as by sunlight 196, may be provided by a window 104. To compensate for the increased lighting intensity provided by the window 104, the visible light sensor 180 may be configured to adjust lighting loads within a predefined distance of the window 104 (e.g., during the daylighting sensor mode). For example, the visible light sensor 180 may be configured to send an RF signal to lighting fixtures 174, 178 to provide less artificial lighting, based on an increased amount of sunlight provided by the window 104. Also, or alternatively, the visible light sensor 180 may be configured to send an RF signal to lighting fixtures 172, 176 to provide additional lighting (e.g., during the daylighting sensor mode). The amount of additional lighting may be based on the amount of sunlight provided by the window 104, such that the total light may reach a baseline lighting level or higher.

The preferred or recommended lighting intensity (luminance) may be recorded in an image by visible light sensor 180 (e.g., with or without daylight). The visible light sensor 180 may identify when the lighting level (luminance) is above or below the preferred or recommended lighting intensity by an identified amount. The lighting level (luminance) may be identified by comparing a previously recorded image of the room 102 with the current image of the room. The lighting fixtures 172, 174, 176, 178 and/or the motorized window treatments 150 may be controlled to meet the preferred or recommended lighting intensity (luminance). The motorized window treatments 150 may be adjusted prior to the lighting fixtures to avoid additional energy consumption. If the sunlight 196 allowed by the motorized window treatments 150 does not meet the preferred or recommended lighting intensity (luminance), the lighting intensity of the lighting fixtures 172, 174, 176, 178 may be increased or decreased. When the preferred or recommended lighting intensity (luminance) is identified in the images generated by the visible light sensor 180, the load control may cease for a predefined period of time or until the lighting level is again above or below the preferred or recommended lighting intensity (luminance). The visible light sensor 180 may be configured to adjust the lighting at the task area to a lighting intensity other than the preferred or recommended lighting intensity (luminance) when the user 192 leaves the task area (e.g., for a predefined period of time). The lighting at the task area may be reduced to a predefined amount, or turned off, to avoid or reduce energy usages when the user is absent from the task area.

An increased and/or decreased lighting intensity may be presented at a first region of interest and at a second region of interest depending on one or more characteristics of the light source. For example, the first region of interest and the second region of interest may have a different lighting intensity depending on the age, model, size, operability, etc., of the light sources within the first region of interest and the second region of interest. The visible light sensor 180 may determine the lighting intensity presented at a region of interest to determine if the dimming level of the light source should be adjusted within the region of interest. For example, the lighting fixtures 172, 176 may be illuminating at a level above or below a preferred lighting intensity within the second region of interest. The lighting fixtures 172, 176 may be illuminating at a different lighting intensity due to the age and/or operability of the lighting fixtures 172, 176. The visible light sensor 180 may be configured to adjust the lighting fixtures 172, 176 to increase or decrease the lighting intensity provided by the lighting fixtures, to compensate for the less than preferred lighting intensity (e.g., increase the dimming level due to a decreased intensity caused by aging).

The visible light sensor 180 may adjust one or more light sources (e.g., fixtures 174, 178) to provide a uniform lighting intensity within different regions of interest. The different regions of interest may be identified by the relatively different levels of reflected light in each portion of the images generated of the room 102. The visible light sensor 180 may identify the relative difference in lighting level in the image by determining the lighting intensity (luminance) of the regions of interest of the room 102 and averaging the lighting intensity (luminance) of one or more of the pixels in the selected regions of interest. Sunlight 196 may enter windows 104 and may be presented within a first region of interest and a second region of interest may be unaffected. For example, the depth of sunlight may be identified in the first region of interest, but not the second region of interest. The first region of interest may be provided with a lower artificial lighting intensity level than the second region of interest. To account for the sunlight 196 being presented in the first region of interest and not in the second region of interest, the fixtures within the first region of interest (e.g., lighting fixture 174, 178) may be adjusted to a lower dimming level in that region of interest than the fixtures within the second region of interest (e.g. lighting fixtures 172, 176).

The visible light sensor 180 may determine whether one or more regions of interest are presenting a uniform lighting intensity. For example, the first region of interest may have a lighting intensity of artificial light that is higher than a lighting intensity of artificial light provided at the second region of interest. Other devices within a region of interest may also be providing additional light in a region of interest. For example, the lamp 142 may be providing light in the region being lit by the lighting fixture 176. A peripheral device (e.g., a monitor 166) may be illuminating a region of interest. The motorized window treatments 150 may be providing daylight in a region of interest. The regions of interest may be sub-areas of an object within the room 102, such as sub-areas of the desk 106 that have different lighting levels.

The visible light sensor 180 may adjust the lighting intensity of one or more of the lighting fixtures 172, 174, 176, 178 to uniformly illuminate one or more regions of interest within the room 102. For example, the visible light sensor 180 may adjust the lighting intensity of light fixtures 174, 178 so that lighting fixtures 174, 178 illuminates uniformly with the light intensities provided by lighting fixtures 172, 176. The visible light sensor 180 may adjust the lighting intensity of lighting fixtures 174, 178, for example, to account for the age and/or operation of the lighting fixtures 174, 178.

The visible light sensor 180 may adjust the lighting sources to compensate for intensities of light (e.g., daylight and/or artificial light) at a first region of interest that are higher and/or lower than intensities of light (e.g., daylight and/or artificial light) that are provided at the second region of interest. For example, a user's desk 106 may receive additional lighting 198 from a computer monitor 160. The additional lighting 198 may result in a sub-area of the desk 106 having a lighting intensity that is greater than lighting intensity provided on the remaining sub-areas of the desk 106. The additional lighting 198 may result in a sub-area of the desk 106 having a greater lighting level than preferred by the user 192 and/or otherwise desired (e.g., recommended by the lighting manufacturer). The visible light sensor 180 may send a digital signal to one or more lighting fixtures 172, 174, 76, 178 to reduce lighting at the location of the user's desk 106 that provided the additional lighting 198. For example, the visible light sensor 180 may reduce lighting at a defined portion of the user's desk 106 receiving the additional lighting 198 by transmitting an RF signal to control light source within a predefined distance of the defined portion of the user's desk 106, or light sources having the greatest influence on the illuminance distribution on the defined portion of the user's desk 106, so that the light source reduces the light provided to the defined portion of the user's desk 106. By reducing light to the user's desk 106 receiving the additional lighting 198, the sub-area receiving the additional light 198 by the computer monitor 166 may be uniform to sub-areas not receiving light via the computer monitor 166.

The visible light sensor 180 may transmit a message to the user 192 notifying that one or more lighting sources are providing less than preferred or recommended lighting intensities. The visible light sensor 180 may transmit a message to the user (e.g., via the mobile device 190) notifying that one or more of the lighting fixtures 172, 174, 176, 178 has been adjusted, or may be adjusted, to compensate for the less than preferred or recommended lighting intensity. The visible light sensor 180 may transmit a message to the user (e.g., via the mobile device 190) indicating the identities of the lighting fixtures 172, 174, 176, 178 for which compensation was provided or is recommended to be provided. The visible light sensor 180 may indicate to the user (e.g., via the mobile device 190) the remaining life (e.g., in hours, days, etc.) that the lighting fixtures 172, 174, 176, 178 have remaining before they should be replaced. The original life of a light source may be stored at the visible light sensor 180 upon receiving an indication of installation of the light source, and the visible light sensor 180 may count down from the original life using a timeclock.

As described herein, the visible light sensor 180 may be configured to disregard movement, lighting intensity (e.g., lighting intensity from sunlight and/or artificial light), color temperature, occupancy/vacancy conditions, etc. at a region of interest when performing lighting control. A portion of the room 102 may be separately masked from another portion of the room 102. Masking a portion of the room 102 may result in the visible light sensor 180 disregarding the portion of the room 102. For example, the visible light sensor 180 may disregard movement, lighting intensity (e.g., lighting intensity from sunlight and/or artificial light), color temperature, occupancy/vacancy conditions at the door 105, which may be irrelevant to the operation of the load control devices within the room 102. The visible light sensor 180 may be configured to discriminate between different colors of light presented at different regions of interest when performing lighting control.

The visible light sensor 180 may be configured to operate in a color sensor mode. In the color sensor mode, the visible light sensor 180 may be configured to determine a color temperature displayed within the images of the room 102. The color temperature of a light source may refer to the temperature of an ideal black body radiator that radiates light of comparable hue to that of the light source. For example, candlelight, tungsten light (e.g., from an incandescent bulb), early sunrise, and/or household light bulbs may appear to have relatively low color temperatures, for example on the range of 1,000-3,000 degrees Kelvin. Noon daylight, direct sun (e.g., sunlight above the atmosphere), and/or electronic flash bulbs may appear to have color temperature values on the order of 4,000-5,000 degrees Kelvin and may have a greenish blue hue. An overcast day may appear to have a color temperature of approximately 7,000 degrees Kelvin and may be even bluer than noon daylight. North light may be bluer still, appearing to have a color temperature on the range of 10,000 degrees Kelvin. Color temperatures over 5,000 degrees Kelvin are often referred to as cool colors (e.g., bluish white to deep blue), while lower color temperatures (e.g., 2,700-3,000 degrees Kelvin) are often referred to as warm colors (e.g., red through yellowish white).

The visible light sensor 180 may be configured to sense a color (e.g., measure a color temperature) of light emitted by one or more of the lighting fixtures 172, 174, 176, 178 in the room 102. For example, the visible light sensor 180 may be configured to operate as a color sensor or a color temperature sensor. The visible light sensor 180 may be configured to measure a color temperature within one or more regions of interest within the room 102 based on the color temperature presented within the room 102.

The visible light sensor 180 may be configured to measure a color temperature of one or more regions of interest within the room 102 using a color wheel. The color wheel may be configured to display one or more colors. For example, the color wheel may include standard RGB colors. The visible light sensor 180 may be configured to record an image of the color wheel and/or measure a color temperature of a light emitted by one or more of the lighting fixtures 172, 174, 176, 178 using the color wheel. The colors on the color wheel may be identified in the generated images of the room 102. A relative difference in color temperature from the colors on the color wheel may be identified in the reflected light captured in the generated images.

In the color sensor mode, the visible light sensor may transmit digital messages (e.g., including indications of the identified color temperature or control instructions based on the identified color temperature) to one or more of the lighting fixtures 172, 174, 176, 178 to control the color (e.g., the color temperatures) provided by the lighting fixtures 172, 174, 176, 178. The visible light sensor 180 may transmit the digital message to the lighting fixtures 172, 174, 176, 178 via RF signals, such as the RF signals 108. The visible light sensor 180 may transmit the digital message to the lighting fixtures 172, 174, 176, 178 in response to the identified lighting intensity (e.g., color tuning of the light in the room).

The visible light sensor 180 may identify the portion of the room 102 occupied by the sunlight 196 as being of a color temperature that is relatively more red than the other portion of the room 102. The visible light sensor 180 may change the color temperature of the lighting fixtures 174, 178 to a different color temperature than the lighting fixtures 172, 176 in response to the identification of the color temperature of the sunlight 196 in a portion of the room. The color temperature of the lighting fixtures 174, 178 may be changed to a relatively cooler (e.g., bluer) color than that of the lighting fixtures 172, 176 on the interior of the room to reduce the gradient of the color temperature in the room caused by the sunlight 196. The color temperature of the lighting fixtures 172, 176 may be changed to a relatively redder color temperature to reduce the gradient of the color of the sunlight 196 in the portion of the room affected by the sunlight 196. The color temperature of the lighting fixtures 172, 174, 176, 178 may change from relatively redder color temperatures from the direction of the windows 104, or to relatively bluer color temperatures in the direction of the windows 104, to reduce the gradient in color temperature caused by the sunlight 196. An example of a load control system for controlling the color temperatures of one or more lighting loads is described in greater detail in commonly-assigned U.S. Patent Application Publication No. 2014/0312777, published Oct. 23, 2014, entitled SYSTEMS AND METHODS FOR CONTROLLING COLOR TEMPERATURE, the entire disclosure of which is hereby incorporated by reference.

The visible light sensor 180 may identify baseline color temperatures present within one or more regions of interest within a space (e.g., room 102) within generated images. The baseline color temperatures may be identified in images representing relatively different color temperatures within the room 102. The images that include the baseline color temperatures may range across the color spectrum (e.g., white color spectrum) from a relatively bluer color temperature to a relatively redder color temperature.

The visible light sensor 180 may determine baseline color temperatures by recording images of the room 102 by controlling the lighting loads to a relatively bluer color temperature on the color spectrum and changing the color temperature of the lighting loads to a relatively redder color temperature, or vice versa, and recording images at different color temperatures. For example, color temperatures over 5,000 degrees Kelvin may be referred to as cool colors (e.g., a bluish white color), while color temperatures from 2700-3000 degrees Kelvin may be referred to as warm colors (e.g., yellowish white through red). The color temperatures may be incremented by a predefined amount to create baseline images at each predefined amount. The images may be recorded at a time when daylight or other ambient light is minimized in the space. For example, the images may be recorded at nighttime and/or when the covering material 152 of the motorized window treatments 150 are in a closed state to prevent sunlight from affecting the baseline color temperatures.

The color temperature may be determined by measuring a region (e.g., one or more pixels) where a pure white card may be placed. The visible light sensor 180 may generate images of the changing color temperature across the spectrum (e.g., white color spectrum) and store the images as baseline images for color temperature. For example, the visible light sensor 180 may identify the changes in color temperature across the spectrum by a certain number of degrees Kelvin and store the image representing the interval change as the next baseline interval for color temperature. The image may be stored (e.g., stored by the visible light sensor 180) with the control settings for the color temperature. The images may not be stored by the visible light sensor 180 if the intermediate and/or historic color calculations are used.

Baseline color temperatures may be provided within one or more regions of interest. To determine baseline color temperatures, the visible light sensor 180 may record one or more images of the room 102 while the light sources cycle through different colors at the different regions of interest. While the visible light sensor 180 analyzes the colors of images at one region of interest, other portions of the room 102 may be masked. For example, the visible light sensor 180 may record images of the room as one or more of lighting fixtures 172, 174, 176, 178 cycle through different colors across the lighting spectrum (e.g., white light spectrum). The baseline color temperatures for each region of interest may be stored at the visible light sensor 180 for identifying a change in color temperature in the regions of interest and/or controlling the light in the regions of interest to an identified color temperature.

The visible light sensor 180 may determine a lumen depreciation or color shift in the light output of the light fixtures by comparing a present color temperature of the light sources (e.g., lighting fixtures 172, 174, 176, 178) with a baseline color temperature. For example, the visible light sensor 180 may record an image of the room 102 and determine whether color temperature of the room 102 is equivalent to one or more baseline color temperatures of the room 102. The visible light sensor 180 may determine the color temperature difference between the present image and the baseline image. The visible light sensor 180 may determine the lumen depreciation or color shift of the light sources based on the difference of the present color temperature within the room 102 and the baseline color temperature presented within the room 102.

The visible light sensor 180 may operate in a daylight glare sensor mode. In the daylight glare sensor mode, the visible light sensor 180 may be operated to decrease or eliminate the amount of sunlight glare being presented in the room 102. The visible light sensor 180 may be configured to increase, decrease, or eliminate the amount of sunlight glare that enters the room 102. For example, sunlight or sunlight glare may be prevented from reaching a task area (e.g., a desk 106) of the user 192. The visible light sensor 180 may identify the user task area (e.g., the desk 106) of the user 192, identify sunlight glare in the generated images, and decrease and/or eliminate the amount of sunlight glare presented at the user's task area. For example, the visible light sensor 180 may be configured to transmit a digital message (e.g., including indications of environmental characteristics or control instructions) to the system controller 110 and/or the motorized window treatments 150 to lower the covering material 152 to a level that decreases or eliminates the amount of sunlight glare being presented at a user's task area.

The visible light sensor 180 may identify an amount of sunlight glare within a region of interest (e.g., a user's task area, such as desk 106) by determining a depth of sunlight 196 that is entering the room 102. The visible light sensor 180 may determine the depth of sunlight 196 penetration into the room 102 from the image recorded by the camera. The sunlight 196 may be identified as light that is coming from the direction of the windows 104 and that is relatively brighter (e.g., by a predefined threshold) than the other light in the room 104. The visible light sensor 180 may identify direction (e.g., direction within the room 102, such as direction of the windows 104) using an electronic compass. The electronic compass may be integrated within the visible light sensor 180, or the electronic compass may be external to the visible light sensor 180. The sunlight 196 may be further identified according to the location of the building, the direction of the windows 104 in the building (e.g., whether the windows 104 are facing the direction of the sun), the weather conditions (e.g., a sunny day), the time of day (e.g., a time of day when the sunlight would be directly penetrating through the windows), the time of year (e.g., a time of year when the sunlight would be directly penetrating through the windows), the position of the sun in the sky, and/or other parameters that may be used to determine the intensity of sunlight glare at the room 102. The visible light sensor 180 may use the electronic compass thereon to detect the direction of other objects, such as the direction of the sun or other environmental characteristics that may be determined based on direction. The visible light sensor 180 may have timeclock thereon to detect the time of day, time of year, or other parameters regarding time.

The penetration distance of the sunlight 196 into the room may be detected as the area affected by sunlight glare (e.g., when each of the characteristics indicating the sunlight glare is coming through the windows 104 have been met). When the visible light sensor 180 is located on the wall facing the windows 104, the visible light sensor 180 may identify the sunlight glare in the images by identifying the orb of the sun through the windows 104.

The visible light sensor 180 may be configured to transmit a digital message (e.g., including control instructions) to the load control devices (e.g., the motorized window treatments 150) to limit or eliminate the sunlight glare. The visible light sensor 180 may transmit a digital message (e.g., including control instructions) to the load control devices (e.g., the motorized window treatments 150) to limit or eliminate depth of sunlight 196 penetration into the room 102. For example, the visible light sensor 180 may be configured to transmit a digital message (e.g., including control instructions) to the load control devices (e.g., the motorized window treatments 150) to decrease or eliminate sunlight glare from shining on the user 192 or the user's task area (e.g., the desk 106, monitor 166, and/or keyboard 168). The visible light sensor 180 may be configured to lower the covering material 152 of each of the motorized window treatments 150 to prevent the depth of sunlight 196 penetration from exceeding a maximum sunlight penetration depth. Examples of methods for limiting the sunlight penetration depth in a space are described in greater detail in U.S. Pat. No. 8,288,981, issued Oct. 16, 2012, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference.

The visible light sensor 180 may be configured to override or supplement automated control of the motorized window treatments 150. For example, the visible light sensor 180 may be configured to override or supplement automated control of the motorized window treatments 150 in response to determining the time of day, time of year, location of the building, direction of the windows 104, position of the sun in the sky, weather conditions, etc., that may be used to determine the intensity of sunlight at the room 102. The weather condition, position of the sun, etc., may be derived from an external device (e.g., an external server, such as a cloud server) and/or the weather condition, position of the sun, etc., may be derived from a window sensor. Examples of load control systems having window sensors are described in greater detail in U.S. Patent Application Publication No. 2014/0156079, published Jun. 5, 2014, entitled METHOD OF CONTROLLING A MOTORIZED WINDOW TREATMENT, the entire disclosure of which is hereby incorporated by reference.

The visible light sensor 180 may operate proactively or reactively to control the motorized window treatments 150. For example, the visible light sensor 180 may reactively operate to lower the motorized window treatments 150 after identification of the penetration distance of the sunlight 196 on the user 192 or the user's task area. After identification of the sunlight 196 on the user 192 or the user's task area, the visible light sensor 180 may send digital messages (e.g., including control instructions) to close the motorized window treatments 150 a predefined distance or until the penetration distance of the sunlight 196 is removed from the user 192 or the user's task area (e.g., by a predefined distance). The visible light sensor 180 may operate proactively by lowering the motorized window treatments 150 before the penetration distance of the sunlight 196 on the user 192 or the user's task area. When the sunlight 196 is identified as being within a predefined distance of the user 192 or the user's task area, the visible light sensor 180 may send digital messages (e.g., including control instructions) to close the motorized window treatments 150 a predefined distance or until the penetration distance of the sunlight 196 is within another predefined distance from the user 192 or the user's task area.

The visible light sensor 180 may be configured to determine the number of users within one or more regions of interest (e.g., during an occupancy/vacancy sensor mode). The visible light sensor 180 may be configured to count the number of users entering and/or exiting a region of interest. For example, the visible light sensor 180 may be configured to determine that ten users have entered a room 102 and four users have exited the room 102. The visible light sensor 180 may mask the door and count the number of users in the room 102, or mask the rest of the room 102 and count the number of users that have entered and/or exited the room 102. Based on the number of users who have entered and/or exited the room 102, the visible light sensor 180 may be configured to determine the number of users remaining in the room 102.

The visible light sensor 180 0 may be configured to control one or more of the load control devices within the room 102 in response to the number of users in the room 102. For example, the visible light sensor 180 may be configured to control the HVAC system 162 in response to the number of users in the room 102. The visible light sensor 180 may be configured to control one or more of the load control devices of the load control system 100 in response to the number of users in the room 102 exceeding an occupancy number threshold. For example, the visible light sensor 180 may be configured to provide an alert (e.g., flashing lights, changing color of the lights to red) if the number of users in the room 102 exceeds an undesired and/or unsafe number threshold.

The visible light sensor 180 may increase or decrease the lighting intensity provided by lighting fixtures 172, 174, 176, 178 based on the alertness and/or location of the user 192. The visible light sensor 180 may adjust the color temperature provided by lighting fixtures 172, 174, 176, 178 based on the alertness and/or location of the user 192. For example, the visible light sensor 180 may increase the lighting intensity of the lighting fixtures 172, 174, 176, 178 if the user 192 is at desk 106 and the user's eyes are closed for a predefined period of time. The visible light sensor 180 may adjust the color temperature of the lighting fixtures 172, 174, 176, 178 to a cooler color temperature (e.g., blue) if the user 192 is at desk 106 and the user's eyes are closed for a predefined period of time. Alternatively, the visible light sensor 180 may adjust the color temperature of the lighting fixtures 172, 174, 176, 178 to a warmer color temperature (e.g., red), via positive feedback, if the user is in bed and the user's eyes are closed for a predefined period of time. The lighting intensity and/or color temperature provided by lighting fixtures 172, 174, 176, 178 based on the alertness and/or location of the user 192 may be defined by the user and/or may be based on manufacturer settings.

The visible light sensor 180 may adjust the lighting fixtures 172, 174, 176, 178 based on the location of the user 192. For example, the visible light sensor 180 may increase and/or decrease the lighting intensity provided by lighting fixtures 174, 178 depending on the location of the user. For example, the visible light sensor 180 may increase the lighting intensity provided by lighting fixtures 174, 178 if the user 192 is within a predefined distance of the lighting fixtures 174, 178. The visible light sensor 180 may decrease the lighting intensity provided by lighting fixtures 172, 176 if the user is outside of a predefined range of the lighting fixtures 172, 176. The visible light sensor 180 may adjust the lighting fixtures 172, 174, 176, 178 to emit a predefined color temperature depending on the location of the user. For example, the visible light sensor 180 may adjust the lighting fixtures 172, 174, 176, 178 to emit a preferred color temperature if the user 192 is within a predefined distance of the lighting fixtures 172, 174, 176, 178. The visible light sensor 180 may adjust the lighting fixtures 172, 174, 176, 178 to emit a color temperature representative of a vacancy condition and/or to save energy if the user is outside of a predefined range of the lighting fixtures 172, 174, 176, 178.

The visible light sensor 180 may adjust the load control devices to set a scene, depending on the alertness of the user and/or the location of the user. For example, the visible light sensor 180 may set a bed time scene if the user is in bed and the user is exhibiting a sleep condition (e.g., the user's eyes are closed for a predefined time). The bedtime scene may include reducing the light intensities of the lighting fixtures, playing soft music, and/or lowing the covering material 152 of the motorized window treatments 150. The bed and/or areas within a predefined distance of the bed may be masked. For example, based on privacy settings defined by the user 192, the bed and/or areas within a predefined distance of the bed may be masked.

The visible light sensor 180 may set a wake-up scene depending on a time of day, the location of the user, and/or an alertness of the user. For example, the visible light sensor 180 may control the lighting fixtures to increase lighting intensity if the user is at the desk 106 and the user's eyes close for a predefined time. The visible light sensor 180 may adjust the covering material 152 of the motorized window treatments 150 to an open position and/or increase the lighting intensity of lighting fixtures if the user is in bed at a wake-up time. The visible light sensor 180 may adjust the lighting fixtures 172, 174, 176, 178 based on default settings and/or based on a user preference.

The visible light sensor 180 may be configured to determine a depreciation in the light output of one or more of the lighting fixtures 172, 174, 176, 178 in the room 102. The light output of the lighting fixtures 172, 174, 176, 178 may be depreciated as a result of age and/or use of the lighting fixtures 172, 174, 176, 178. The depreciation of the light output may result in the lighting fixtures 172, 174, 176, 178 providing a lighting intensity that is less than preferred, a different color temperature than is preferred, etc. The visible light sensor 180 may be configured to control the lighting intensity of the lighting fixtures 172, 174, 176, 178 to compensate for the depreciation of the lighting fixtures 172, 174, 176, 178. For example, the visible light sensor 180 may be configured to perform lumen maintenance of the lighting fixtures 172, 174, 176, 178.

The visible light sensor 180 may be configured to identify that the color temperatures provided by the lighting fixtures 172, 174, 176, 178 has depreciated. The visible light sensor 180 may be configured to control the lighting intensity of different colored LEDs in the lighting fixtures 172, 174, 176, 178 to compensate for the depreciation in color of the lighting fixtures 172, 174, 176, 178. For example, the visible light sensor 180 may be configured to increase the intensity of the blue LED of the lighting fixtures 172, 174, 176, 178 to compensate for a depreciation in the blue LEDs, or increase the intensity of the red LED of the lighting fixtures 172, 174, 176, 178 to compensate for a depreciation in the blue LEDs. The changing color temperature may be captured in the images generated by the visible light sensor 180 and the visible light sensor 180 may cease adjustment when the proper color temperature is identified in the images.

Configuration and/or the operation of one or more of the devices within the load control system 100 (e.g., the visible light sensor 180) may be performed using the mobile device 190 and/or another network device. The mobile device 190 may execute a graphical user interface (GUI) performance software for allowing a user to configure and/or operate the load control system 100. For example, the performance software may run as a PC application or a web interface (e.g., executed on the system controller 110 or other remote computing device). The performance software and/or the system controller 110 (e.g., via instructions from the configuration software) may generate a load control database that defines the operation of the load control system 100. For example, the load control database may include information regarding the control settings of different load control devices of the load control system (e.g., the lighting fixtures 172, 174, 176, 178, the plug-in load control device 140, the motorized window treatments 150, and/or the thermostat 160). The load control database may comprise information regarding associations between the load control devices and the input devices (e.g., the remote control device 170, the visible light sensor 180, etc.). The load control database may comprise information regarding how the load control devices respond to inputs received from the input devices.

The load control database may define the control instructions for the load control devices in response to identification of different types of information in each of the modes described herein. The control instructions may be defined by the user 192. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosure of which is hereby incorporated by reference.

The operation of the visible light sensor 180 may be programmed and/or configured using a network device, such as the mobile device 190. The visible light sensor 180 may comprise a communication circuit for transmitting and receiving the RF signals 109 (for communicating directly with the mobile device 190 (e.g., using a standard protocol, such as Wi-Fi or BLUETOOTH®). The visible light sensor 180 may also, or alternatively, communicate indirectly via the system controller 110. During the configuration procedure of the load control system 100, the visible light sensor 180 may be configured to record an image of the room 102 and transmit the image to the mobile device 190 (e.g., directly to the mobile device 190 or indirectly via the system controller 110). The mobile device 190 may display the image on a visual display and the user 192 may configure the operation of the visible light sensor 180 to set one or more configuration parameters (e.g., configuration data) of the visible light sensor 180. For example, the user 192 may indicate regions of interest on the image by tracing masked areas on the image displayed on the visual display. The visible light sensor 180 may be configured to receive the modified images from the mobile device 190 and identify the regions of interest and establish different masks and/or control parameters depending upon the environmental characteristic to be sensed (e.g., occupancy/vacancy conditions, light level inside of the room 102, daylight level outside of the room 102, color temperature, etc.).

The mobile device 190 may transmit the configuration data to the visible light sensor 180. For example, the mobile device 190 may transmit to the visible light sensor 180 the regions of interest defined by the user 192, the preferred total light intensities (e.g., artificial light and/or sunlight) defined by the user, and/or the preferred color temperatures defined by the user 192. The mobile device 190 may also, or additionally, transmit to the visible light sensor 180 the scenes to be defined by the user. For example, the network device 192 may transmit to the visible light sensor that a bedtime scene may include a warm color temperature and/or the covering material 152 of the motorized window treatments 150 to be closed. The mobile device 190 may directly transmit the configuration data to the visible light sensor 180 via the RF signals 109 using the standard protocol and/or the mobile device 190 may transmit the configuration data to the visible light sensor via one or more other devices (e.g., the system controller 110). The visible light sensor 180 may store the configuration data in memory, such that the visible light sensor 180 may operate according to the provided configuration data.

As described herein, the visible light sensor 180 may be configured to record an image of the room 102, which may capture one or more objects and/or activities within the room that the user 192 may consider to be private or confidential. As a result, the visible light sensor 180 may be configured to protect the privacy of the user 192, while using the image data to configure and/or control load control devices within the room 102.

The visible light sensor 180 may not be configured to transmit images, or be configured to prevent the transmission of images, during normal operation. The visible light sensor 180 may be configured to only use the images internally to sense the desired environmental characteristic (e.g., to detect occupancy or vacancy, to measure an ambient light level, etc.). For example, the visible light sensor 180 may be configured to transmit (e.g., only transmit) an indication of the detected state and/or measured environmental characteristic during normal operation (e.g., via the RF signals 108 using the proprietary protocol).

The visible light sensor 180 may be installed with special configuration software for use during the configuration procedure (e.g., for use only during the configuration procedure). The configuration procedure may be performed prior to normal operation of the visible light sensor 180. The configuration procedure may be performed dynamically during normal operation to update the visible light sensor 180 (e.g., during normal operation of the visible light sensor 180 or in response to the movement of an object). The configuration software may allow the visible light sensor 180 to transmit a digital representation of an image recorded by the camera to the mobile device 190 only during the configuration procedure. The visible light sensor 180 may receive configuration data from the mobile device 190 (e.g., via the RF signals 109 using the standard protocol) and may store the configuration data in memory. The visible light sensor 180 may have the configuration software installed during manufacturing, such that the visible light sensor 180 is ready to be configured when first powered after installation. In addition, the system controller 110 and/or the mobile device 190 may be configured to transmit the configuration software to the visible light sensor 180 during the configuration procedure of the load control system 100.

The visible light sensor 180 may be configured to install normal operation software in place of the configuration software after the configuration procedure is complete. The operation software may be configured for operating in the sensor modes described herein. The normal operation software may not allow the visible light sensor 180 to transmit images recorded by the camera to other devices. For example, during operation of the visible light sensor 180, the visible light sensor 180 may be configured to transmit metadata of the image recorded by the camera. The visible light sensor 180 may have the normal operation software stored in memory and may be configured to install the normal operation software after the configuration procedure is complete. In addition, the system controller 110 and/or the mobile device 190 may be configured to transmit the normal operation software to the visible light sensor 180 after the configuration procedure is complete.

Rather than installing special configuration software onto the visible light sensor 180 and then removing the special configuration software from the visible light sensor, a special configuration sensor (not shown) may be installed at the location of the visible light sensor 180 (e.g., on or in place of the visible light sensor 180) or within a predefined distance of the location of the visible light sensor 180 during configuration of the load control system 100. The configuration sensor may include the same camera and mechanical structure as the visible light sensor 180. The configuration sensor may include a first communication circuit for transmitting and receiving the RF signals 108 using the proprietary protocol, for example, and a second communication circuit for transmitting and receiving the RF signals 109 using the standard protocol, for example. During the configuration procedure of the load control system 100, the configuration sensor may be configured to record an image of the space and transmit the image to the mobile device 190 (e.g., directly to the network device via the RF signals 109 using the standard protocol). The mobile device 190 may display the image on the visual display and a user may configure the operation of the visible light sensor 180. For example, the visible light sensor 180 and the configuration sensor may be mounted to a base portion that remains connected to the ceiling or wall, such that the configuration sensor may be mounted in the exact same location during configuration that the visible light sensor is mounted during normal operation.

The configuration sensor may then be uninstalled and the visible light sensor 180 may be installed in its place for use during normal operation of the load control system 100. The visible light sensor 180 for use during normal operation may be incapable of transmitting images via the RF signals 109 using the standard protocol. The visible light sensor 180 for use during normal operation may only comprise a communication circuit for transmitting and receiving the RF signals 108 using the proprietary protocol. After the visible light sensor 180 is installed, the mobile device 190 may transmit the configuration data to the system controller 110 via the RF signals 109 (e.g., using the standard protocol), and the system controller 110 may transmit the configuration data to the visible light sensor via the RF signal 108 (e.g., using the proprietary protocol). The visible light sensor 180 may store the configuration data in memory of the sensor. During normal operation, the visible light sensor 180 may transmit, for example, an indication of the sensed environmental characteristic during normal operation via the RF signals 108 (e.g., using the proprietary protocol).

The visible light sensor 180 may comprise a removable configuration module for use during configuration of the visible light sensor 180. The visible light sensor 180 may use the removable configuration module (e.g., USB) during configuration of the visible light sensor 180 and the removable configuration module may be removed for operation of the device for performing load control and execution of sensor modes. The visible light sensor 180 may comprise a first installed (e.g., permanently-installed) communication circuit for transmitting and receiving the RF signals 108 (e.g., using the proprietary protocol). The removable configuration module may comprise a second communication circuit for transmitting and receiving the RF signals 109 (e.g., using the standard protocol). When the configuration module is installed in the visible light sensor 180 and the second communication circuit is electrically coupled to the visible light sensor 180, the visible light sensor 180 may record an image of the room 102 and transmit the image to the mobile device 190 (e.g., directly to the network device via the RF signals 109 using the standard protocol). The mobile device 190 may transmit the configuration data to the visible light sensor 180 while the configuration module is still installed in the visible light sensor 180, and the visible light sensor 180 may store the configuration data in memory. After the configuration of the visible light sensor 180 (e.g., during operation of the visible light sensor 180), the configuration module may be removed from the visible light sensor 180. With the configuration module removed, the visible light sensor 180 may be unable to transmit images via the RF signals 109 (e.g., using the standard protocol).

The visible light sensor 180 may be configured to protect the privacy of the user 192 by disabling communication capabilities of the visible light sensor 180. For example, the visible light sensor 180 may be configured absent network capabilities, such as without a communication circuit for transmitting and/or receiving digital signals. The visible light sensor 180 configured absent network capabilities may be unable to transmit RF signals 108 (e.g., using the proprietary protocol), and the visible light sensor 180 configured absent network capabilities may be unable to transmit RF signals 109 (e.g., using the standard protocol). The visible light sensor 180 configured, absent network capabilities, may be incapable of transmitting images of the room 102 to devices external to the visible light sensor 180.

When the visible light sensor 180 is configured absent network capabilities, the visible light sensor 180 may be configured using a completely automatic configuration procedure or using buttons on the visible light sensor for manual configuration. For example, the visible light sensor 180 may include a visual display for displaying the image and allow for configuration by user selections using the buttons or portions of the visual display. When the visible light sensor 180 is performing normal operation absent network capabilities, the visible light sensor 180 may be wired directly to the load control devices for the electrical loads being controlled.

The visible light sensor 180 may be configured to protect the privacy of the user 192 using an integrated circuit (IC) during normal operation. The visible light sensor 180 may record an image of a room 102 and the IC may modify the image. For example, the IC may decimate the image so that one or more objects within the image are obfuscated and/or unrecognizable by the user 192. The IC may decimate the image by adding effects to the image, such as by adding coarseness to the resolution of the image. The effects may be added to the image using layers and/or the effects may be added directly to the image. The coarseness of the resolution may decimate the image so that the user 192 may not be able to discern one or more objects within the image. For example, the IC may decimate the image by converting the image to 16×16 pixels. The IC may be programmed so that it is unmodifiable and/or hacked-proof. For example, the IC may be an application-specific integrated circuit (ASIC) that may be unmodifiable and/or hack-proof.

The visible light sensor 180 may be used to configure (e.g., automatically configure) the load control system 100. The visible light sensor 180 may be used to configure the load control system 100 by determining which of the control devices may be located within the room 102. For example, during the configuration procedure of the load control system 100, the visible light sensor 180 may instruct the load control devices to perform an identifying function, such as flashing the lighting fixtures 172, 174, 176, 178 or change their color, raising or lowering the covering material 152 of the motorized window treatments 150, flashing the lighting load in the floor lamp 142 through the plug-in load control device 140, blinking a visual indicator on one or more devices, etc. The visible light sensor 180 may be configured to detect the identifying feature and determine the location of the objects in the room 102.

The visible light sensor 180 may be configured to determine that one or more control devices (e.g., the remote control device mounted to the wall, the temperature control device 160 mounted on the wall, the speaker 146 mounted on the wall, etc.) are located in the room 102 from the visual appearance of the control device as shown in a recorded image. After determining the control devices that are located in the room 102, the visible light sensor 180 may receive unique identifiers (e.g., serial numbers) from these control devices and may generate (e.g., automatically generate) associations between the load control devices and the input devices of the control devices located in the room, or in regions of interest within the room in which the control devices are located.

Devices may be identified to define regions of interest within the room. The control devices may be associated with the defined regions of interest and controlled according to their location within the room 102. For example, the computer monitor 166 may display an image or screen captured by the images generated by the visible light sensor 180. The image or screen may be generated upon user actuation of a button on the keyboard 168 or the mobile device 190. The visible light sensor 180 may recognize the image and define the computer monitor, or a predefined area around the computer monitor (e.g., the desk 106 or other predefined area) as the user's task area.

The lighting fixtures 172, 174, 176, 178 may each be turned on, turned off, or flashed to identify the impact of the lighting fixtures 172, 174, 176, 178 on a region of interest. The visible light sensor 180 may identify a difference in lighting intensity (e.g., by a predefined amount, such as moving the lighting intensity from one baseline interval to another) within a region of interest when one of the lighting fixtures 172, 174, 176, 178 is turned on and/or off. When a lighting fixture 172, 174, 176, 178 is determined to impact the region of interest, the lighting fixture 172, 174, 176, 178 may be associated with the region of interest for performing lighting control in the region of interest.

The visible light sensor 180 may be configured to identify one or more objects in the room 102, such as the door 105 and/or the window 104. The visible light sensor 180 may automatically identify the object (e.g., the door 105 and/or the window 104) within the room 102 based on predefined sizes and/or shapes of the object. The visible light sensor 180 may automatically identify the object within the room 102 based on predefined locations of the object. For example, the visible light sensor may automatically identify the door 105 based on an object in the room 102 being the size of a standard door and/or by the door 105 being positioned at a location within the room 102 at which a door may be located. The visible light sensor 180 may be configured to mask one or more objects within the room 102 during configuration and/or control of the load control system 100. For example, when an object (e.g., keyboard 168) is located on a task surface (e.g., desk 106), a mask may be applied to the object. An object located on a task surface may be a mug, a stapler, etc. Multiple masks may be applied at the same time. For example, when an object is located on a task surface (e.g., desk 106), a first mask may be applied to the object on the task surface, while another mask is applied to an area surrounding (e.g., within a predefined distance of) the task surface.

Though functions may be described herein as being performed by the visible light sensor, the visible light sensor may record the images and provide the images to the system controller for performing image analysis, control procedures, and/or other functions described herein.

FIG. 3 is a simplified block diagram of an example visible light sensor 300, which may be deployed as the visible light sensor 180 of the load control system 100 shown in FIG. 1. The visible light sensor 300 may comprise a control circuit 310, for example, a microprocessor, a programmable logic device (PLD), a microcontroller, an application specific integrated circuit (ASIC), a field-programmable gate array (FPGA), or any suitable processing device. The control circuit 310 may be coupled to a memory 312 for storage of control parameters of the visible light sensor 300. The memory 312 may operate as an external integrated circuit (IC) or as an internal circuit of the control circuit 310. The memory 312 may have instructions stored thereon that, when executed by the control circuit 310, enable the visible light sensor 300 to perform the functions described herein.

The visible light sensor 300 may comprise a visible light sensing circuit 320 having an image recording circuit, such as a camera 322. The camera 322 may be a removable configuration module, as described herein. The visible light sensor 300 may comprise an image processing circuit, such as an image processor 324. The image processor 324 may comprise a digital signal processor (DSP), a microprocessor, a programmable logic device (PLD), a microcontroller, an application specific integrated circuit (ASIC), a field-programmable gate array (FPGA), or any suitable processing device. The camera 322 may be positioned towards a space in which one or more environmental characteristics are to be detected (e.g., into the room 102). The camera 322 may be configured to record an image which may be provided to the image processor 324. The image processor 324 may be configured to process the image and provide to the control circuit 310 one or more signals that are representative of the detected environmental characteristics (e.g., an occurrence of movement, an amount of movement, a direction of movement, a velocity of movement, a counted number of users, a lighting intensity, a light color, an amount of direct sunlight penetration, etc.). For example, the one or more signals provided to the control circuit 310 may be representative of movement in the space and/or a measured light level in the space. The image processor 324 may provide an entire image to the control circuit 310.

The visible light sensor 300 may comprise a first communication circuit 330 configured to transmit and/or receive digital messages via a first communication link using a first protocol. For example, the first communication link may comprise a wireless communication link and the first communication circuit 330 may comprise an RF transceiver coupled to an antenna. In addition, or alternatively, the first communication link may comprise a wired digital communication link and the first communication circuit 330 may comprise a wired communication circuit. The first protocol may comprise a proprietary protocol, such as, for example, the ClearConnect protocol. The control circuit 310 may be configured to transmit and/or receive digital messages via the first communication link during operation of the visible light sensor 300. The control circuit 310 may be configured to transmit an indication of the detected environmental characteristic via the first communication link during operation of the visible light sensor 300. For example, the control circuit 310 may be configured to transmit an indication of a detected state (e.g., an occupancy/vacancy condition) and/or a measured environmental characteristic (e.g., a measured light level, color, etc.) via the first communication link during operation of the visible light sensor 300.

The visible light sensor 300 may comprise a second communication circuit 332 configured to transmit and/or receive digital messages via a second communication link using a second protocol. For example, the second communication link may comprise a wireless communication link and the second communication circuit 332 may comprise an RF transceiver coupled to an antenna. In addition, or alternatively, the second communication link may comprise a wired digital communication link and the second communication circuit 332 may comprise a wired communication circuit. The second protocol may comprise a standard protocol, such as, for example, the Wi-Fi protocol, the BLUETOOTH® protocol, the Zigbee protocol, etc. The control circuit 310 may be configured to transmit and receive digital messages via the second communication link during configuration of the visible light sensor 300. For example, the control circuit 310 may be configured to transmit an image recorded by the camera 322 via the second communication link during configuration of the visible light sensor 300.

The visible light sensor 300 may comprise a compass (e.g., an electronic compass 334). The visible light sensor 300 may identify direction using the electronic compass 334. For example, the visible light sensor 300 may identify the direction of one or more objects (e.g., window 104, door 105, etc.) using the electronic compass. The visible light sensor 300 may comprise a power source 340 for producing a DC supply voltage $V_{CC}$ for powering the control circuit 310, the memory 312, the image processor 324, the camera, the first and second communication circuits 330, 332, and other low-voltage circuitry of the visible light sensor 300. The power source 340 may comprise a power supply configured to receive an external supply voltage from an external power source (e.g., an AC mains line voltage power source and/or an external DC power supply). In addition, the power source 340 may comprise a battery for powering the circuitry of the visible light sensor 300.

The visible light sensor 300 may further comprise a low-power occupancy sensing circuit, such as a passive infrared (IR) detector circuit 350 or PIR detector circuit 350. The PIR detector circuit 350 may generate a PIR detect signal $V_{PIR}$ (e.g., a low-power occupancy signal) that is representative of an occupancy/vacancy condition in the room 102 in response to detected passive infrared energy in the room. The PIR detector circuit 350 may consume less power than the visible light sensing circuit 320. However, the visible light sensing circuit 320 may be more accurate than the PIR detector circuit 350. For example, when the power source 340 is a battery, the control circuit 310 may be configured to disable the visible light sensing circuit 320 and use the PIR detector circuit 350 to detect occupancy conditions while conserving power. The control circuit 310 may disable the light sensing circuit 320, for example, when the room 102 is vacant. The control circuit 310 may detect an occupancy condition in the room 102 in response to the PIR detect signal $V_{PIR}$ and may subsequently enable the visible light sensing circuit 320 to detect a continued occupancy/vacancy condition. The control circuit 310 may enable the visible light sensing circuit 320 immediately after detecting an occupancy condition in the room 102 in response to the PIR detect signal $V_{PIR}$. The control circuit 310 may also keep the visible light sensing circuit 320 disabled after detecting an occupancy condition in the room 102 (e.g., in response to the PIR detect signal $V_{PIR}$). The control circuit 310 may keep the visible light sensing circuit 320 disabled until the PIR detect signal $V_{PIR}$ indicates that the room is vacant. The control circuit 310 may not make a determination that the room 102 is vacant until the visible light sensing circuit 320 subsequently indicates that the room is vacant.

The visible light sensor 300 may be configured in a way that protects the privacy of the occupants of the space. For example, the control circuit 310 may execute special configuration software that allows the control circuit 310 to transmit an image recorded by the camera 322 via the second communication link only during configuration of the visible light sensor 300. The configuration software may be installed in the memory 312 during manufacturing, such that the visible light sensor 300 is ready to be configured when first powered after installation. In addition, the control circuit 310 may be configured to receive the configuration software via the first or second communication links and store the configuration software in the memory during configuration of the visible light sensor 300. The control circuit 310 may execute normal operation software after configuration of the visible light sensor 300 is complete. The normal operation software may be installed in the memory 312 or may be received via the first or second communication links during configuration of the visible light sensor 300.

The second communication circuit 332 may be housed in a removable configuration module that may be installed in the visible light sensor 320 and electrically connected to the control circuit 310 only during configuration of the visible light sensor. When the configuration module is installed in the visible light sensor 300 and the second communication circuit 332 is electrically coupled to the control circuit 310, the control circuit may transmit an image recorded by the camera 322 to via the second communication link. The control circuit 310 may subsequently receive configuration data via the first or second communication links and may store the configuration data in the memory 312. The configuration module may then be removed from the visible light sensor 300, such that the control circuit 310 is subsequently unable to transmit images via the second communication link.

In addition, the visible light sensor 300 that is installed in the space during normal operation may not comprise the second communication circuit, such that the visible light sensor is never able to transmit images via the second communication link. The visible light sensor 300 may be configured using a special configuration sensor that may have an identical structure as the visible light sensor 300 shown in FIG. 3 and may include both a first communication circuit for communicating via the first communication link and a second communication circuit for communicating via the second communication link. The special configuration sensor may be configured to record an image using the camera and transmit the image via the second communication link. The special configuration sensor may then be uninstalled and the visible light sensor 300 (that does not have the second communication link 332) may then be installed in its place for use during normal operation. The control circuit 310 of the visible light sensor 300 may receive configuration data via the first communication link and may store the configuration data in the memory 312.

Figure 4A:
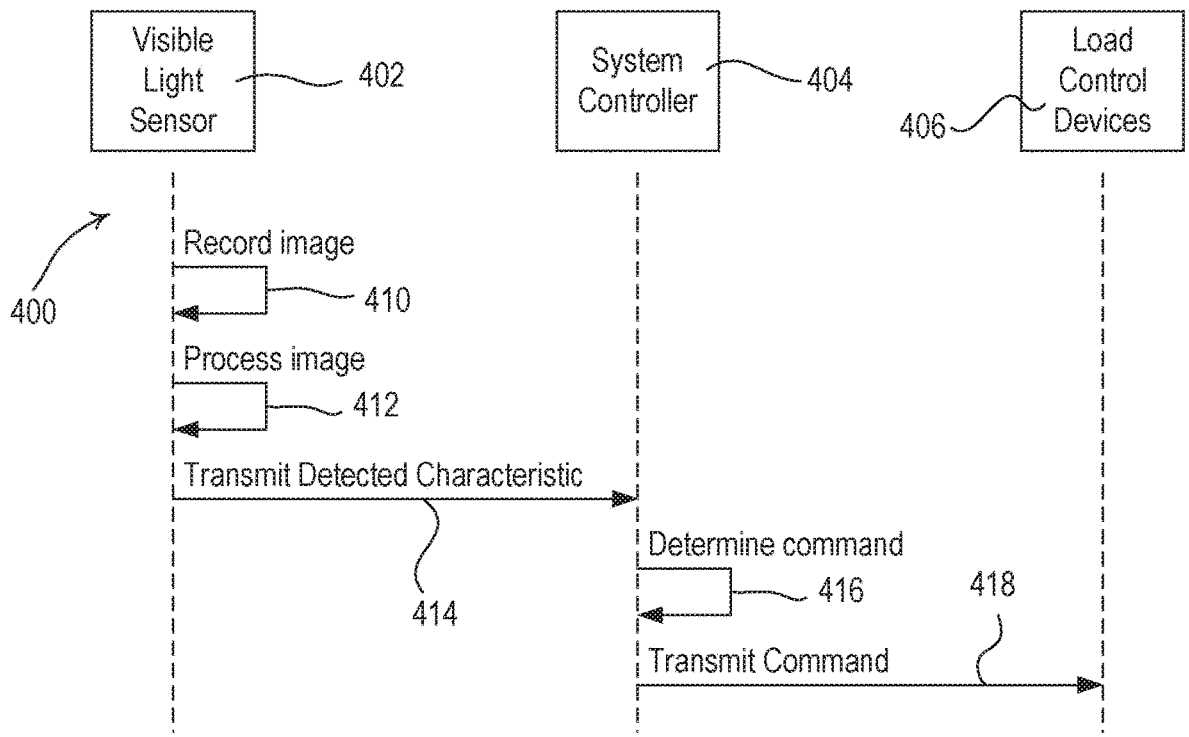
FIGS. 4A and 4B are sequence diagrams for controlling load control devices based on images captured by a visible light sensor.
Figure 4B:
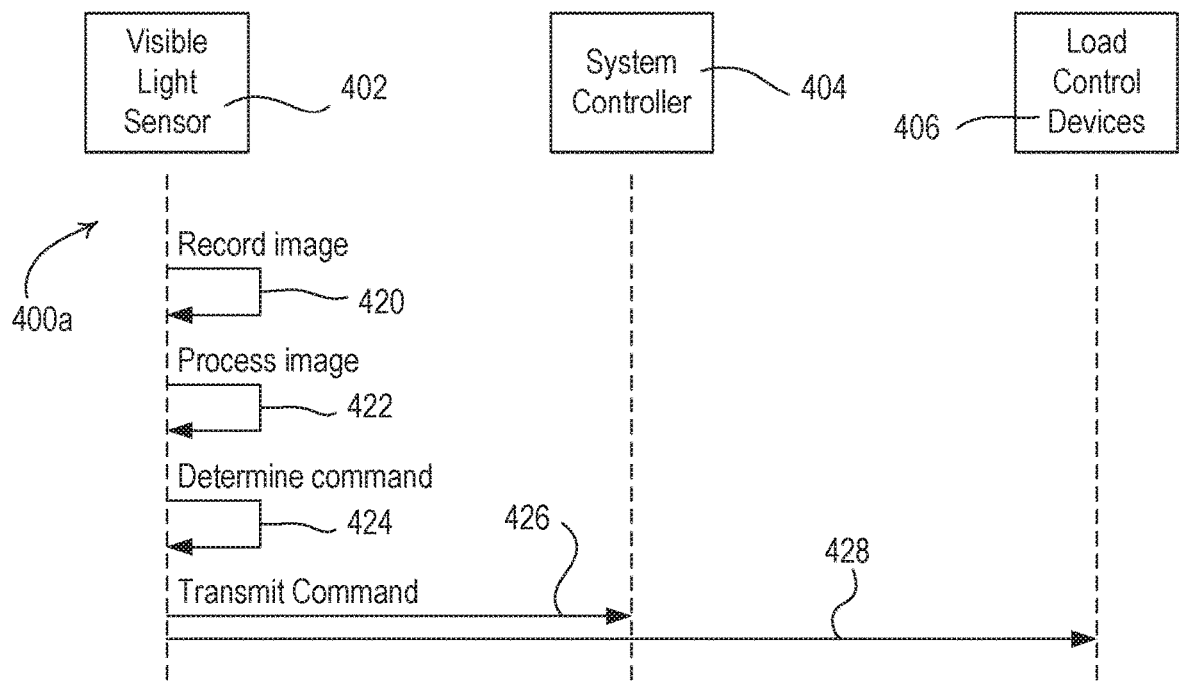

FIGS. 4A and 4B show sequence diagrams of example control procedures 400, 400a for controlling load control devices 406 using a visible light sensor 402 (such as visible light sensor 180) as described herein. As shown in FIG. 4A, the visible light sensor 402 may record an image, at 410. The visible light sensor 402 may record one or more images that include one or more unmasked regions of interest. Based on the recorded image, the visible light sensor 402 may, at 412, process the image to detect environmental characteristics of the one or more regions of interest (e.g., presence of sunlight on user's task area, a predefined lighting intensity at users' task area, a color temperature in the space, color temperature depreciation for one or more of light sources, an occupancy/vacancy condition, etc.). The environmental characteristics may be detected by comparing the recorded image with baseline image(s) of the space. The visible light sensor may transmit the detected environmental characteristics to the system controller 404, at 414.

The system controller 404 may determine the command and/or the load control devices 406 to be controlled, at 416, based on the environmental characteristics detected in the images. The command and/or the load control devices 406 to be controlled may be associated with the detected environmental characteristics in memory. The command and/or the load control devices 406 to be controlled may be system defined and/or user defined. A user preferences command may be provided to the visible light sensor 402 for defining user preferences for controlling load control devices. The user preferences command may derive from a network device. The system controller 404 may transmit the command, at 418, to the load control devices 406 in response to the characteristics detected from the images.

FIG. 4A illustrates an example in which the system controller 402 is implemented to determine a command and/or the load control devices 406 to be controlled based on environmental characteristics detected in an image. The visible light sensor 402 itself may also, or alternatively, determine the command and/or the load control devices 406 to be controlled based on the environmental characteristics detected from the image. As shown in FIG. 4B, the visible light sensor 402 may record an image, at 420. Based on the recorded image, the visible light sensor 402 may, at 422, process the image to detect environmental characteristics (e.g., presence of sunlight on user's task area, a predefined lighting intensity at users' task area, a color temperature in the space, color temperature depreciation for one or more of light sources, an occupancy/vacancy condition, etc.). The environmental characteristics may be detected by comparing the recorded image with baseline images of the space.

The visible light sensor 402 may determine the command and/or the load control devices 406 to be controlled, at 424, based on the environmental characteristics detected in the images. The command and/or the load control devices 406 to be controlled may be associated with the detected environmental characteristics in memory. The command and/or the load control devices 406 to be controlled may be system defined and/or user defined. The visible light sensor 402 may transmit the command, at 426, to the system controller 404 for transmitting to the appropriate load control devices 406 for being controlled in response to the detected environmental characteristics. The visible light sensor 402 may also, or alternatively transmit the command, at 428, to the load control devices 406 in response to the characteristics detected from the images. If the visible light sensor 402 transmits the command, at 428, directly to the load control devices 406, the system controller 404 may hear the command and maintain the status of the load control devices 406 in memory. The visible light sensor 402 may continue to monitor regions of interest by recording images and the load control devices may be controlled based on the environmental characteristics in the space.

Figure 5:
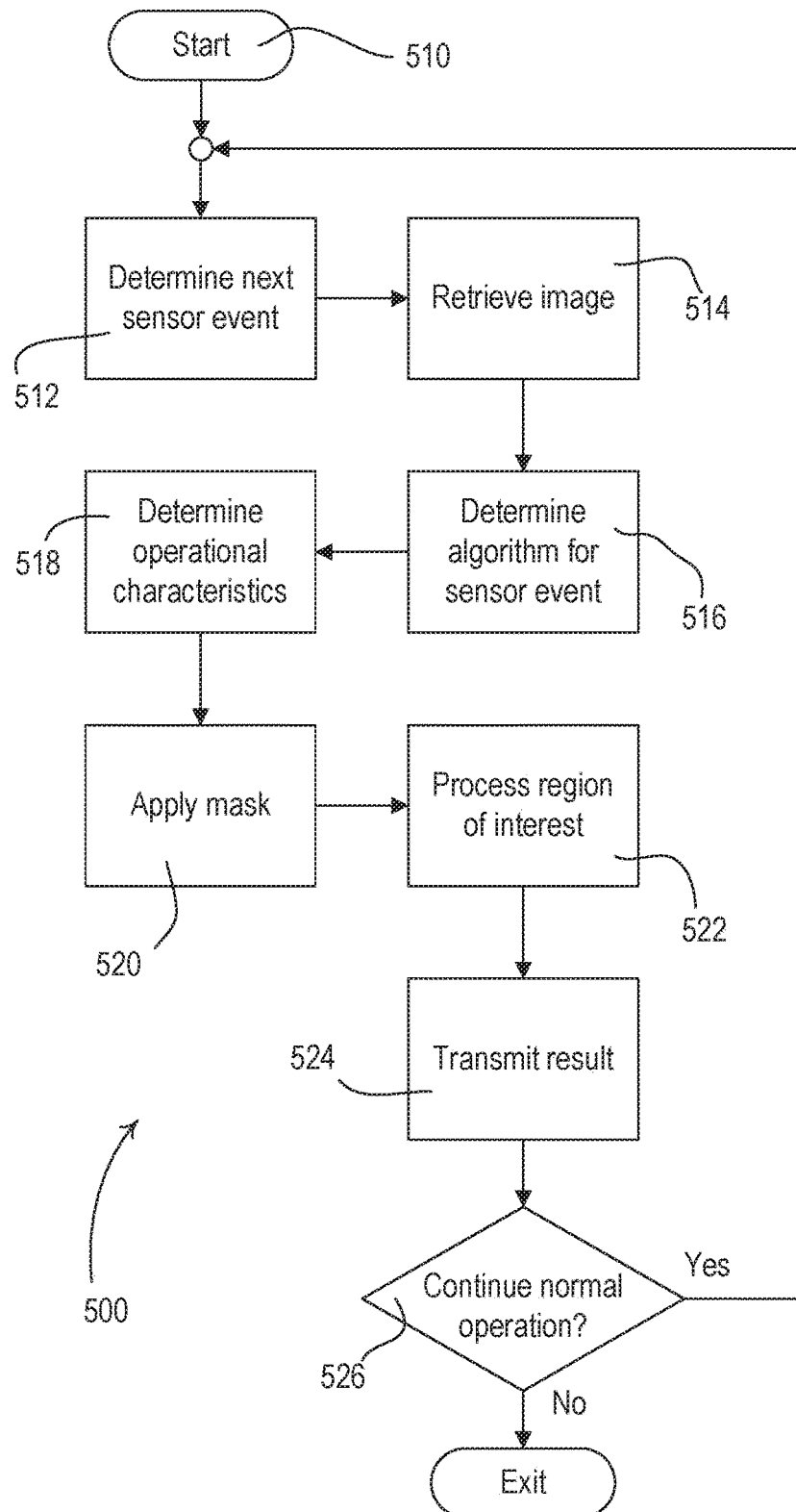
FIG. 5 shows a flowchart of an example sensor event procedure that may be executed by a visible light sensor.

FIG. 5 shows a flowchart of an example sensor event procedure 500 that may be executed by a sensor (e.g., the visible light sensor 180, 300). The sensor event procedure 500 may be executed by a control circuit of the sensor (e.g., the control circuit 310) to step through sensor events to detect a plurality of environmental characteristics of a space (e.g., the room 102 or the room 200). For example, the sensor event procedure 500 may begin at step 510 during normal operation of the sensor. At step 512, the control circuit may determine the next sensor event that may be stored in memory. For example, the first time that the control circuit executes step 512, the control circuit may retrieve the first sensor event from memory. The control circuit may then retrieve an image from a camera and/or an image processor of the sensor (e.g., the camera 322 and/or the image processor 324) at step 514. For example, the control circuit may retrieve a raw image (e.g., a frame acquisition from the camera 322) or a preprocessed image (e.g., a background-subtracted image).

At step 516, the control circuit may determine an algorithm to use to process the image to detect the environmental characteristic of the present sensor event. At step 518, the control circuit may determine control parameters to use when executing the algorithm for the present sensor event. At step 520, the control circuit may apply a mask(s) (e.g., that may be stored in memory for the present sensor event) to the image (e.g., that may be retrieved at step 514) to focus on one or more regions of interest in the image. The control circuit may then process the region of interest of the image using the determined algorithm and control parameters of the present sensor event at step 522 and transmit the result (e.g., via RF signals 108 using the first communication circuit 330) at step 524. If the control circuit should continue normal operation at step 526, the sensor event procedure 500 may loop around to execute the next sensor event at steps 512-524. If the control circuit should cease normal operation at step 526 (e.g., in response to a user input to cease normal operation or other interrupt to normal operation), the sensor event procedure 500 may exit.

Figure 6:
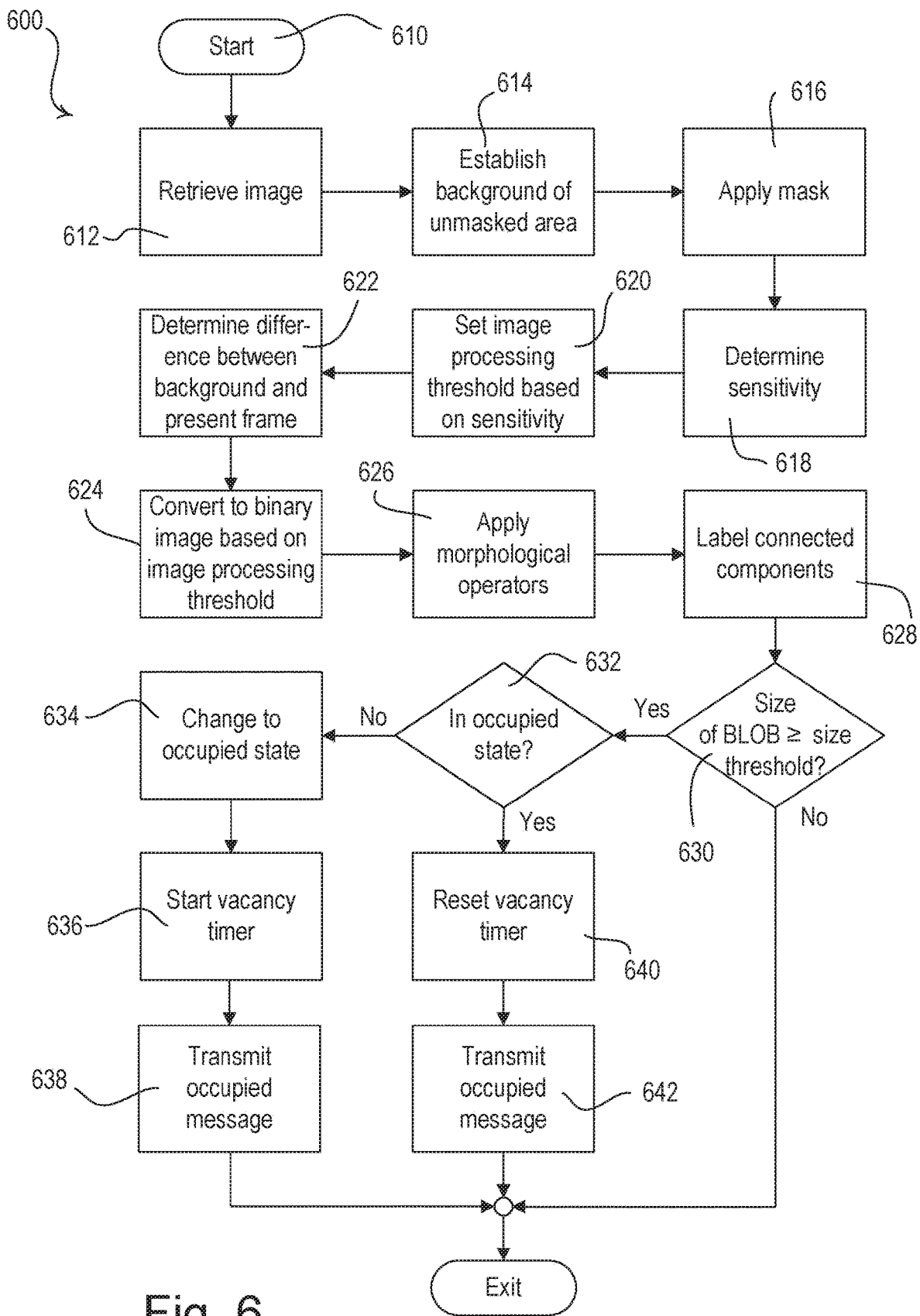
FIG. 6 shows a flowchart of an example occupancy/vacancy detection procedure that may be executed by a visible light sensor.

FIG. 6 shows a flowchart of an example occupancy/vacancy detection procedure 610 that may be executed by a sensor (e.g., the visible light sensor 180, 300) for detecting occupancy and/or vacancy sensor events or conditions in a space. The occupancy/vacancy detection procedure 610 may be performed by a single device, or distributed across multiple devices. The occupancy/vacancy detection procedure 610 may be executed by a control circuit of the sensor (e.g., the control circuit 310) during an occupancy/vacancy sensor mode of the sensor for detecting occupancy/vacancy sensor events. As shown in FIG. 6, the occupancy/vacancy detection procedure 610 may begin at 610. At 612, an image may be retrieved. The image may be a pre-recorded image retrieved from memory, or recorded and retrieved from an image processor or camera. At 614, a background of the unmasked area may be established. The background may be a static image of the space. The background may be pre-defined or established while the sensor is taking images of the space over a period of time. For example, the background may be established over a period of time using a Gaussian mixture model. The background may include objects within the image and a static location of the objects over the period of time. At 616, a mask may be applied to the image, such that the masked portions of the image may not be processed.

A sensitivity level may be determined at 618 for processing the image. The sensitivity level may be adjusted to prevent false triggers for occupancy based on smaller movements within the images. Higher sensitivity levels may trigger an occupancy condition when smaller movements are identified in the image, while lower sensitivity levels may trigger an occupancy condition when greater movements are identified in the image. The sensitivity levels may be user-configured. The sensitivity levels may change based on the region of interest. For example, a lower sensitivity level may be set when the region of interest is an entire room, whereas a higher sensitivity level may be set when the region of interest is on an area of a user's desk (e.g., keyboard, etc.) or other task area within the room.

An image processing threshold may be set based on the determined sensitivity at 620. The image processing threshold may be used to convert to a binary image. To create a binary image from grayscale, the grayscale level (e.g., between white and black) of each pixel may be compared to the image processing threshold to set the grayscale pixels as black or white pixels in the binary image based on the side of the color image processing threshold that the pixels reside. In an example, the image processing threshold may be set to 50%, or a value of 128, and a pixel color value above 128 may be set to white, while a pixel color value at or below 128 may be set to black.

At 622, a difference between the background and the present frame may be determined. The difference may indicate a change in a location of one or more objects within the space. The differences between the background and the present frame may be converted, at 624, to a binary image based on the processing threshold.

The binary image may include one or more binary large objects (BLOBs). At 626, the control circuit may apply morphological operators to the BLOBs in the binary image. The morphological operators may include one or more of a close operation and an open operation. The close operation may be a dilation operation followed by an erosion operation, while the open operation may be an erosion operation followed by a dilation operation. The close operation may fill in small gaps in the BLOBs. The open operation may remove stray, small BLOBs from the binary image. Together, the close and open operations may improve ragged edges, fill in small gaps and remove small features of the BLOBs. At 628, the control circuit may detect connected regions in the BLOBs to define regions that are individual BLOBs (e.g., distinct BLOBs) versus a region that is a single BLOB, for example, using a connected-component labeling algorithm. The connected components labeling algorithm will identify and label the separate BLOBs.

At 630, a determination may be made as to whether the size of one or more of the BLOBs is greater than or equal to a predefined size threshold (e.g., a fixed detection threshold), which may indicate movement of an occupant in the space and thus an occupancy sensor event. If the size of one or more of the BLOBs is greater than or equal to the predefined size threshold (e.g., if a determination of occupancy has been made), a determination may be made as to whether the visible light sensor is operating in an occupied state at 632. If the visible light sensor is not currently in the occupied state, the visible light sensor may change to operation in the occupied state at 634. After the change to the occupied state at 634, the visible light sensor may start a vacancy timer at 636 and transmit an occupied message at 638 that indicates that the space is occupied. If no more determinations of the occupancy condition are made at 630 (e.g., when the occupancy/vacancy detection procedure 610 is subsequently executed), the vacancy timer may run for a predetermined period of time prior to switching the visible light sensor back to the vacancy state. If the visible light sensor is currently operating in an occupied state, the visible light sensor may reset a vacancy timer at 640, and transmit the occupied digital message at 642 to indicate continued movement of the object in the space and that the space is still occupied. If the size of one or more of the BLOBs is less the predefined size threshold (e.g., if a determination of vacancy has been made) at 630, the occupancy/vacancy detection procedure 610 may end (e.g., without resetting or stopping the vacancy timer and/or without transmitted an occupied or a vacant message).

Figure 7:
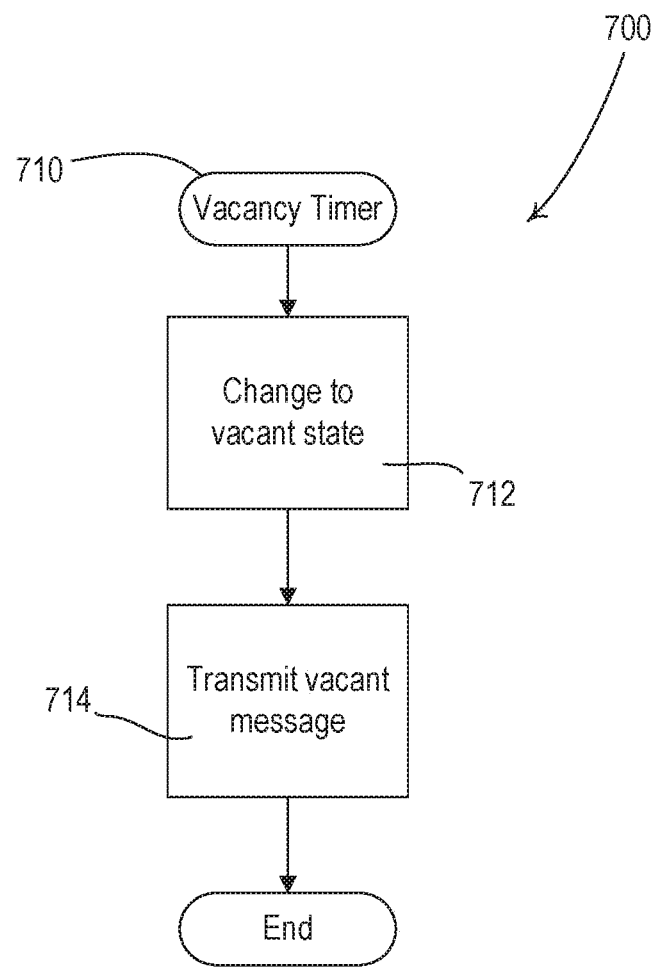
FIG. 7 shows a flowchart of an example vacancy time procedure that may be executed by a visible light sensor.

FIG. 7 is a flowchart of an example vacancy timer procedure 700 executed by a visible light sensor, such as the visible light sensor 180 shown in FIG. 1 and/or the visible light sensor 300 shown in FIG. 3. The control procedure 700 may operate during an occupancy/vacancy sensor mode of the visible light sensor 180, 300.

The vacancy timer procedure 700 may be executed periodically by the control circuit 310 of the visible light sensor 300 control circuit 310 when the vacancy timer expires at step 710. The control circuit 310 may change to the vacant state at step 712 and transmit a vacant message (e.g., via the first communication link using the proprietary protocol) at step 714. The vacancy timer procedure 700 may exit. When the visible light sensor is operating with an infrared (IR) sensor for detecting occupancy/vacancy, the control circuit 310 may disable the visible light sensing circuit 320 until the next occupancy is detected by the IR sensor. Though the vacancy timer procedure 700 is describes as being operated by the visible light sensor, the vacancy timer procedure 700, or portions thereof, may be operated by the system controller.

Figure 8:
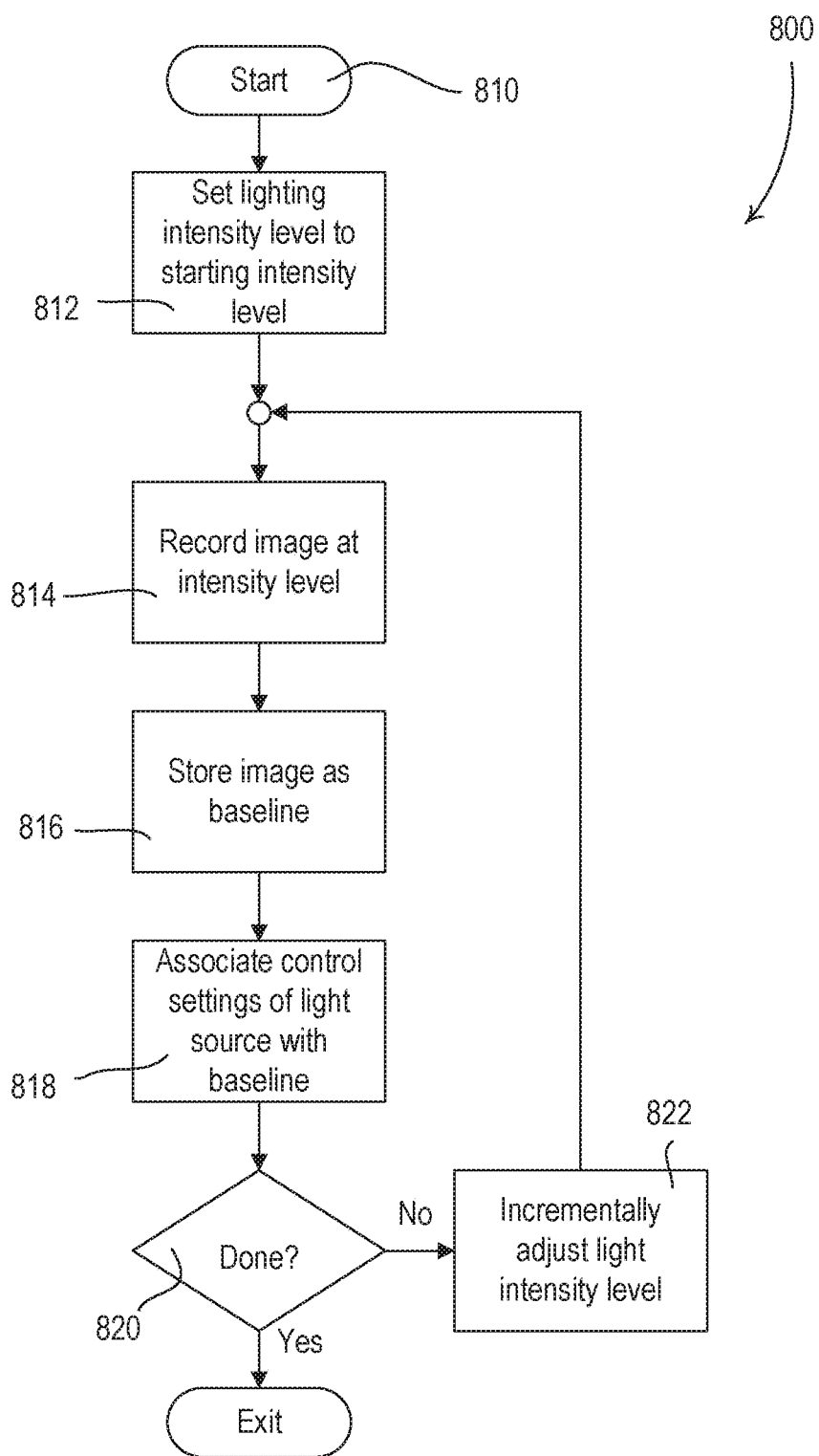
FIG. 8 shows a flowchart of an example baseline configuration procedure for generating and storing baseline images.

FIG. 8 shows a flowchart of an example baseline configuration procedure 800 for generating and storing baselines (e.g., one or more baseline images and/or one or more baseline intensity levels) a of a space (e.g., the room 102). The baseline configuration procedure 800 may be executed by a sensor, such as the visible light sensor 180, 300. The baseline configuration procedure 800 may be executed by a control circuit of the sensor (e.g., the control circuit 310) during a configuration procedure for configuring operation of the sensor during a daylighting sensor mode. The baseline configuration procedure may be executed when daylight and/or ambient light is minimized in the space, for example, at night, when the covering material of the motorized window treatments in the space are in a fully closed position, and/or at another time when daylight and/or ambient light are minimized in the space.

The baseline configuration procedure 800 may begin at 810. At 812, the sensor may set the lighting intensity level to a starting lighting intensity level. The starting lighting intensity level may be a minimum lighting intensity (e.g., approximately 1%), a maximum lighting intensity (e.g., approximately 100%), and/or a lighting intensity between the minimum intensity and the maximum intensity. The sensor may set the lighting intensity to a starting intensity level by adjusting (e.g., via control instructions) one or more lighting control devices (e.g., lighting fixtures 172, 174, 176, 178).

Figure 10A:
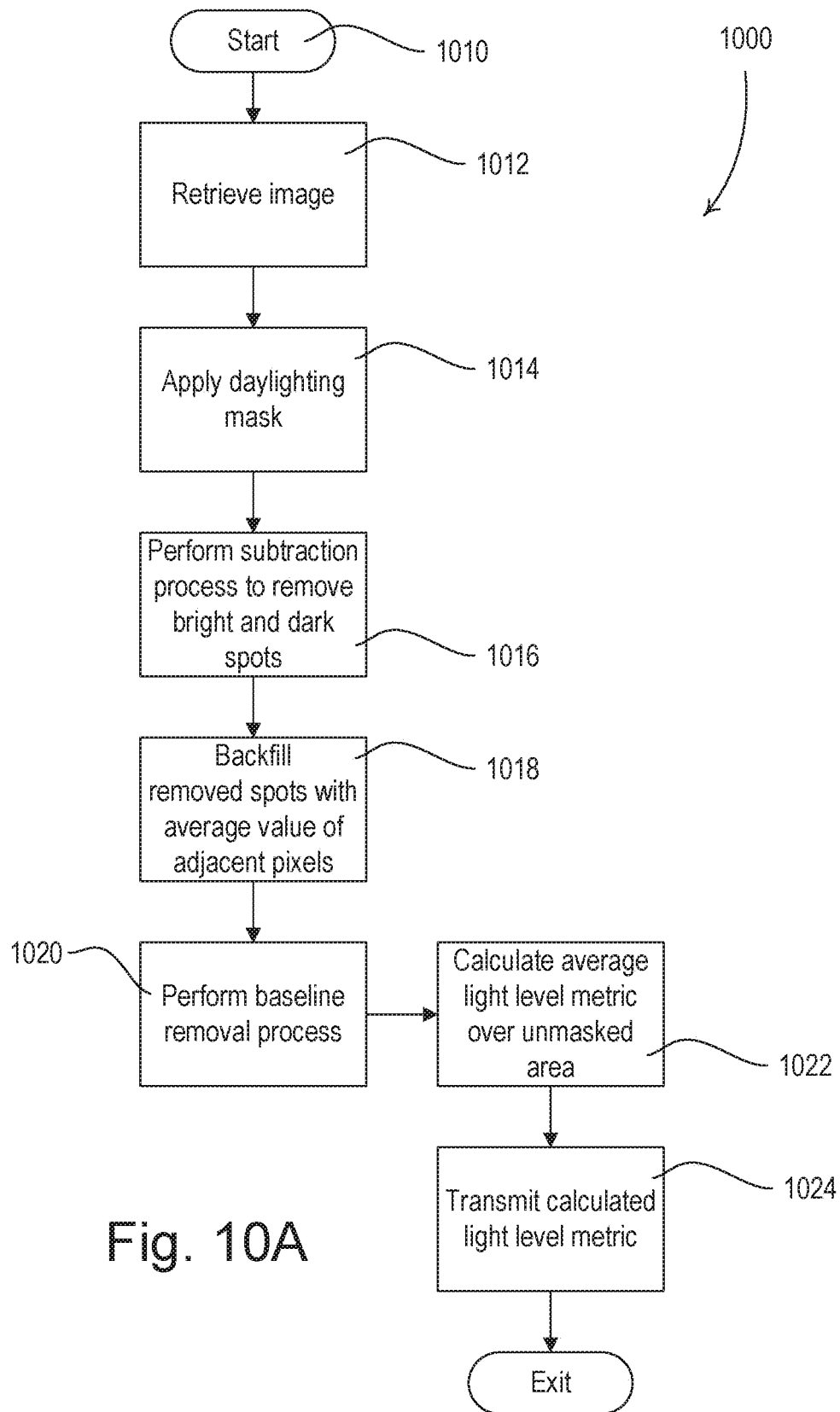
FIG. 10A shows a flowchart of an example procedure for measuring and controlling lighting levels on a task area or other region of interest.

At step 814, the sensor may record an image. For example, the sensor may record one or more images of one or more regions of interest within the space (e.g., the room 102). The sensor may store the recorded image as the one or more baseline image at 816. The sensor may calculate a lighting intensity level that may represent, for example, an average light level in the baseline image may be stored at 816 (e.g. as shown in FIG. 10A), and may set the calculated lighting intensity level as a baseline lighting intensity level.

The sensor may record the control setting of one or more control devices (e.g., lighting fixtures 172, 174, 176, 178; motorized window treatments 150, etc.) that were used when the baseline image was recorded and/or the baseline lighting intensity was determined, and, at step 818, associate the control settings with the baseline lighting intensity image. For example, the sensor may associate lighting fixtures having a dimming level of 25% with the baseline lighting intensity in the recorded baseline image.

A similar process may be performed at different lighting intensity levels to store a baseline image and associated control settings for the different lighting intensity levels. As such, the sensor may begin at a starting intensity level (e.g., 1% or 100%) and step wise (e.g., incrementally) adjust the lighting intensity level by a predefined amount (e.g., 1%, 10%, 25%, 33%, etc.) to record and store the baselines and the corresponding control settings. The sensor may determine, at 820, if the lighting intensity level is the ending lighting intensity level. For example, if the lighting intensity level is a 100% intensity level and the ending level is a maximum intensity (e.g., approximately 100%), the lighting intensity level and the ending lighting intensity level may be the same. If the lighting intensity level and the ending lighting intensity level are the same, the procedure 800 may end. If the lighting intensity level and the ending lighting intensity level are different, the sensor may step up (e.g., incrementally adjust) the lighting intensity level (e.g., the lighting intensity level within room 102) by a predefined amount at 822 and proceed to 812. After adjusting the lighting intensity level, the procedure 800 may move to 814 and record an image at the adjusted lighting intensity level for storing as a baseline image with an associated control setting of the light source.

Figure 9A:
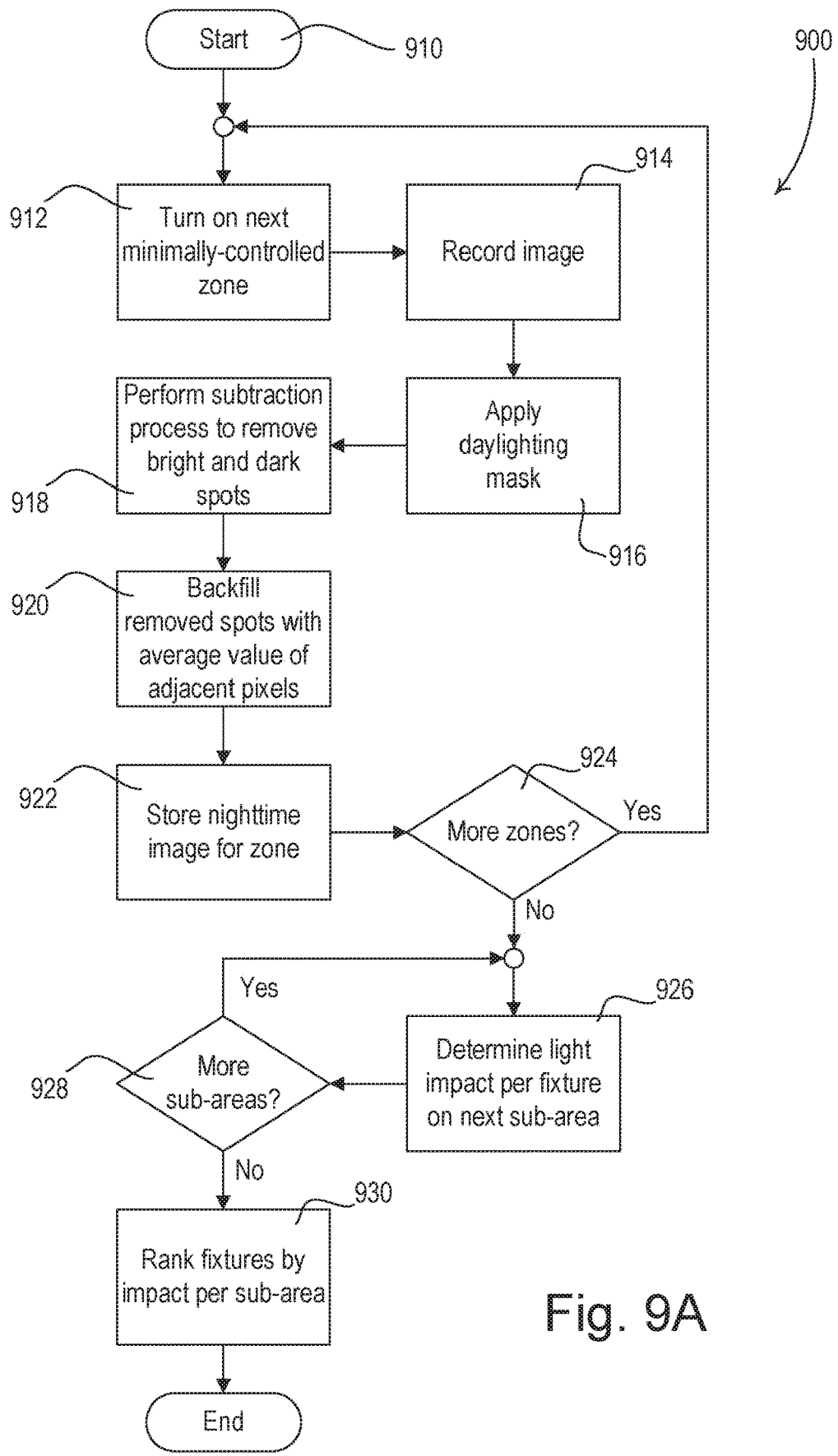
FIG. 9A shows a flowchart of an example procedure for determining the impact of light emitted by lighting fixtures on sub-areas of a space.
Figure 9B:
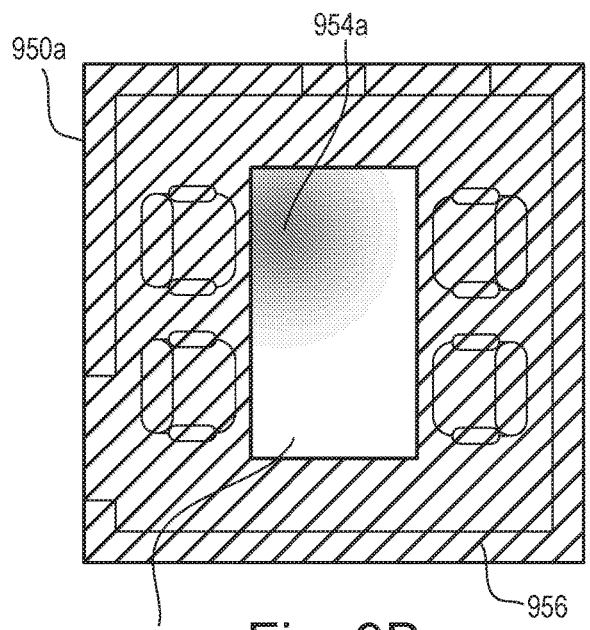
FIGS. 9B-9E show example nighttime images of a room with a mask being applied.
Figure 9C:
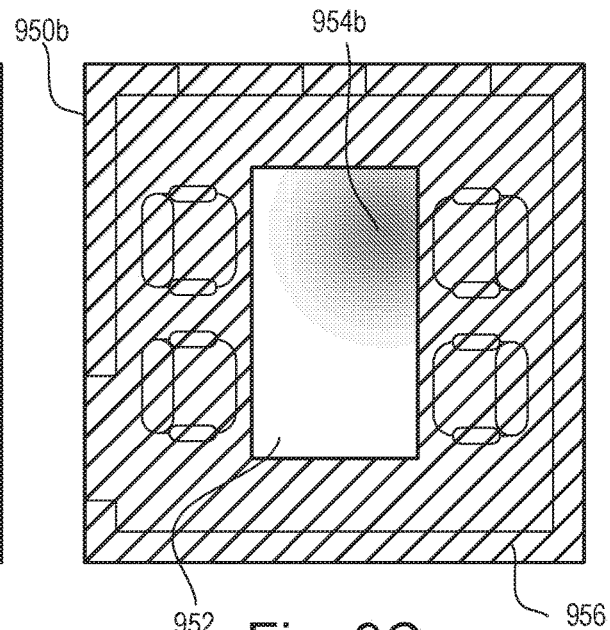
Figure 9D:
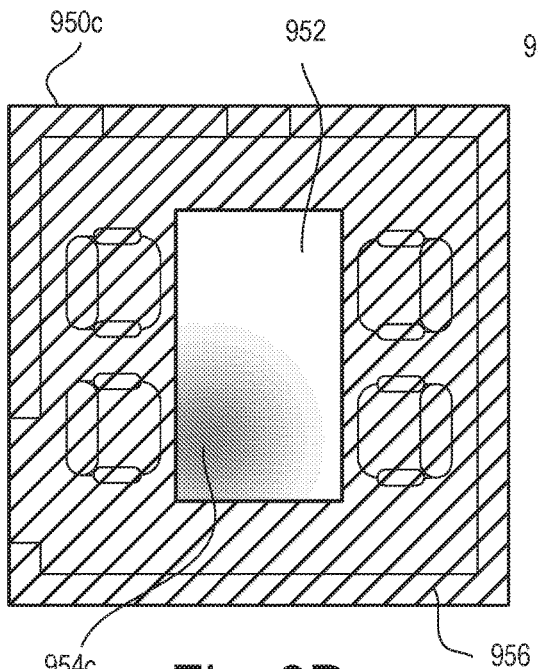
Figure 9E:
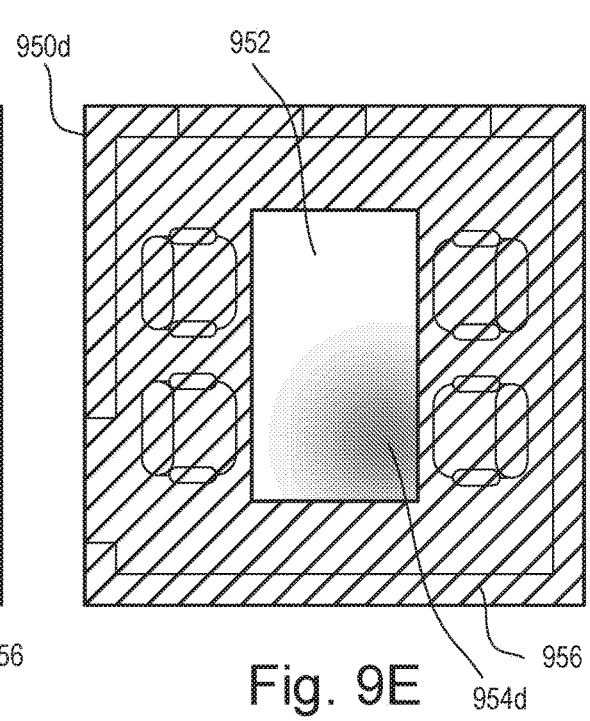

FIG. 9A shows a flowchart of an example procedure 900 for determining the impact of light emitted by lighting fixtures on sub-areas of a space. The procedure 900 may be executed by a sensor, such as the visible light sensor 180, 300. The procedure 900 may be executed by a control circuit of the sensor (e.g., the control circuit 310) at a time when daylight and/or ambient light in the space is minimized, so that the contribution of the artificial light emitted by the lighting fixtures can be determined without being affected by the contribution of daylight and/or ambient light. The procedure 900 may be executed at nighttime and/or when the covering material of the motorized window treatments in the space are in a closed state to prevent entry of daylight light into the space. The images that are stored during the procedure 900 may be used during operation of a daylighting sensor mode of the sensor.

The procedure 900 may begin at 910. At 912, a next minimally-controlled zone may be turned on. A minimally-controlled zone may include one or more lighting loads (e.g., of lighting fixtures 172, 174, 176, 178) that may be independently controlled. For example, where each lighting fixture 172, 174, 176, 178 may be independently controlled, each minimally-controlled zone may include a single lighting load, which means that the next lighting fixture may be turned on at 912. Each minimally-controlled zone may have a single lighting load or multiple lighting loads. When the minimally-controlled zones have multiple lighting loads, the zones may have the same number or different numbers of lighting loads. At 914, the sensor may record an image of the space. A daylighting mask may be applied to the image at 916. The daylighting mask may be applied to areas outside of a task area or other region of interest, or to areas unaffected by the light emitted by the daylighting zone.

A subtraction process may be performed to the image, at 918, to remove bright and/or dark spots within the image. The bright and/or dark spots may represent locations in the image (e.g., on the task area or other region of interest) at which an object may be located. The bright and/or dark spots may represent locations in the image at which reflected light may be shining or a shadow may be located. The objects in the image may not reflect light similarly to the rest of the space (e.g., the task area or other region of interest). The subtraction process may be performed on portions of the image that are above or below a predefined size (e.g., number of pixels) and/or contrast threshold. The subtraction process may be performed by subtracting portions of the image above a predefined brightness threshold and/or below a predefined darkness threshold. Rather than subtracting the portions of the image, a mask may be applied to portions of the image that are above or below the predefined size (e.g., number of pixels) and/or contrast threshold.

The excluded bright and/or dark spots may be backfilled, at 920, to simulate the light emitted by the one or more lighting loads in the zone that are on, if the objects creating the bright and/or dark spots were not present in the image. The removed spots may be backfilled at 920 with an average lighting intensity value of adjacent pixels to the spots. The nighttime image may be stored for the zone at 922 to identify the contribution of the artificial light emitted by the one or more lighting loads in the zone without being affected by the contribution of daylight and/or ambient light.

At 924, a determination may be made whether additional zones are yet to be processed or updated. If additional zones are to be processed or updated, the procedure 900 may return to 912 and the next minimally-controlled zone may be turned on for recording and processing an image when the one or more lighting loads of the zone are turned on. If no additional zones are to be processed or updated, the light impact of each fixture may be determined for each sub-area of the space (e.g., the task area or other region of interest). A sub-area may be comprised of a group of pixels identified within the image (e.g., within the unmasked area of the image).

Figure 12A:
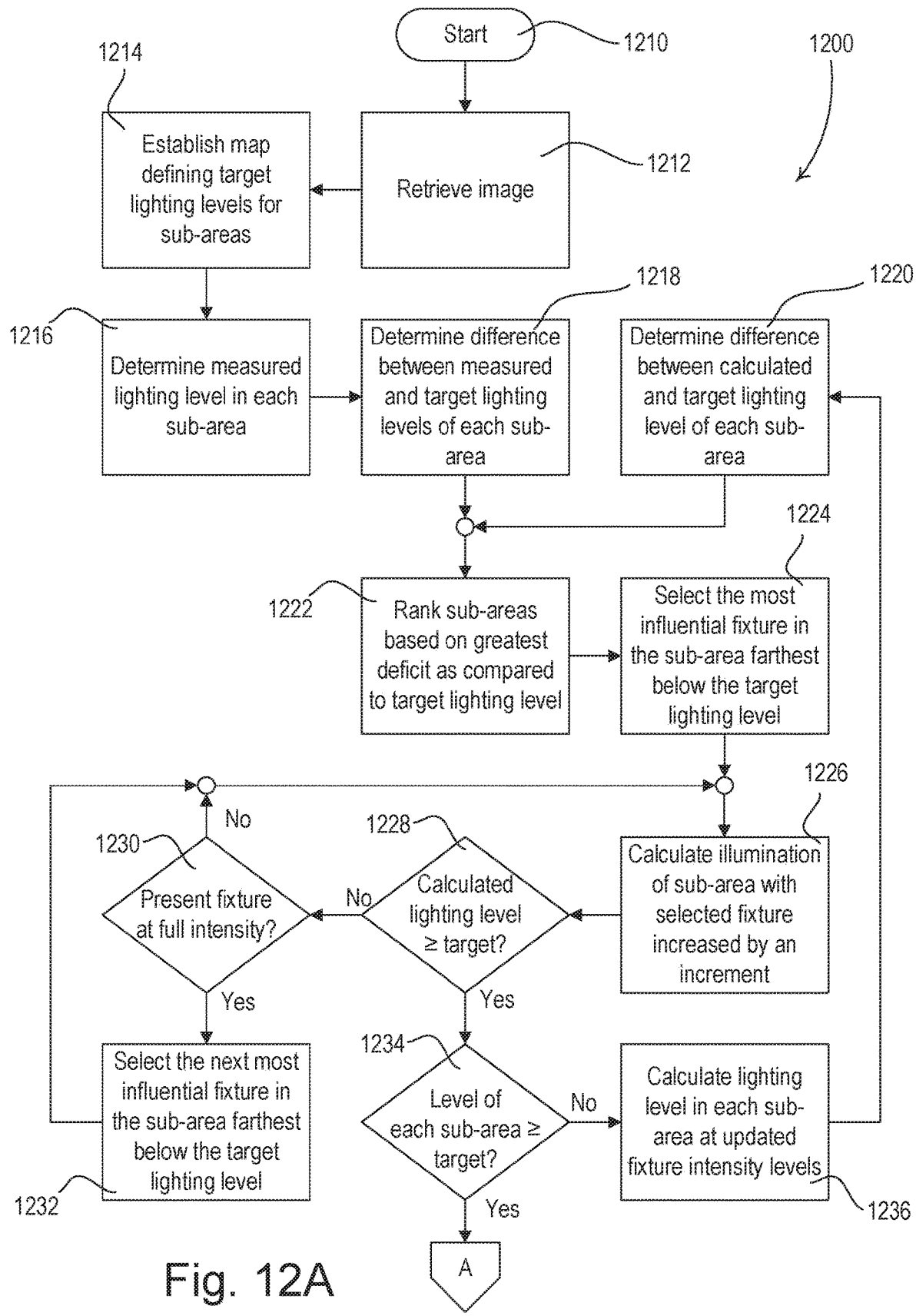
FIGS. 12A and 12B show a flowchart of an example procedure for controlling lighting fixtures to provide a uniform predefined light profile on a task area or other region of interest.
Figure 12B:
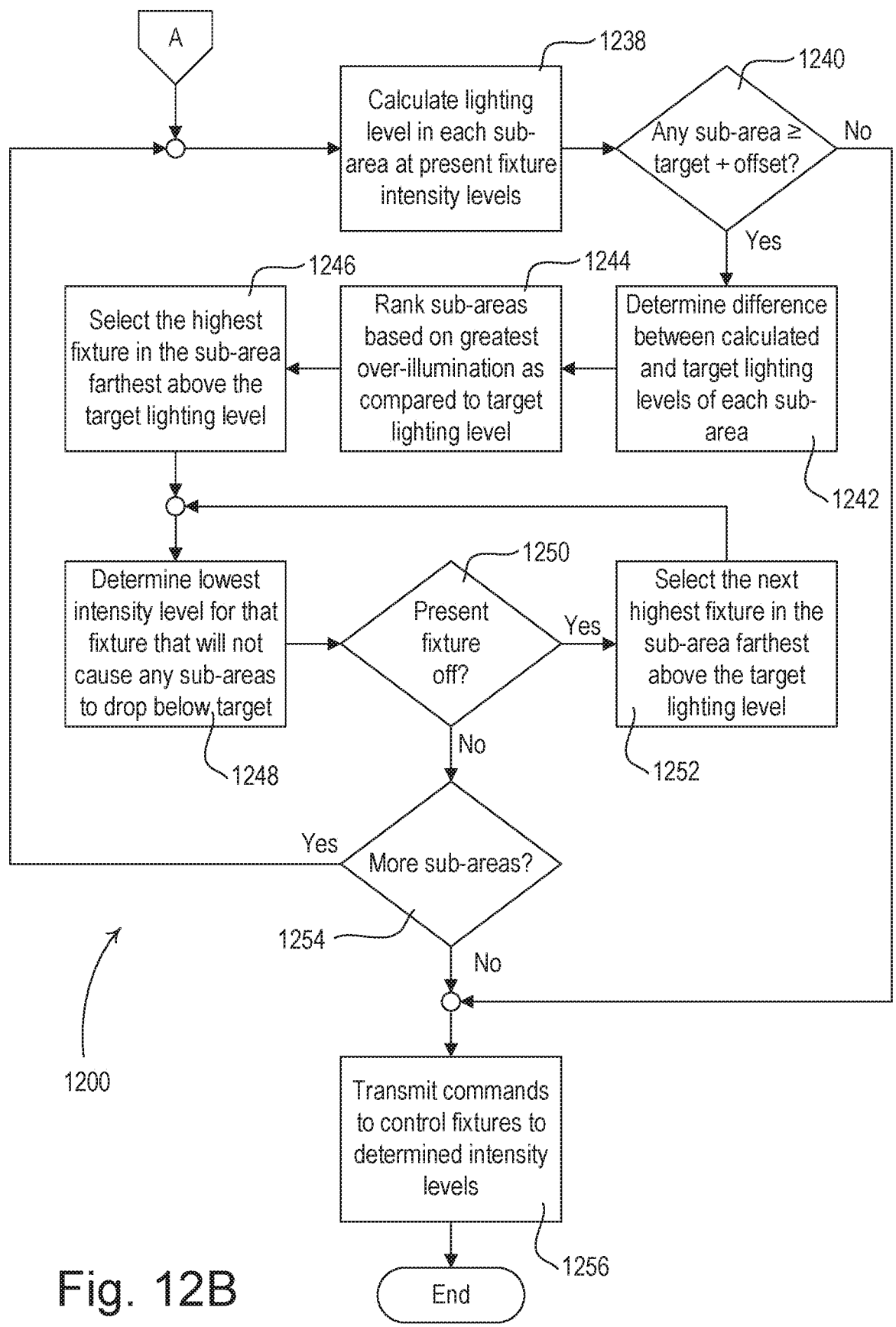

The light impact of each lighting fixture in a sub-area (e.g., of the task area or other region of interest) may be determined, at 926, to understand the fixtures that have the greatest impact on the lighting intensity in each sub-area when turned on. The light impact of each fixture in a sub-area (e.g., of the task area or other region of interest) may be determined, at 926, using recorded images of each lighting fixture being turned on in the space, or one or more zones in the space, and analyzing the sub-area of the image to identify the contribution of the lighting intensity reflected by the light fixture in the sub-area. If there are more sub-areas (e.g., of the task area or other region of interest) for which the light impact per fixture is to be determined at 928, the procedure 900 may return to 926 to determine the light impact of each fixture in the next sub-area. When the light impact of each sub-area in the space (e.g., the task area or other region of interest) has been determined, the fixtures may be ranked by impact per sub-area at 930. The ranking may be used to understand the fixtures to be controlled first to have the greatest impact on the lighting level of sub-areas in the space (e.g., on the task area or other region of interest) during a daylighting sensor mode, as shown in FIGS. 12*a* and 12B, for example. The lighting fixtures having the greatest impact on the lighting level of a sub-area may be controlled first to more quickly reach a desired lighting level or uniform lighting level in the space (e.g., on the task area or other region of interest.

FIGS. 9B-9E show a set of example nighttime images 950*a*, 950*b*, 950*c*, 950*d* of a conference room. The nighttime images 950*a*, 950*b*, 950*c*, 950*d* have a mask 956, such as a daylighting mask, applied to the images mask off the areas of the image outside of a user task surface 952, such as a desk, so that analysis can be performed on the unmasked user task surface 952.

Each image 950*a*, 950*b*, 950*c*, 950*d* illustrates the lighting level contribution of a different lighting fixture without the other lights in the conference room being on, or daylight being present in the room. The dark portions 954*a*, 954*b*, 954*c*, 954*d* represent the portions of the respective images 950*a*, 950*b*, 950*c*, 950*d* that have a higher lighting intensity, which is caused by the lighting fixture being on. The lighting fixtures in each image 950*a*, 950*b*, 950*c*, 950*d* may be turned on at a full intensity (e.g., 100%). The nighttime images 950*a*, 950*b*, 950*c*, 950*d* may be analyzed to identify the contribution of the artificial light emitted by each lighting fixture without being affected by the contribution of daylight. If the user task surface 952 has four sub-areas (e.g., one in each quadrant of the user task surface 952), the nighttime images 950*a*, 950*b*, 950*c*, 950*d* may be used to determine the impact of each lighting fixture on the respective sub-area.

FIG. 10A shows a flowchart of an example procedure 1000 for measuring and controlling a lighting level or daylight lighting level on a task area or other region of interest in a space (e.g. the room 102). The procedure 1000 may be executed by a visible light sensor, such as the visible light sensor 180. The procedure 1000 may be executed by a control circuit of the sensor (e.g., the control circuit 310) during a daylighting sensor mode of the visible light sensor for controlling the lighting loads for daylighting in the space.

The procedure 1000 may begin at 1010. At 1012, an image of the task area or other region of interest may be retrieved. A previously captured image may be retrieved from memory or the image may be retrieved by capturing the image with a camera. A daylighting mask may be applied to the image at 1014. The daylighting mask may be applied to areas outside of the task area or other region of interest, and/or to areas unaffected by the light emitted by the daylighting zone.

A subtraction process may be performed to the image, at 1016, to remove bright and/or dark spots within the image. The bright and/or dark spots may represent locations in the image (e.g., on the task area or other region of interest) at which an object may be located. The objects in the image may not reflect light similarly to the rest of the space (e.g., the task area or other region of interest). The subtraction process may be performed by subtracting portions of the image that are above a predefined brightness threshold and/or below a predefined darkness threshold. The removed bright and/or dark spots may be backfilled, at 1018, to simulate the light emitted by the one or more lighting loads in the zone that are on, if the objects creating the bright and/or dark spots were not present in the image. The removed spots may be backfilled at 1018 with an average lighting intensity value of adjacent pixels to the spots.

Figure 10B:
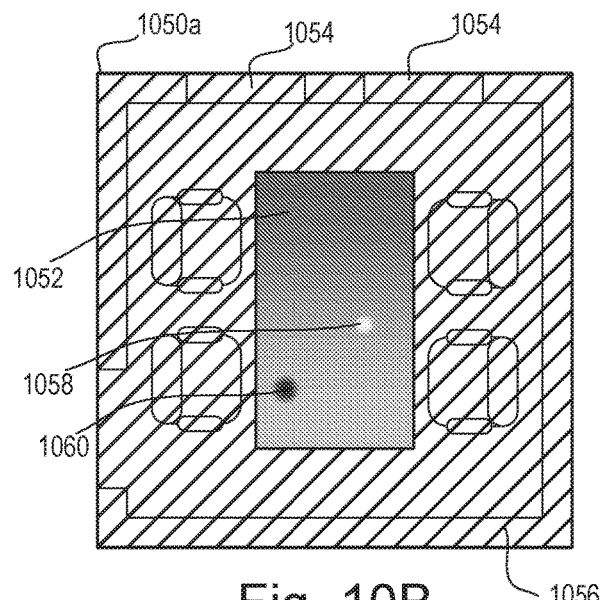
FIGS. 10B-10D show example images that illustrate the subtraction and backfill process.
Figure 10C:
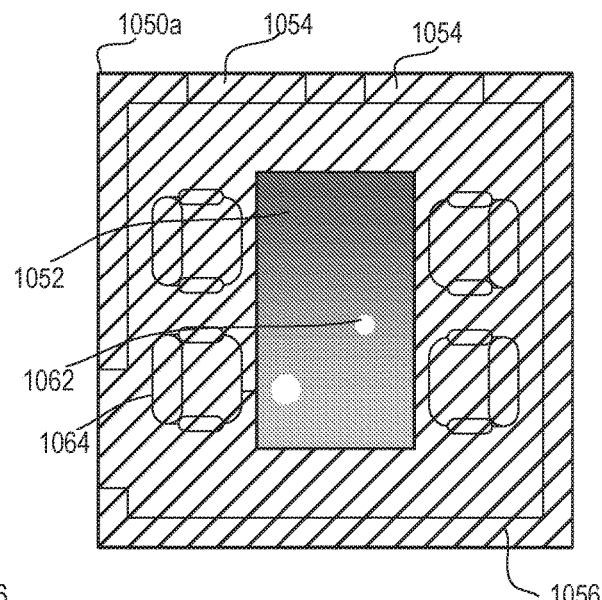
Figure 10D:
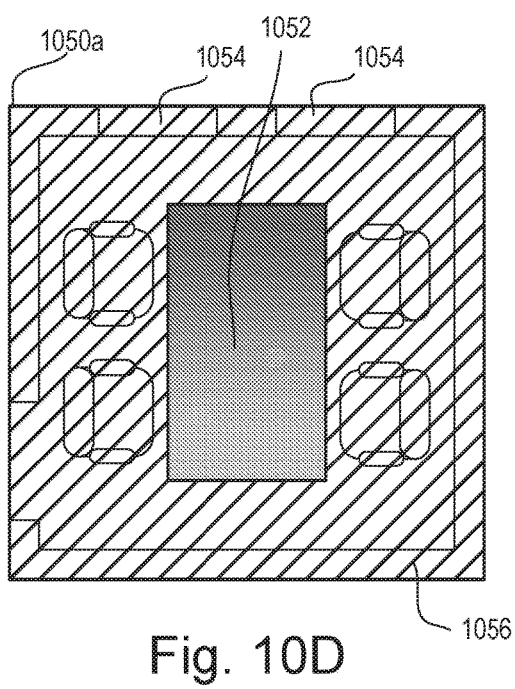

FIGS. 10B-10D shows an image 1050a for illustrating the subtraction and backfill process. The image 1050a may have a mask 1056, such as a daylighting mask, applied to the image to mask off areas of the image outside of a user task surface 1052, such as a desk, so that analysis can be performed on the unmasked user task surface 1052. As shown in FIGS. 10B-10D, artificial light may be shining on the user task surface 1052 from lighting fixtures above the user task surface and daylight may be shining on the user task surface through windows 1054. The darker portions of the user task surface 1052 may represent areas of higher lighting level, which are on the side of the task surface 1052 that is closer to the windows 1054 as shown in FIG. 10B-10D.

As shown in FIG. 10B, the task surface 1052 may include bright spots, such as bright spot 1060 represented with a black spot, and dark spots, such as dark spot 1058 represented as a white spot. FIG. 10C shows the result of the subtraction process (e.g., illustrated in step 1016 of FIG. 10A) being applied to the bright spot 1060 and the dark spot 1058 shown in FIG. 10B. As shown in FIG. 10C, the subtraction process may remove portions 1064 and 1062 that previously included the bright spot 1060 and the dark spot 1058, respectively. The removed portions 1062 and 1064 may be the portions that were above a predefined brightness threshold and below a predefined darkness threshold. FIG. 10D shows the image 1050a after the backfill process is performed (e.g., as illustrated in step 1018 of FIG. 10A).

Referring again to FIG. 10A, at 1020, a baseline removal process may be performed. If the baseline removal process is performed, at 1020, the procedure 1000 may calculate daylight lighting level. If the baseline removal process is not performed, at 1020, the procedure may calculate the total lighting level (e.g., daylight and artificial light) in the space. The baseline removal process may be performed as a function of baseline images, which may be images taken at nighttime or another time during which the artificial light in the space is unaffected by daylight or other ambient light, and the currently retrieved image to remove the portion of the artificial lighting intensity that is contributed by the lighting loads indicated in the baseline images. The baseline images may reflect a baseline lighting intensity in the space when one or more of the lighting loads are turned on to their full potential (e.g., 100% intensity) or to another control setting at which the lighting loads are currently being controlled. The removal of the baseline lighting intensity from the current image may indicate the amount of natural light or ambient light being added to the space.

Figure 10E:
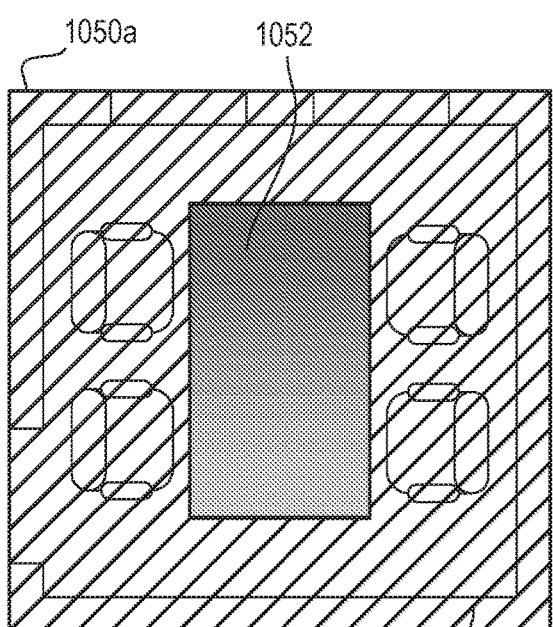
FIGS. 10E-10G show example images that illustrate the baseline process.
Figure 10F:
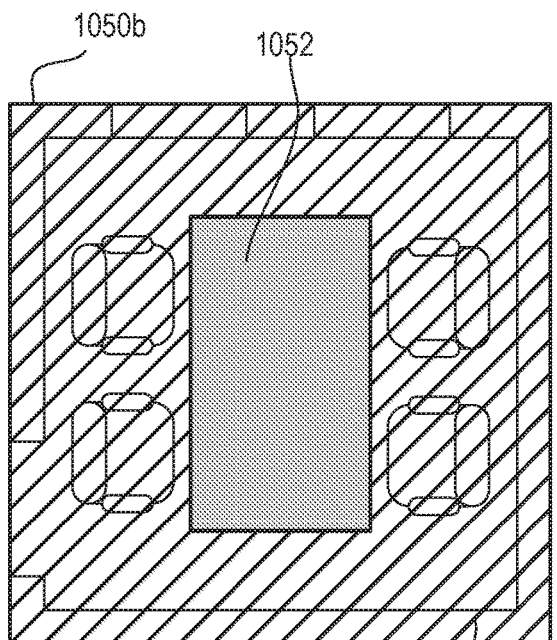
Figure 10G:
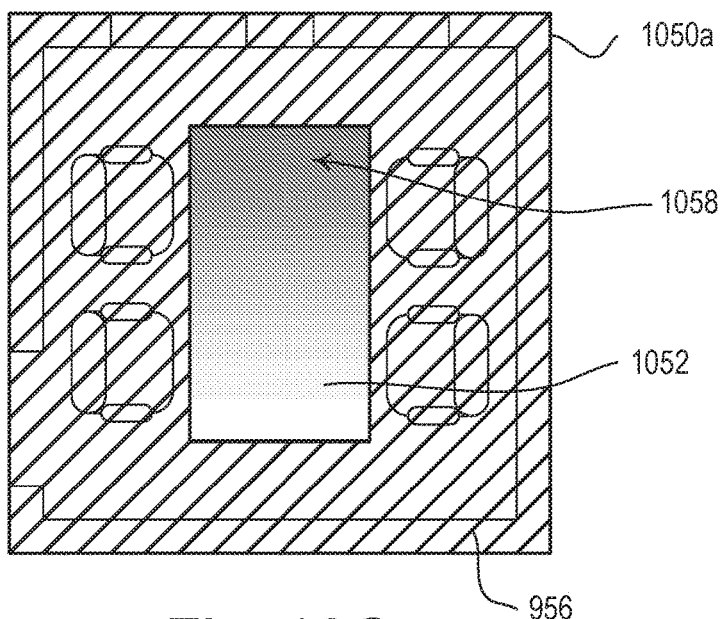

FIGS. 10E-10G illustrate the baseline process (e.g., as illustrated in step 1020 of FIG. 10A) being applied to the image 1050a. As shown in FIG. 10E the image 1050a may include a task surface with light and dark spots removed (e.g., similar to FIG. 10D). FIG. 10F shows a baseline image 1050b, which may represent the contribution of the light emitted by the lighting fixtures to the task surface 1052 when the lighting fixtures are on at their present intensities. The baseline image 1050, may be recorded with the lighting fixtures on to the present intensities (e.g., during the procedure 800 of FIG. 8), or may be generated as the combination of the nighttime images shown in FIGS. 9B-9E that are recorded at maximum intensity (e.g., during the procedure 900 of FIG. 9A) and then scaled to the present intensities of the lighting fixtures. In the example baseline image 1050b shown in FIG. 10F, the lighting fixtures may be on at the same intensity level resulting in a constant lighting level by the lighting fixtures across the task surface 1052 (e.g., what the image 1050a would look like if taken at night with the lights at the present levels). FIG. 10G shows the image 1050a after the baseline removal process (e.g., as illustrated in step 1020 of FIG. 10A). The image 1050a shown in FIG. 10G is the result of the baseline image 1050b shown in FIG. 10F being subtracted from image 1050a in FIG. 10E. The image 1050a shown in FIG. 10G may illustrate the daylight contribution 1058 on the task surface 1052, e.g., without the artificial light contribution.

Referring again to FIG. 10A, an average lighting level metric may be calculated over the unmasked area at 1022. The average light level metric may indicate the contribution to the total lighting intensity, or total daylight contribution, on the task area or other region of interest resulting from the current control setting of the lighting control devices and/or by any daylight or other ambient light. The calculated light level metric may be transmitted at 1024. The light level metric may be transmitted from the visible light sensor to the system controller and/or one or more load control devices, when the light level metric is calculated at the visible light sensor. The light level metric may be transmitted from the system controller to one or more load control devices, when the light level metric is calculated at the system controller. The light level metric may be used to increase or decrease the lighting intensity level of one or more lighting loads in the lighting fixtures to control a total lighting level on a task area or other region of interest. The lighting intensity level may be increased or decreased to reach a target total lighting level on the task area or other region of interest.

When the daylight lighting level is calculated (e.g., using the baseline removal process at step 1020), the visible light sensor may determine how much lighting intensity to produce from the lighting fixtures to achieve the target lighting level after the daylight contribution is subtracted. When the total lighting level is calculated (e.g., without the baseline removal process at step 1020), the visible light sensor may determine how much lighting intensity to produce from the lighting fixtures to achieve the target lighting level.

Figure 11:
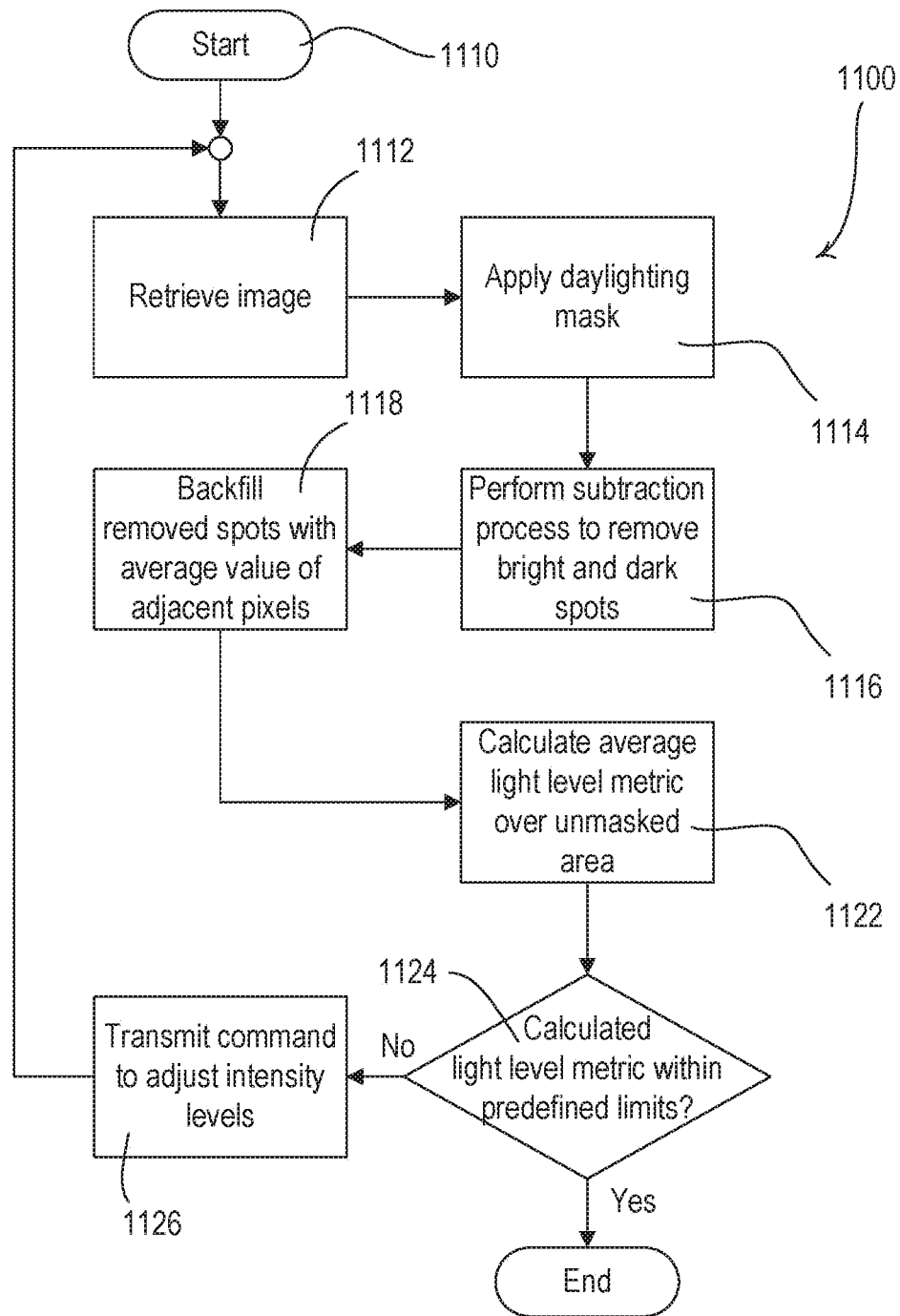
FIG. 11 shows a flowchart of another example procedure for measuring and controlling a lighting level on a task area or other region of interest.

FIG. 11 shows a flowchart of another example procedure 1100 for measuring and controlling a total lighting level (e.g. illuminance or luminance) on a task area or other region of interest in a space (e.g. room 102). The procedure 1100 may be executed by a visible light sensor, such as the visible light sensor 180. The procedure 1100 may be executed by a control circuit of the sensor (e.g., the control circuit 310) during a daylighting sensor mode of the sensor for controlling the lighting loads for daylighting in the space.

The procedure 1100 may begin at 1110. At 1112, an image of the task area or other region of interest may be retrieved. A previously captured image may be retrieved from memory or the image may be retrieved by capturing the image with a camera. A daylighting mask may be applied to the image at 1014. The daylighting mask may be applied to mask of (e.g., exclude) areas outside of the task area or other region of interest, or to areas unaffected by the light emitted by the daylighting zone.

A subtraction process may be performed to the image, at 1116, to remove bright and/or dark spots within the image. The bright and/or dark spots may represent locations in the image (e.g., on the task area or other region of interest) at which an object may be located. The objects in the image may not reflect light similarly to the rest of the space (e.g., the task area or other region of interest). The bright and/or dark spots may represent locations in the image at which reflected light may be shining or a shadow may be located. The subtraction process may be performed by subtracting portions of the image that are above a predefined brightness threshold and/or below a predefined darkness threshold. The removed bright and/or dark spots may be backfilled, at 1118, to simulate the light emitted by the one or more lighting loads in the zone that are on, if the objects creating the bright and/or dark spots were not present in the image. The removed spots may be backfilled at 1118 with an average lighting intensity value of adjacent pixels to the spots.

An average light level metric may be calculated over the unmasked area at 1122. The average lighting level metric may indicate the contribution to the total lighting intensity at the task area or other region of interest (e.g., luminance or illuminance) resulting from the current control setting of the lighting control devices and/or any daylight or other ambient light. A determination may be made, at 1124, as to whether the calculated light level metric is within predefined upper and/or lower limits. The predefined limits may be preferred total lighting levels for the task area or other region of interest. The preferred limits may depend on user preferences and/or the task that is being performed at the task area or other region of interest. For example, an engineer may prefer a lighting intensity of twenty foot candles, while a general task worker may prefer a lighting intensity of fifty foot candles. The visible light sensor may define the limits for the calculated light level metric after identifying one or more of the users within the space. For example, the visible light sensor may identify a user from an image of the user, from a unique identifier of a network device used by the user within the room, audio identification, login identification, etc.

If the calculated lighting level metric is within the predefined limits, the procedure 1100 may end. If the calculated light level metric is outside of the predefined light predefined limits, the sensor may transmit one or more commands to adjust the intensity level of the light sources (e.g., lighting fixtures 172, 174, 176, 178), at 1126. The sensor may continue to monitor the space during the adjustment and the process 1100 may return to 1112. The sensor may stop adjusting the lighting intensity level of the light sources when the calculated light level metric is identified as being within the predefined limits. The sensor may also, or alternatively, identify whether moving the covering material of the motorized window treatments may increase or decrease the total lighting level of the task area or other region of interest without creating undesired daylight glare. If the covering material may be increased or decreased to change the total lighting level of the task area or other region of interest without creating undesired daylight glare, a command may be transmitted to the motorized window treatments to affect the total lighting level.

FIGS. 12A and 12B show a flowchart of an example procedure 1200 for controlling the lighting fixtures to provide a uniform predefined light profile on a task area or other region of interest. The procedure 1200 may be executed by a visible light sensor, such as the visible light sensor 180. The procedure 1200 may be executed by a control circuit of the sensor (e.g., control circuit 310) during a daylighting sensor mode of the sensor for controlling lighting loads for daylighting in the space. The predefined light profile may be a uniform light profile to achieve uniform light levels across the task area, or a gradient profile to achieve varying light levels across the task area (e.g., from a first target light level, such as a measured daylight level, to a second target light level, such as a desired interior light level).

The procedure 1200 may begin at 1210. At 1212, an image of the task area or other region of interest may be retrieved. A previously captured image may be retrieved from memory or the image may be retrieved by capturing the image with a camera. A map (e.g., a target map) of the task area or other region of interest may be established, at 1214. The map may define the target lighting levels for each sub-area of an unmasked portion of the image, e.g., the task area or other region of interest. For example, the target map may define a uniform light profile, or a gradient profile. The map may be defined as a target light profile for the region of interest, which indicates a target lighting level for different sub-areas within the region of interest. The sub-areas may define areas (e.g., groups of one or more pixels) of the unmarked portion of the image that may be analyzed to achieve the target light levels defined by the target map. For example, if the target map defines a uniform light profile, the sub-areas may each have the same target light level. If the target map defines a gradient profile, the sub-areas may have different target lighting levels. A sub-area may be as small as a pixel, such that processing may be performed on a pixel-by-pixel basis. Sub-areas may also be groups of multiple pixels to save on processing power. Each sub-area may include the same number of pixels or pixels within a predefined range of one another. Each sub-area may be distinct without overlapping with another sub-area.

The sub-areas may be established during a configuration procedure (e.g., using a network device, such as the mobile device 190). For example, the image may be displayed to the user on the network device and the user may draw on the image of the task surface, or other region of interest, during configuration of the sensor to establish each sub-area of the task surface. The sub-areas may be established in a similar manner as the regions of interest. The user may also, or alternatively, select a number of sub-areas in a region of interest on the network device, and the network device and/or sensor may automatically divide the region of interest into the number of sub-areas. The region of interest may be automatically divided by detecting sub-areas having the closest light levels.

If the target lighting level is to be uniform across the region of interest, the user may enter a desired target lighting level to be applied across the region of interest at the network device, which may be communicated to the sensor. The user may also, or alternatively, specify a gradient across the region of interest and enter the lighting level at each end of the gradient (e.g., a measured daylight lighting level near a window and a desired lighting level at the interior of the space). When the user selects the end-point lighting level levels for the gradient, the visible light sensor may receive the endpoint lighting levels and automatically determine the target lighting levels for each sub area based on the entered end-point lighting levels. The sub-areas may be automatically divided by detecting sub-areas having the closest lighting levels. The target lighting levels of the gradient may be entered manually on the mobile device and sent to the visible light sensor. For example, a lighting designer may want the ability to define sub-areas of a region of interest and/or enter a target lighting level for each sub-area.

The sub-areas and/or the target lighting levels may be established (e.g., originally or updated) by the network device and/or the sensor learning the sub-areas and/or the target lighting levels. The network device and/or the sensor may identify common regions of interest and/or sub-areas of the region of interest by analyzing images of the occupant in the space. The network device and/or the sensor may identify common lighting levels at the task surfaces, or sub-areas of the task surfaces, and set the common lighting levels automatically.

At 1216, a measured lighting level may be determined in each sub-area of the task area or other region of interest within the image. The measured lighting level may be determined by a process similar to the procedure 1000 shown in FIG. 10A. To calculate the total light level in each sub-area at 1216, step 1020 of the procedure 1000 of FIG. 10A may be eliminated. Alternatively, the daylight contribution in each sub-area may be determined at 1216, in which case step 1020 of the procedure 1000 of FIG. 10A may be executed. A difference between the measured light level in each sub-area and a target light level of each sub-area may be determined at 1218. The difference may be calculated by subtracting the target lighting level from the measured lighting level in each sub-area. An over-illuminated sub-area may be indicated by positive values after calculating the difference. An under illuminated sub-areas may be indicated by negative values after calculating the difference. The sub-areas having the target lighting levels may be indicated by a value of zero after calculating the difference. At 1222, the sub-areas may each be ranked based on greatest difference between the measured lighting level and the target lighting level. The ranking may identify the sub-areas having the greatest deficit in total lighting levels from the target lighting level (e.g., under-illuminated sub areas). At 1224, a lighting fixture may be selected that has the greatest influence on the light level of the sub-area (e.g., from the rank of the fixtures calculated in FIG. 9A) that is the furthest from the target. For example, the lighting fixture may be selected that has the greatest influence on the sub-area of the task area that is the darkest.

At 1226, the visible light sensor may estimate the effect of the most influential fixtures, selected at 1224, on the sub-area by mathematically adjusting the intensity level on to obtain the estimated affect. The sensor may mathematically increase the intensity level of the most influential fixture, selected at 1224, on the sub-area by an increment (e.g., 1%, 5%, 10%, etc.). This mathematical increase may be performed by multiplying the baseline image of the selected fixture by the dimming level of the fixture. At 1226, the sensor may calculate the estimated lighting level of the sub-area after the intensity level of the selected fixture has been increased by an increment to determine whether the target lighting level has been reached in the present sub-area (e.g., the sub-area having the greatest deficit below the target light level). If the calculated lighting level of in the present sub-area is determined, at 1228, not to be greater than or equal to the target lighting level, a determination may be made, at 1230, as to whether the currently selected fixture is at a full intensity. If the currently selected fixture is not at full intensity, the visible light sensor may continue to mathematically increase the intensity level of the currently selected fixture and calculate the estimated lighting level of the sub-area after the increase in the intensity level until the target lighting level is reached or the currently selected fixture is at a full intensity.

If the sensor determines that the currently selected fixture is at a full lighting intensity, the lighting fixture that has the next greatest influence on the lighting level of the sub-area (e.g., from the rank of the fixtures calculated in FIG. 9A) may be selected, at 1232. The lighting fixture that has the next greatest influence on the light level of the present sub-area may be determined from the rank of the fixtures determined in FIG. 9A. The intensity level of the next most influential fixture on the sub-area may be mathematically increased by an increment (e.g., 1%, 5%, 10%, etc.). The procedure 1200 may return to 1226, at which the visible light sensor may calculate the lighting level of the sub-area after the intensity level of the selected fixture has been mathematically increased by an increment. This mathematical increase may be performed by multiplying the baseline image of the selected fixture by the dimming level of the fixture. The intensity level of the next most influential fixture on the sub-area may be mathematically increased until the calculated lighting level is determined, at 1228, to be greater than or equal to the target lighting level. When the calculated lighting level is determined to be greater than or equal to the target lighting level, the visible light sensor may transmit a digital message to the lighting fixture(s) with control instructions for making the calculated changes.

At 1234, a determination may be made as to whether the lighting level of each sub-area is greater than or equal to the target lighting level. If the lighting level of a sub-area is less than the target lighting level, the lighting level in each sub-area may be calculated at the updated fixture intensity levels at 1236. As the lighting levels of the previously selected fixtures may affect the lighting level of multiple sub-areas, the lighting level in each sub-area may be recalculated after attempting to increase the lighting level of a single sub-area. The procedure 1200 may proceed to 1220 to determine the difference between the updated fixture intensity levels and the target lighting levels of each subarea and proceed through steps 1222-1234 until the lighting level of each sub-area is greater than or equal to the target lighting level. The procedure may then proceed to FIG. 12B.

As illustrated in FIG. 12B, the lighting level in each sub-area may be calculated at the present fixture intensity levels, at 1238. The lighting level in each sub-area may be analyzed to determine whether the lighting level in any sub-area is greater than an upper-limit lighting level. The upper-limit lighting level of a sub-area may be set to the target lighting level of the sub-area plus a predefined offset. At 1240, if the lighting level of any sub-area is greater than or equal to the target plus a predefined offset, the lighting intensity level of the lighting fixtures may be too bright and may be adjusted to closer to the target lighting level. If, at 1240, a determination is made that the lighting level of each sub-area is above the target, but less than the target plus the offset, the sensor may transmit one or more digital messages to the lighting fixture(s) and/or to the system controller with control instructions at 1256, to control the fixtures to the determined intensity levels.

If, at 1240, a determination is made that the lighting level of any sub-area is above the target plus the predefined offset, the difference between the calculated lighting level of those sub-areas and the target lighting levels may be determined at 1242. At 1244, the over-illuminated sub-areas may be ranked from the greatest over-illuminated sub-area to the least over-illuminated sub-area. The fixture with the highest lighting intensity level affecting the lighting level of the sub-area may be selected, at 1246, for being adjusted. At 1248, a lower intensity level may be determined for the selected fixture. The lower intensity level may be the lowest intensity level for the selected fixture that will not cause any sub-areas to drop below the target lighting level. The lower intensity level of the selected fixture may be calculated as a percentage based on the illuminance distribution of the fixture for the sub-areas and the known amount of change for each sub-area that is caused by the percentage of change in the intensity level of the selected fixture. As the adjusted intensity level may cause the fixture to turn off, a determination may be made at 1250 as to whether the fixture would be turned off. If the lower lighting intensity level of the fixture would cause the fixture to turn off, the next highest fixture above the target lighting level with the highest lighting intensity level affecting the lighting level of the sub-area may be selected, at 1252, for being adjusted. The lowest lighting intensity level for each of the selected fixtures may continue to be determined, at 1248, until it is determined that the lowest lighting intensity level does not cause the selected fixture to turn off at 1250.

After the lighting intensity level of at least one fixture is adjusted, a determination may be made at 1254 as to whether there are other sub-areas for which the lighting level should be calculated since the adjustment of the fixture. If there are other sub-areas for which the lighting level should be calculated, the procedure 1200 may return to 1238 to calculate the lighting level and the sub-areas may continue to be evaluated to determine whether any sub-area is above the target lighting level by the offset, at 1240. The offset may be a tolerance level above the target lighting level. After each sub-area has been calculated after the adjustment of one or more fixtures and is determined to be above the target lighting level, but below the upper target light level, the sensor may transmit one or more digital messages to the lighting fixture(s) and/or to the system controller with control instructions, at 1256, to control the fixtures to the determined intensity levels.

Figure 13:
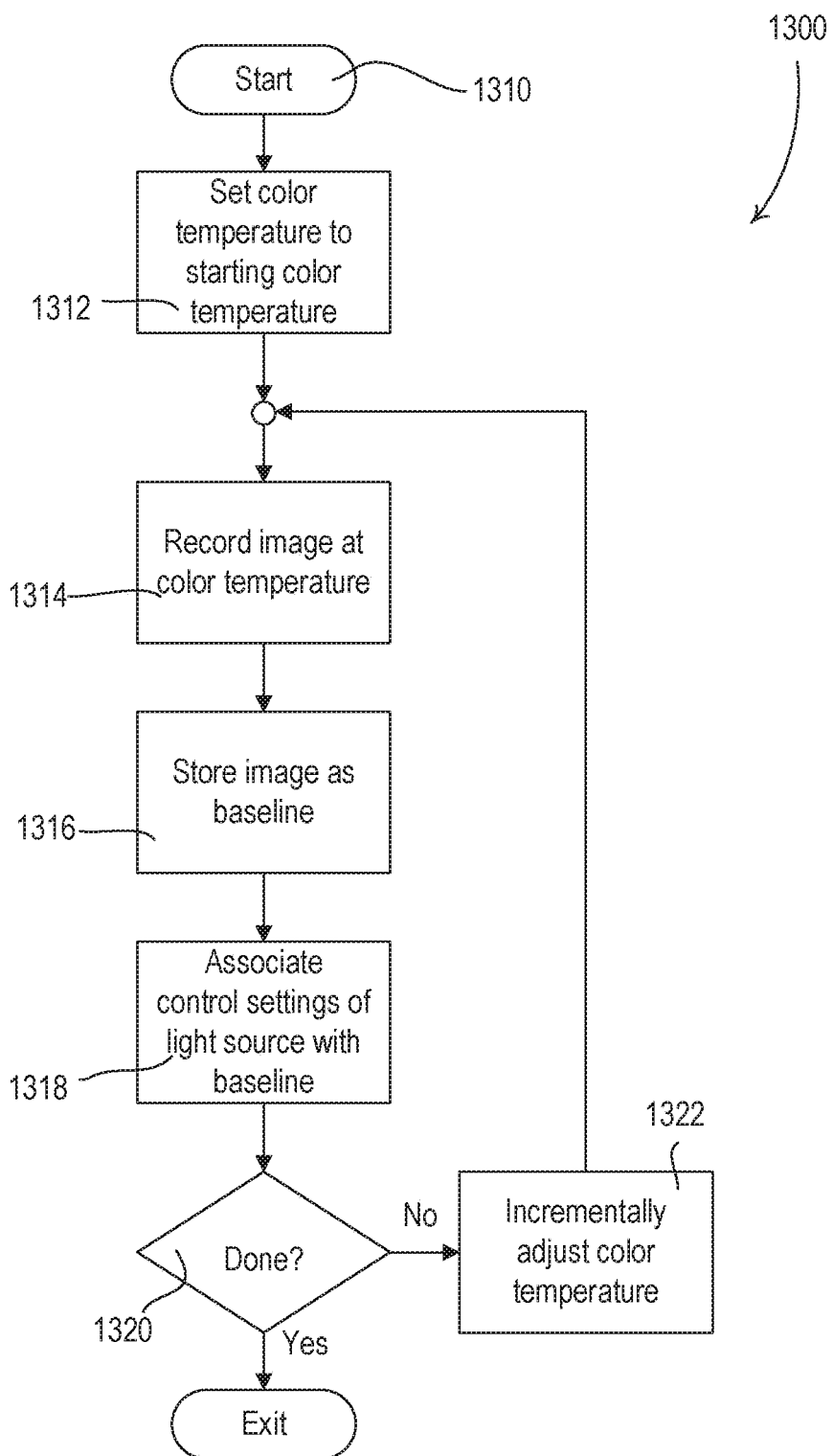
FIG. 13 shows a flowchart of an example baseline configuration procedure that may be executed by a visible light sensor and/or a system controller.

FIG. 13 shows a flowchart of an example baseline configuration procedure 1300 that may be executed by a visible light sensor, such as the visible light sensor 180. The baseline configuration procedure 1300 may be executed by a control circuit (e.g., the control circuit 310) during a configuration procedure for configuring operation during the color sensor mode of the sensor.

The baseline configuration procedure 1300 may begin at 1310. At 1312, the sensor may set the color temperature to a starting color temperature. The starting color temperature may be an extreme color temperature on the color spectrum (e.g., 2,000 Kelvin or 6,500 Kelvin on the black body curve). The sensor may set the color temperature to a starting color temperature by adjusting one or more lighting control devices (e.g., lighting fixtures 172, 174, 176, 178).

At 1314, the sensor may record an image. For example, the visible light sensor may record one or more images that include one or more regions of interest within the space. The sensor may, at 1316, store the recorded image as a baseline image. The color temperature presented within the image may be set as the baseline color temperature.

The sensor may record the control setting of one or more control devices (e.g., lighting fixtures 172, 174, 176, 178; motorized window treatments 150, etc.) that were used to present the baseline color temperature. At step 1318, the sensor may associate the control settings with the baseline color temperature. For example, the sensor may associate lighting fixtures presenting 4,500 Kelvin with the baseline color temperature.

The sensor may determine, at 1320, if the color temperature is the ending color temperature. For example, if the color temperature in the image is 4,500 Kelvin and the ending color temperature is 4,500 Kelvin, the color temperature and the ending color temperature may be the same.

A similar process may be performed at different color temperatures to store a baseline image and associated control settings for the different color temperatures. As such, the sensor may begin at a starting color temperature (e.g., on the black body curve) and incrementally adjust (e.g., by 1 Kelvin, 10 Kelvin, 50 Kelvin, 100 Kelvin, etc.) the color temperature by a predefined amount (e.g., along the black body curve) to record and store the baselines and the corresponding control settings for each color temperature. If the color temperature and the ending color temperature are different, the sensor may move to 1322 and incrementally adjust the color temperature (e.g., by a predefined amount along the black body curve). For example, the sensor may transmit a message to one or more lighting control devices to incrementally adjust the color temperature toward the ending color temperature. After adjusting the color temperature, the procedure may move to 1314 and record an image at the adjusted light color temperature. The procedure 1300 may continue until the ending color temperature is reached.

Figure 14:
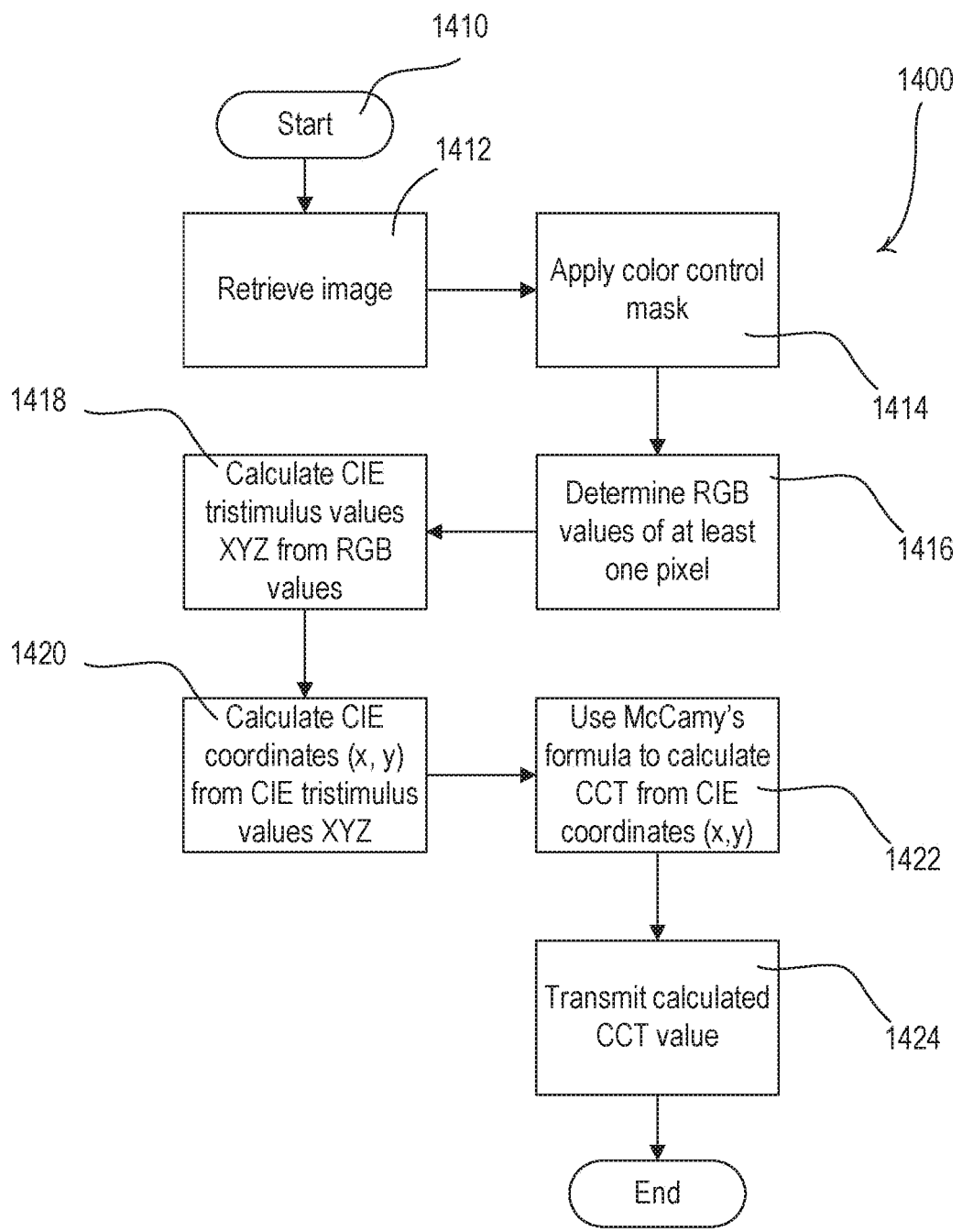
FIG. 14 shows a flowchart of an example procedure for controlling a correlated color temperature (CTT) value based on an image.

FIG. 14 shows a flowchart of an example procedure 1400 for controlling a correlated color temperature (CTT) value based on an image. The color temperature may be controlled to approximate the color temperature of a black-body radiator which to human color perception most closely matches the light from the sun. The procedure 1400 may be executed by a visible light sensor, such as the visible light sensor 180. The procedure 1400 may be executed by a control circuit 310 of the sensor (e.g., the control circuit 310) during a color sensor mode of the sensor.

The procedure 1400 may begin at 1410. At 1412, an image of a task area or other region of interest may be retrieved. A previously captured image may be retrieved from memory or the image may be retrieved by capturing the image with a camera. A color control mask may be applied to the image at 1414. The color control mask may be applied to disregard portions of the image outside of regions of interest having one or more known colors. For example, the color control mask may be applied to disregard the areas outside of a portion of the task area having a known color. The portion of the task area may include a color wheel or another object (e.g., piece of paper, a mobile device of a user, keypads, sensors, etc.) that may be identified in the image or in a predefined location.

The sensor may be configured to determine RGB values of at least one pixel in the image at 1416. A camera on the visible light sensor may take an R, G, and B reading per pixel. The R, G, and B readings may be included in the image data. The sensor may generate high-dynamic-range (HDR) images or lower resolution images that include different types of image data for being processed.

In one example, the image may include a color wheel that may be configured to display one or more colors. The color wheel may include standard RGB colors. The sensor may use the color wheel to determine the RGB values. The sensor may be configured to record an image of the color wheel and measure a color temperature of a light emitted by one or more of the lighting fixtures (e.g., lighting fixtures 172, 174, 176, 178) using the color wheel. The colors on the color wheel may be identified in the reflected light in the generated images of the space. A relative difference in color temperature from the colors on the color wheel may be identified in the reflected light captured in the generated images. The color temperature of the light in the space may cause a shift in the colors detected by the sensor on the color wheel. The sensor may calculate the shift in the color temperature from the known colors on the color wheel. This shift may indicate the color temperature of the light in the space.

At 1418, CIE tristimulus values (XYZ) may be calculated from the RGB values. The CIE coordinates (x, y) on the blackbody curve may be calculated, at 1420, from the CIE tristimulus XYZ values. The sensor may map a sensor response (RGB) to the CIE tristimulus values (XYZ) to calculate the chromaticity coordinates (x, y) and the CCT. One or more equations may be used to map the RGB and the XYZ values. For example, X may be calculated as $(-0.14282)(R)+(1.54924)(G)+(-0.95641)(B)$; Y (e.g., luminance) may be calculated as $(-0.32466)(R)+(1.57837)(G)+(-0.73191)(B)$, and/or Z may be calculated as $(-0.68202)(R)+(0.77073)(G)+(0.56332)(B)$. This example may be different based on the camera and/or other hardware on the sensor. The color temperature presented within the room may be based on one or more factors, including, for example, the presence and/or color of light emitting diodes (LEDs) presenting a particular color, the age and/or operability of LED light sources, etc. The x coordinate of the CIE coordinates (x, y) may be calculated from the CIE tristimulus XYZ values using the formula $$x = \frac{X}{X+Y+Z}.$$

The y coordinate of the CIE coordinates (x, y) may be calculated from the CIE tristimulus XYZ values using the formula $$y = \frac{Y}{X+Y+Z}.$$

At 1422, McCamy's formula may be used to calculate the CCT from the CIE coordinates (x, y). The calculated CCT value may be transmitted to the system controller or the lighting fixtures for changing the color temperature of the light emitted by the lighting fixtures. The system controller or the load control device may generate control instructions for changing the color temperature based on the calculated CCT value.

Figure 15:
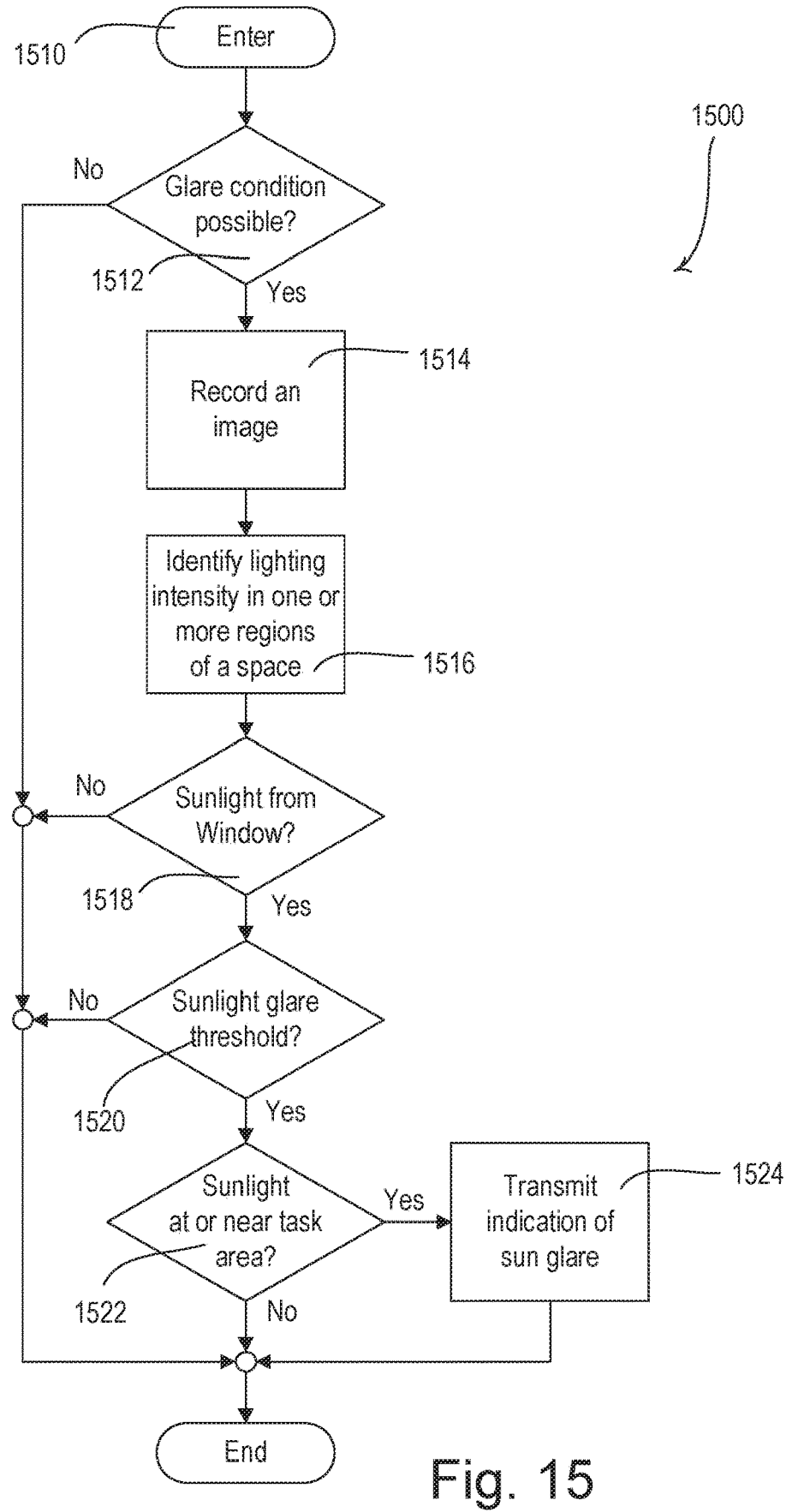
FIG. 15 shows a flowchart of example glare detection and control procedure.

FIG. 15 shows a flowchart of an example glare detection and control procedure 1500. The glare detection and control procedure 1500 may be executed by a sensor, such as the sensor 180. The glare detection and control procedure 1500 may operate during a daylight glare sensor mode of a sensor, such as the sensor 180.

The glare detection and control procedure 1500 may begin at step 1510. At step 1512, the sensor may determine whether a glare condition is possible. For example, the sensor may determine whether a glare condition is possible based on the time of day, time of year, location of the building, direction of the windows, position of the sun in the sky, weather conditions, etc., that may be used to determine the intensity of sunlight at the space.

If the glare condition is determined to be impossible or improbable at 1512, the procedure 1500 may end. If the glare condition is determined to be possible, the procedure 1500 may move to step 1514, and the sensor may record an image. For example, the sensor may record one or more images that include one or more regions of interest within a space.

The sensor may analyze the images and identify a lighting intensity in one or more regions of the space at 1516. The sensor may analyze the images and identify a relative difference of light in the space. For example, the sensor may determine whether two or more light intensities are being presented within the space. Each lighting intensity may be determined by applying a respective mask or baseline to a region of interest. The two or more light intensities presented within the space may be from different sources or the same source. For example, a lighting intensity may relate to sunlight or ambient light being presented in space and/or a lighting intensity may relate to artificial light being presented into the space. The sunlight may enter the space from a window and artificial light may be presented in the space lighting fixtures, such as lighting fixtures 172, 174, 176, 178. The sensor may analyze the light intensities and identify whether the light intensities are sunlight or artificial light. For example, the sensor may identify a lighting intensity as sunlight if the lighting intensity is being presented within a predefined distance from the window. If, at 1518, the lighting intensity is artificial light, the procedure 1518 may end. If the lighting intensity is sunlight provided from the direction of the window, the procedure 1500 may move to 1520.

The sensor may determine if one or more of the light intensities (e.g., the lighting intensity relating to the sunlight provided by the window) exceeds a sunlight glare threshold, at 1520. The sunlight glare threshold may be a preferred sunlight glare threshold provided by the user. The sunlight glare threshold may be a recommended sunlight glare threshold provided by the lighting manufacturer or lighting designer. A localized measure of the lighting intensity (e.g., luminance) may provide a measure of the lighting intensity to determine if it is glare. For example, a pixel area measure of the luminance may provide a measure of the lighting intensity to determine if it is glare. If the lighting intensity relating to the sunlight fails to exceed a sunlight glare threshold, the procedure 1500 may end. If the lighting intensity relating to the sunlight does exceed a sunlight glare threshold, the sensor may determine one or more regions of interest in which the sunlight reaches. For example, at 1522, the sensor may determine if the sunlight reaches the user task area and/or an area surrounding (e.g., within a predefined distance of) the user task area (e.g., desk 106, monitor 166, a predefined area around user 192, etc.).

If the sunlight fails to reach at the task area, the procedure 1500 may end. If, however, the sunlight does reach the task area, the covering material of each of the motorized window treatments in the space may be adjusted. For example, the sensor may transmit an indication of sun glare at 1524. The sensor may transmit the indication of sunlight glare to the system controller or directly to the motorized window treatments. The system controller may transmit the indication of sunlight glare or control instructions for control instructions for moving the covering material to the motorized window treatments. The motorized window treatments may adjust the covering material in response to the indication or control instructions so that the sunlight fails to reach the task area, or the area surrounding the task surface (e.g., within a predefined distance thereof). The covering material of each of the motorized window treatments may be adjusted a predefined amount (e.g., 10%, 30%, 60%, 90%, etc.) and/or the covering material of each of the motorized window treatments may be adjusted using the amount of sunlight that is permitted by the covering material of each of the motorized window treatments. For example, the sensor may continually transmit messages to adjust the covering material of each of the motorized window treatments until the sunlight is identified in the generated images as failing to reach, or failing to reach a predefined distance from, the task area. After the window treatment is properly adjusted, the procedure 1500 may end.

Though steps may be described herein as being performed by the sensor, the sensor may record the images and provide the images to the system controller for performing image analysis, control procedures, and/or other functions described herein.

As described in FIG. 15, the sensor may be configured to identify whether one or more light intensities are sunlight or artificial light. For example, the sensor may determine that a lighting intensity is sunlight based on the lighting intensity being presented within a predefined distance of the window. The sensor may determine that a lighting intensity is artificial light based on the lighting intensity being presented outside of a predefined distance of the window. The sensor may, however, determine daylight glare conditions in one or more additional ways. For example, the sensor may determine a daylight glare condition using baseline images captured by the sensor.

Figure 16:
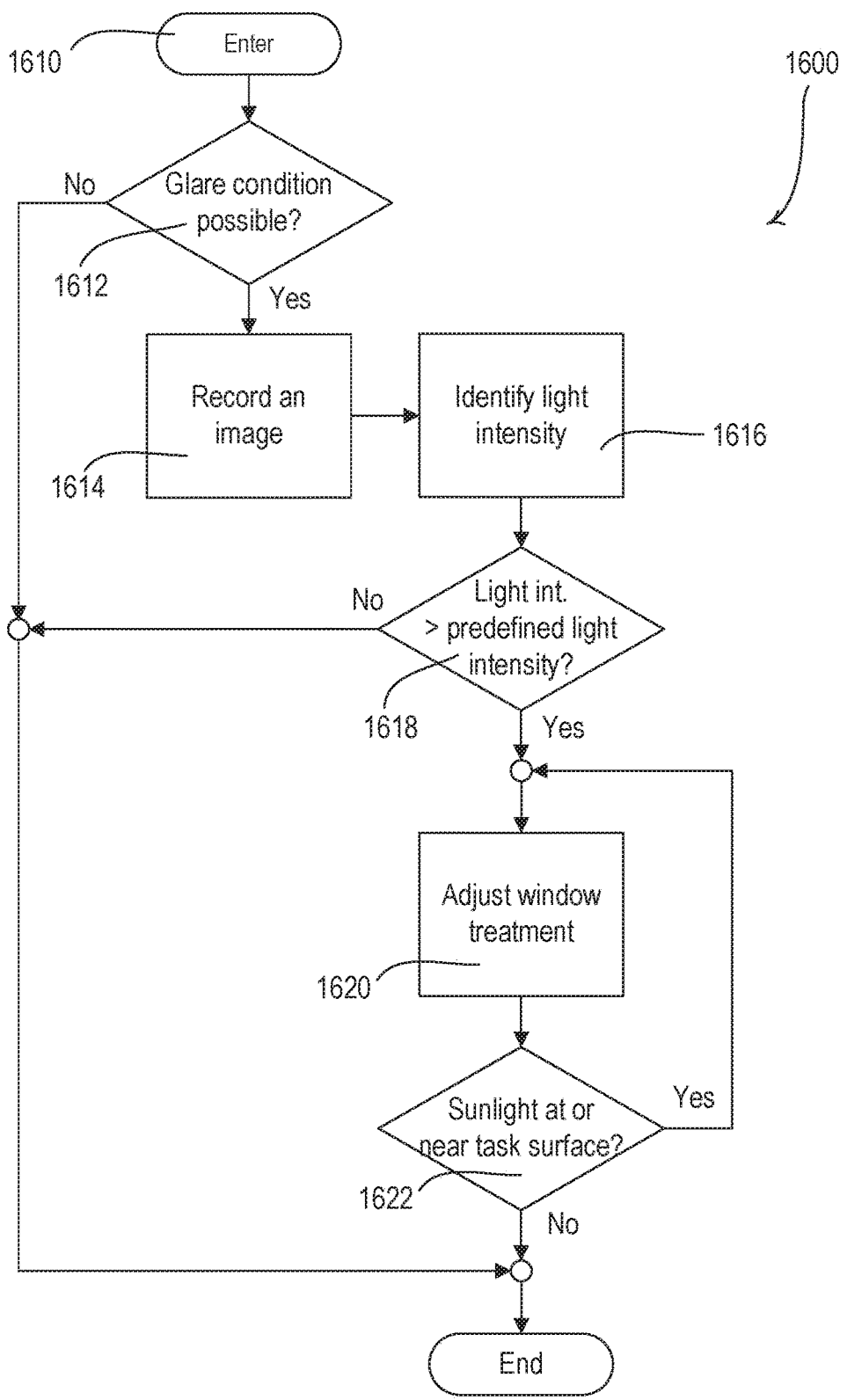
FIG. 16 shows a flowchart of another example glare detection and control procedure.

FIG. 16 shows a flowchart of an example glare detection and control procedure 1600 that may be executed to detect and control glare within a space (e.g., the room 102). The glare detection and control procedure 1600 may be executed by a sensor, such as the sensor 180. The glare detection and control procedure 1600 may be executed by a control circuit of the sensor (e.g., the control circuit 310 during a daylight glare sensor mode of the sensor.

The glare detection and control procedure 1600 may begin at step 1610. The glare detection and control procedure 1600 may determine one or more light intensities (e.g., sunlight intensity, such as a glare condition) within a space (e.g., the room 102). At 1612, the sensor may determine whether a glare condition is possible. For example, the sensor may determine whether a glare condition is possible based on the time of day, time of year, location of the building, direction of the windows, position of the sun in the sky, weather conditions, etc., that may be used to determine the intensity of sunlight in the room.

If the glare condition is determined to be impossible or improbable at 1612, the procedure 1600 may end. If the glare condition is determined to be possible, the procedure 1600 may move to 1614, and the sensor may record an image. For example, the sensor may record one or more images of one or more regions of interest within the room.

The sensor may analyze the images and identify the lighting intensity (e.g., sunlight intensity, such as a glare condition) within the room, at 1616. The sensor may identify a baseline lighting intensity (e.g., sunlight intensity, such as a glare condition). A baseline lighting intensity of the room may include recorded images of the room in which the amount of sunlight may be zero sunlight, full sunlight, and/or a number of intervals that may fall between zero sunlight and full sunlight. For example, the sensor may determine a baseline having zero sunlight by recording an image of the room when sunlight is not present (e.g., at nighttime). The sensor may determine a baseline having zero sunlight by recording an image when the covering material of the motorized window treatments are in a fully closed state. The sensor may determine a baseline having full sunlight by recording an image of the room at a time during the day in which sunlight is predicted to be at a full potential and when the covering material of the motorized window treatments are in an open state.

The sensor may be configured to determine baseline intervals (e.g., 10%, 20%, 30%, etc.) of sunlight within the room. For example, baseline intervals of sunlight within the room may be provided using one or more positions of the covering material of the motorized window treatments. Also, or alternatively, baseline intervals of sunlight within the room may be provided using one or more combinations of environmental characteristics that may affect the presence of sunlight (e.g., the time of day, the time of year, the weather, the position of the sun, the direction of the windows, the location of the building, the location of the room in the building, etc.). For example, baseline intervals may be provided in the room at a time of the day in which the sun is predicted to provide full sunlight and/or at which the covering material of the motorized window treatments are opened a predefined amount. The sensor may record one or more image of the room during times of different sunlight strengths and/or based on the level of the covering material of the motorized window treatments being opened to different amounts (e.g., opened to 10%, 30%, 50%, 70%, or 90% capacity).

At 1618, the sensor may determine whether the lighting intensity within the room is greater than a predefined lighting intensity. The predefined lighting intensity may be a baseline lighting intensity and/or another lighting intensity, such as the lighting intensity defined by the sunlight glare threshold. If the lighting intensity within the room is less than or equal to the predefined lighting intensity, the procedure 1600 may end. If the lighting intensity within the room is greater than the predefined lighting intensity (e.g., the baseline lighting intensity and/or the sunlight glare threshold), the sensor may adjust the covering material of each of the motorized window treatments, at 1620. The window treatment may be adjusted by sending a digital message to the motorized window treatments.

The sensor may adjust the covering material of each of the motorized window treatments so that the lighting intensity (e.g., sunlight intensity) presented within the room is equivalent, or similar, to the lighting intensity of the predefined lighting intensity. The sensor may adjust the covering material of each of the motorized window treatments to the setting of the covering material of each of the motorized window treatments at which the predefined (e.g., baseline) lighting intensity was recorded. The sensor may consider one or more secondary considerations (e.g., time of day, time of year, location of the building, direction of the windows, position of the sun in the sky, weather conditions, etc.) when adjusting the covering material of each of the motorized window treatments to achieve the baseline lighting intensity.

At 1622, the sensor may determine whether sunlight is presented on or within a predefined distance of the task area (e.g., desk 106, monitor 166, a predefined area around user 192, etc.). If sunlight is not presented on or within a predefined distance of the task area, the procedure 1600 may end. If, however, the sunlight is presented on or within a predefined distance of the task area, the covering material of each of the motorized window treatments may be adjusted, at 1620. For example, the sensor may adjust the covering material of each of the motorized window treatments so that the sunlight is not presented on or within a predefined distance of the task area. The covering material of each of the motorized window treatments may be adjusted a predefined amount (e.g., 10%, 30%, 60%, 90%, etc.). The covering material of each of the motorized window treatments may be adjusted based on the amount of sunlight that is permitted by the covering material of each of the motorized window treatments. For example, if at 1622 sunlight is presented on or within a predefined distance of the task area, the sensor may continually adjust the covering material of each of the motorized window treatments, at 1620, until the sunlight is not presented on or within a predefined distance of the task area.

Figure 17:
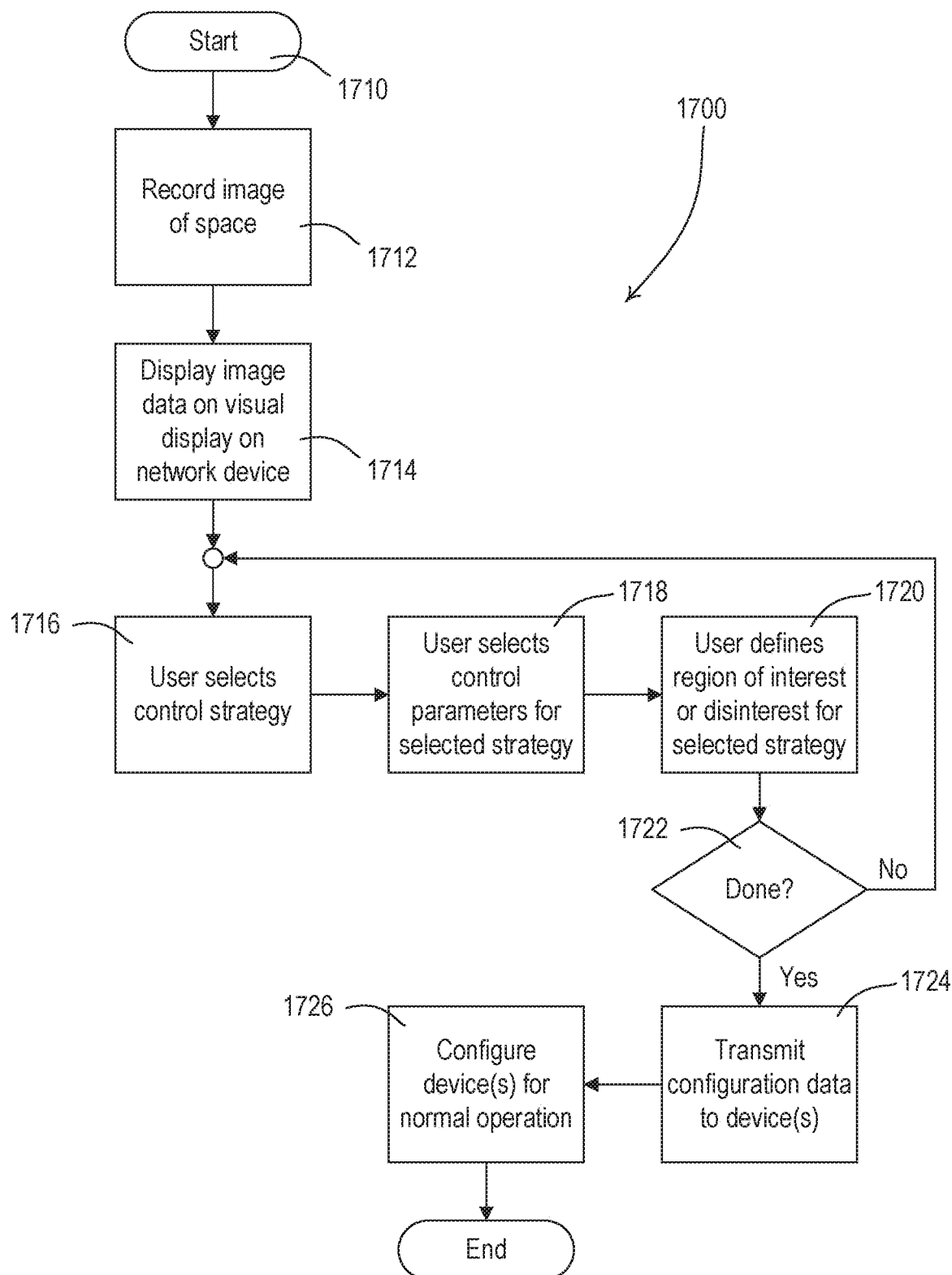
FIG. 17 shows a flowchart of an example configuration procedure that may be executed to configure a visible light sensor and/or a system controller for operation.

FIG. 17 shows a flowchart of an example configuration procedure 1700 that may be executed to configure a sensor (e.g., a visible light sensor) for operation. The configuration procedure 1700 may be executed using configuration software, which may be executed on one or more devices. The configuration procedure 1700 may be executed by a sensor, such as the visible light sensor 180, a system controller, such as the system controller 110, and/or a network device, such as the mobile device 190.

As shown in FIG. 17, configuration procedure 1700 may begin at 1710. The sensor may record an image of the space at 1712. At 1714, image data may be displayed via a graphical user interface (GUI) on the visual display of a network device, such as the mobile device 190 shown in FIG. 1. The sensor, the system controller, or the network device may receive the recorded images of the space and generate the image data from the recorded images. Image data may be associated with pixel data (e.g., having a red value, a green value, and a blue value). For example, the image data may be processed to indicate objects identified in the image data. The network device may receive a user selection of a control strategy at 1716. The control strategy may be configured for performing control (e.g., generating control instruction) of one or more load control devices based on detected environmental characteristics when the sensor is operating in a sensor mode. For example, the control strategy may be executed to control one or more load control devices in response to detection of a daylight sensor event, daylight glare sensor event, occupancy/vacancy sensor event, color temperature sensor event, lighting intensity, or other environmental characteristics within the space during a sensor mode.

The network device may receive control parameters for the selected control strategy at 1718. For example, the network device may receive user selections that indicate the sensitivity for detecting an occupancy/vacancy sensor event during an occupancy/vacancy sensor mode (e.g., high, medium, or low), a timeout for a vacancy timer, target lighting level levels, types of target lighting level control (e.g., uniform vs. gradient as described in FIGS. 12A and 12B), a target color or color temperature, daylight penetration distance and/or buffer distance (e.g., distance from task surface that daylight penetration is prevented from exceeding), and/or other control parameters for performing control of the sensor and/or the one or more load control devices. The control parameters may also, or alternatively, include preferred lighting intensity parameters, daylighting glare parameters, color temperature parameters, etc.

The network device may receive an indication of user defined regions of interest or disinterest for the selected control strategy at 1720. The network device may receive user-selected regions of interest that are to be unmasked or regions of disinterest that are to be masked for the control strategy. For example, the user-selected regions of interest for occupancy/vacancy control may include the area around a user's task area, a user's chair, a user's keyboard, etc. The user-selected regions of disinterest for occupancy/vacancy control may include the area around a doorway or windows, computer monitors, television screens, or other areas of disinterest so that any movement detected within these areas of disinterest does not affect the occupancy/vacancy control of load control devices.

The user may define, via a network device (e.g., the mobile device 190), the control strategy. For example, the user may identify environmental characteristics that may be detected for performing load control according to one or more control strategies. The network device may list a number of control strategies, such as, general room occupancy sensing control, keyboard occupancy sensing control, task surface lighting level control, or sunlight penetration control. The network device may determine (e.g., automatically determine), based on the user's identification, a sensor mode (e.g., occupancy sensor mode), and/or control parameters (e.g., high sensitivity) for the identified control strategy.

At 1722, a determination may be made as to whether the configuration of control strategies is complete. For example, the user may be asked through the configuration software on the network device whether they are done performing configuration. If the configuration is incomplete, the configuration procedure 1700 may return to 1716 and the user may select the control strategy for being configured. If the configuration is determined to be complete, at 1722, configuration data may be transmitted to the appropriate devices at 1724. The configuration data may include the control parameters and/or the regions of interest/disinterest for the control strategy. The configuration data may be transmitted to the sensor upon which control instructions may be generated in response to images recorded by the sensor. The sensor may be configured, at 1726, for performing in accordance with the configuration data during normal operation. For example, the sensor may be configured with the selected control parameters and/or the user defined masks when operating to perform load control based on the selected control strategy.

As the sensor may be installed at a location at which the sensor can record an image of a space, the sensor may operate in a manner that protects the privacy of the users in the space. For example, a sensor may be configured to protect the privacy of the users of a space via software, a removable module, a special sensor, and/or communication on different communication links during configuration and operation of the load control system. The configuration software that may be implemented during the procedure 1700 may be used in a way that protects the privacy of the users of a space. The configuration software may case the sensor to communicate on a wired communication link, or a different wireless communication link than the sensor may operate during operation. The configuration software may be uninstalled from the sensor when configuration of the sensor is complete, such that the sensor may leave configuration mode and move to operation modes of the sensor for identifying images and transmitting messages for load control when the configuration of the sensor is complete. During operation of the sensor, operation software may be installed by the sensor. The operation software may include the operation modes for identifying images and transmitting messages for load control. The operation software may prevent the transmission of actual images or other image data that may be transmitted from the sensor when the configuration software is installed. If the sensor is capable of transmitting images or other image data during operation, the sensor may use a wired or wireless communication link that is different than the communication link used for configuration.

During configuration of the sensor, a configuration module may be coupled to (e.g., installed in) the sensor that allows the sensor to transmit images or other image data. When the configuration module is installed in the sensor, the control circuit 310 (shown in FIG. 3) may transmit an image recorded by a camera, such as the camera 322, or other image data via a communication link. The module may have wired and/or wireless capabilities. The sensor may include a communication circuit for transmitting and/or receiving the RF signals 108 (e.g., using the proprietary protocol). The configuration module may include a communication circuit for transmitting and/or receiving the RF signals 109 (e.g., using the standard protocol). When the configuration module is installed in the sensor and the communication circuit of the configuration module is electrically coupled to the sensor, the sensor may record an image of the space and transmit the image or other image data to the system controller or the network device. The network device or the system controller may transmit the configuration data to the sensor while the configuration module is installed in the sensor, and the sensor may store the configuration data in memory. After the configuration of the sensor (e.g., during operation of the sensor for load control), the configuration module may be removed from the sensor, resulting in the sensor being unable to transmit images or other image data. With the configuration module removed, the sensor may be unable to transmit images or image data. If the sensor is capable of transmitting images or other image data during operation, the sensor may use a wired or wireless communication link that is different than the communication link used for configuration.

Another way to protect the privacy of users may be to use a special configuration sensor. The configuration sensor may be installed on, or in the same location as, the sensor and may transmit images of the room. The configuration sensor may have a structure that is identical, or similar, to the sensor. The configuration sensor may be configured to record an image using a camera. The configuration sensor may transmit image data (e.g., an image or other image data) to the system controller and/or the network device. The configuration sensor may communicate on a different communication link than the sensor. The configuration data resulting from the image data may be transmitted to the sensor. The configuration sensor may be uninstalled after configuration of the sensor. For example, the sensor may leave the configuration mode and move to operation modes of the sensor when the configuration of the sensor is complete. The visible light sensor may be installed in place of the configuration sensor for use during operation using the configuration data generated from the images or other image data from the space. The visible light sensor may be incapable of transmitting images or other image data after being installed in place of, or after the removal of, the configuration sensor. If the visible light sensor is capable of transmitting images or other image data during operation, the visible light sensor may use a wired or wireless communication link that is different than the communication link used for configuration.

Figure 18:
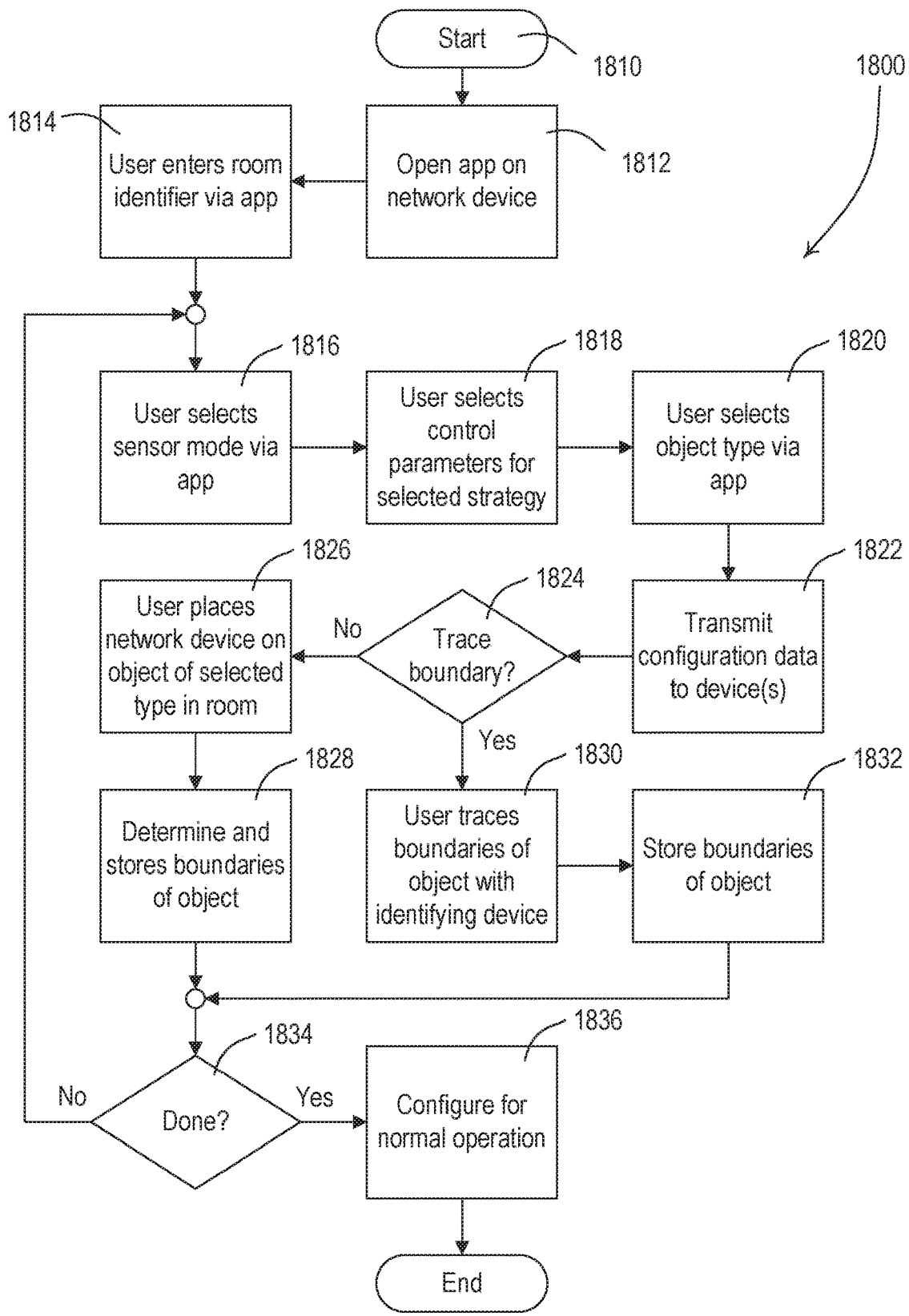
FIG. 18 shows a flowchart of another example configuration procedure that may be executed to configure a visible light sensor and/or a system controller for operation.

FIG. 18 shows a flowchart of an example configuration procedure 1800 that may be executed to configure a sensor (e.g., a visible light sensor) for operation. The configuration procedure 1800 may be executed using configuration software, which may be executed on one or more devices. The configuration procedure 1800 may be executed by a visible light sensor, such as the visible light sensor 180 or 300, a system controller, such as the system controller 110, and/or a network device, such as the mobile device 190.

As shown in FIG. 18, the configuration procedure 1800 may begin at 1810. At 1812, an application may be opened on the network device. A room identifier may be entered and received by the network device at 1814. For example, the user may enter a room identifier, such as an identifier of the living room, a conference room, a hotel room, etc. As a room identifier is being stored for the configuration of the space in the room, the configuration of a space having a given room identifier may be used as a template (e.g., a configuration template) for configuring the visible light sensor and/or load control within a similar space. A configuration template may be copied and applied to other spaces for performing load control. The configuration template may include similar masks, regions of interest, control strategies, etc.

The network device may receive a user selection of a control strategy at 1816. The control strategy may be defined for a sensor mode for controlling one or more load control devices in response to detection of one or more sensor events. For example, the control strategy may include the control of one or more load control devices in response to daylight, daylight glare, occupancy/vacancy, color temperature, lighting intensity, or other environmental characteristics within the space.

The network device may receive control parameters for the selected control strategy at 1818. For example, the network device may receive user selections that indicate the sensitivity for detecting an occupancy/vacancy condition during occupancy sensing (e.g., high, medium, or low), a timeout for a vacancy timer, and/or other control parameters for performing control of the visible light sensor and/or the one or more load control devices. The control parameters may also, or alternatively, include preferred lighting intensity parameters, daylighting glare parameters, color temperature parameters, etc.

The network device may receive a selection, at 1820, from a user of an object type that is being identified for configuration. For example, the object type may be a user task area (e.g., a desk), a door, a window, or another object type for being identified in an image during operation of a visible light sensor. The network device may transmit the configuration data at 1822, which may include the control strategy, control parameters, and/or selected object type for being defined. The configuration data may be transmitted to the visible light sensor.

The network device may be used to identify objects within the space. The objects that are identified may be used for masking areas of the space or detecting other environmental characteristics within the space for performing load control. At 1824, a determination may be made as to whether the user will define the boundary of the selected object type by tracing the boundary of the object. If the user is not tracing the boundary of the object within the image, the user may otherwise define the object of the selected type within the room. For example, at 1826, the user may place a network device (e.g., mobile phone, tablet, etc.) or other predefined object identifier on the object of the selected type within the space. The visible light sensor may record an image of the network device on the object of the selected type within the space. At 1828, the visible light sensor may determine and store the boundaries of the object on which the network device is located within the image. The network device may be a predefined object identifier, as it may be stored in memory at the visible light sensor as the object used to identify other objects in the images. The boundaries of the objects in an image may be determined by locating the boundaries of the next largest object on which the network device resides within the image (e.g., for a predefined period of time). Though a network device may be described as being used to identify the boundaries of the selected object type, another type of object may similarly be identified within an image and used to identify the boundaries of another object within the image.

If the user is to trace the boundary of the object within the image, at 1824, the user may trace the boundaries of the object with an identifying device (e.g., a finger, a laser pointer, a network device, etc.). The visible light sensor may record images of the user tracing the boundaries of the object with the identifying device in the space and recognize the boundaries of the object being traced within the images. For example, the user may trace the edges of a task area (e.g., desk) or doorway with the user's network device (e.g., mobile phone), which may be recognized by the visible light sensor as the boundary of the object having the selected type. The boundaries of the object may be stored at 1832.

At 1834, a determination may be made as to whether the configuration in procedure 1800 is complete. For example, the user may be asked through the configuration software on the network device whether they are done identifying objects for being identified for the selected control strategies. If the configuration in procedure 1800 is incomplete, the configuration procedure 1800 may return to 1816 and the user may select the control strategy for being configured. If the configuration in procedure 1800 is determined to be complete, at 1834, the visible light sensor may be configured for normal operation at 1836. For example, configuration data including the boundaries of the objects defined in the configuration procedure 1800. The boundaries of the defined objects in the space may be used by the visible light sensor to define masks or identify environmental characteristics for performing load control.

Indications of user selections may be transmitted to the visible light sensor, upon which the visible light sensor may be configured for operation in response to images recorded thereon. During configuration, the visible light sensor may be prevented from transmitting the images on which configuration is performed. This may protect the privacy of the occupants within the space.

Figure 19:
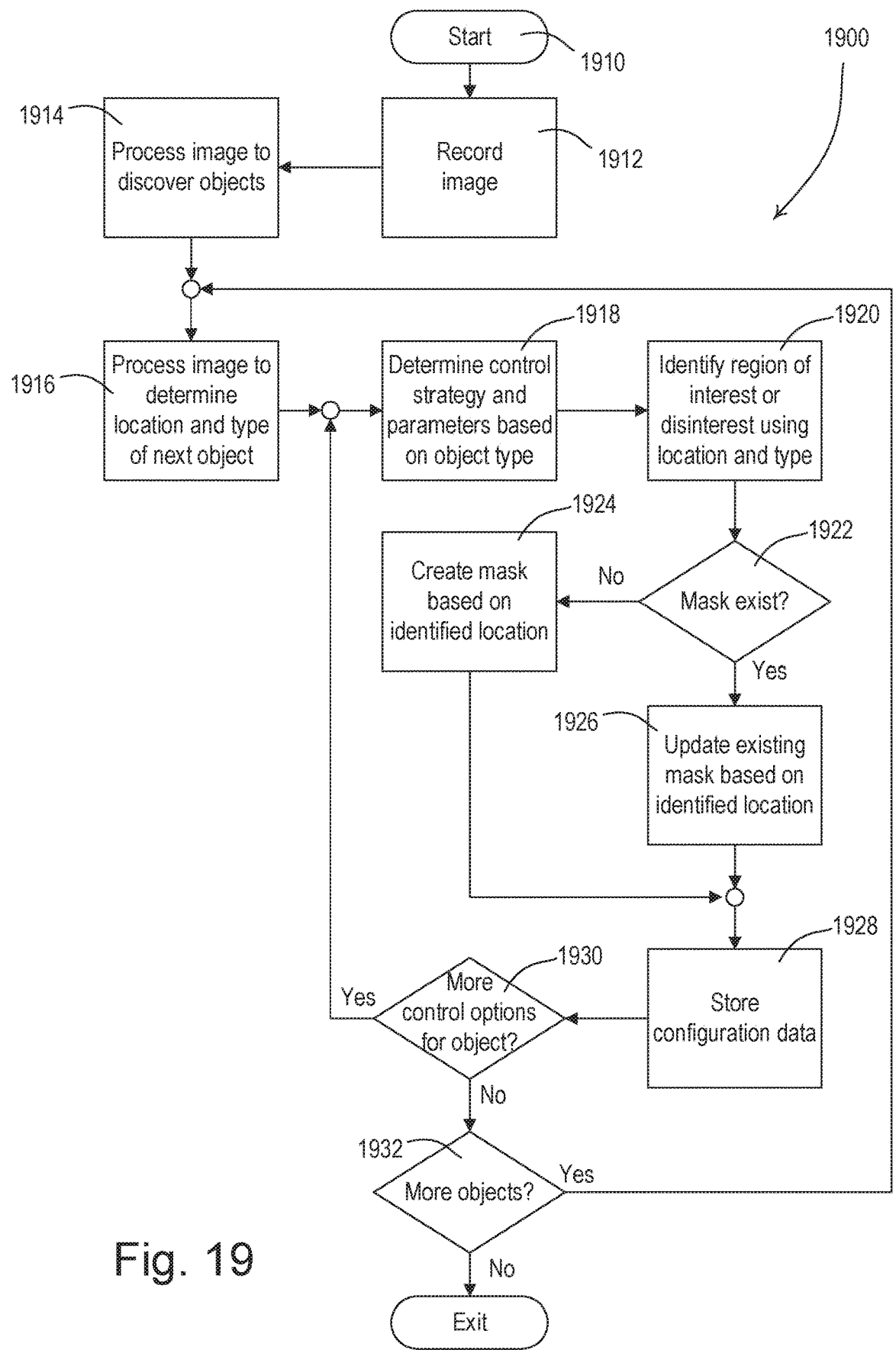
FIG. 19 shows a flowchart of an example configuration procedure that may be executed to automatically configure a visible light sensor and/or a system controller for operation.

FIG. 19 shows a flowchart of an example configuration procedure 1900 that may be executed to automatically configure a sensor (e.g., a visible light sensor) for operation. The autoconfiguration procedure 1900 may be executed using configuration software, which may be executed on one or more devices. The autoconfiguration procedure 1900 may be executed by a visible light sensor, such as the visible light sensor 180 or 300, a system controller, such as the system controller 110, and/or a network device, such as the mobile device 190.

As shown in FIG. 19, the configuration procedure 1900 may begin at 1910. At 1912, an image may be recorded by the visible light sensor. The image may be processed by the visible light sensor, at 1914, to discover objects. The objects may be predefined in size and/or shape. The objects may have been previously defined (e.g., using the configuration procedure 1800 in FIG. 18, or otherwise defined by the system). Objects may have been moved within the space and images may be processed to identify objects having the same boundaries in a changed location. The image may be processed to identify the existence of previously absent objects, or the absence of previously existing objects.

At 1916, the image may be processed to determine a location and type of an object in the space. A control strategy and control parameters may be determined, at 1918, based on the determined object type. For example, the identification of a desk may indicate daylighting or glare control based on the location of the user task area, windows may indicate glare control, and/or other predefined objects may be identified to indicate other types of control strategies. At 1920, a region of interest or disinterest may be identified using the location and type of the object. For example, when a desk is identified, a mask may be applied to the rest of the room, or outside a predefined distance of the desk, to define a region of interest for detecting daylight or daylight glare. Multiple masks may be applied to the same object if multiple control strategies are determined for the same object. For example, when an area within or around a desk is used for detecting occupancy/vacancy, a mask may be applied to the rest of the room, outside a predefined distance of the desk, or within a predefined space on the desk, to define a region of interest for detecting occupancy/vacancy.

A determination may be made at 1922 as to whether a mask already exists for the identified object. If a mask does not already exist for the object, a mask may be created at 1924 based on the identified location of the object in the space. If a mask already exists for the object, the existing mask may be updated at 1926 based on the identified location of the object (e.g., change in location of an object).

The configuration data may be stored at 1928. The configuration data may include the control strategy, the control parameters, the object type, the object location, the regions of interest/disinterest, any masks, and/or other configuration data. A determination may be made as to whether additional control options are to be determined for the object at 1930. For example, if there is a task surface identified in the image, the visible light sensor may auto configure the occupancy/vacancy sensing operation around the task surface. If, at 1930, there are more control options that are determined for being configured at the task surface, the visible light sensor may auto configure those other control options (e.g., daylighting operations, daylight glare control to prevent glare on the task surface, etc.). The configuration procedure may have a number of control options stored for a given object that is identified in the image. If no additional control options are to be determined for the object, a determination may be made, at 1932, as to whether more objects have been discovered in the image. If other objects have been discovered, the procedure 1900 may return to 1916 to process the image to determine the location and the type of the next object. Otherwise, the procedure 1900 may end.

Figure 20:
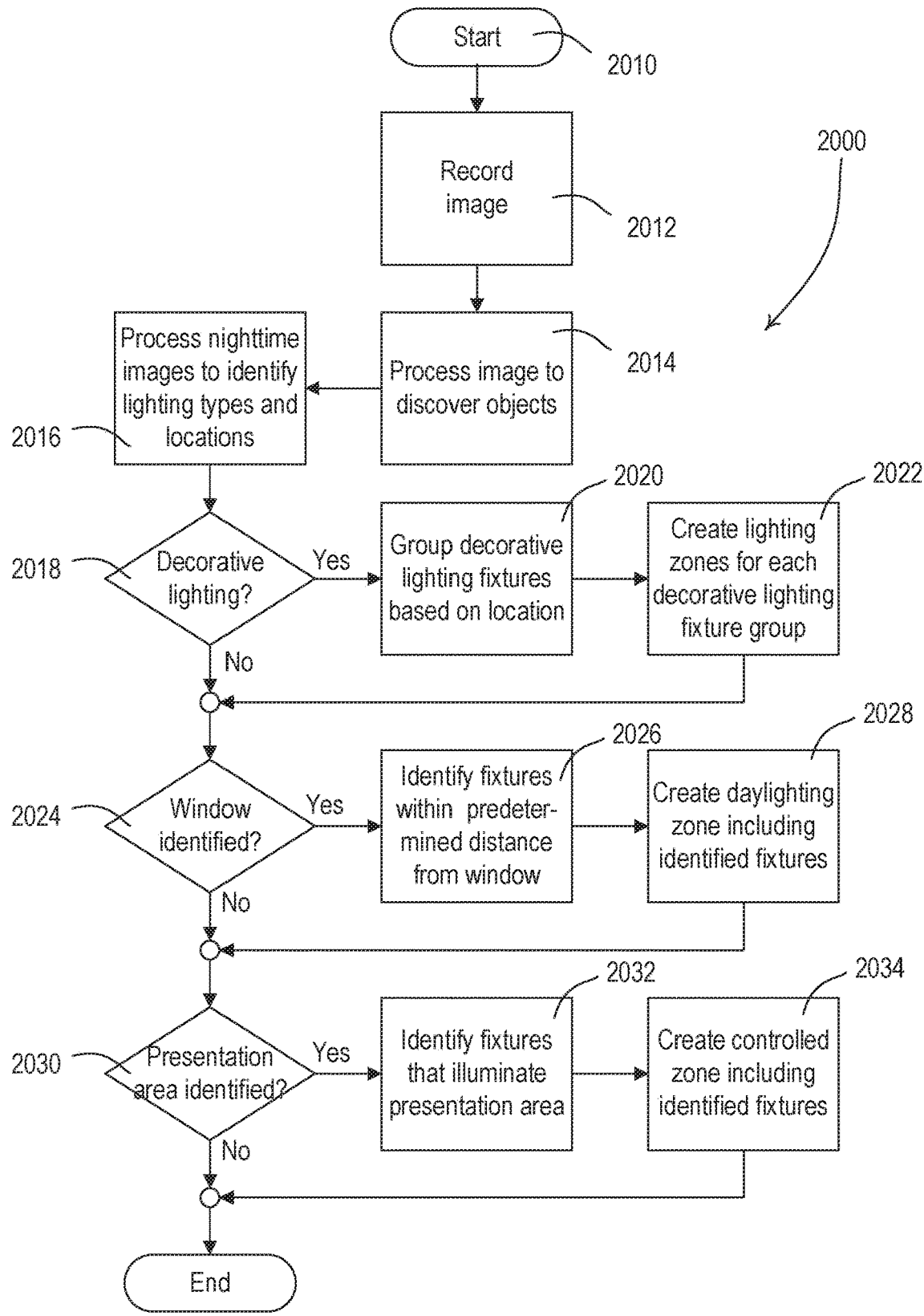
FIG. 20 shows a flowchart of an example zone configuration procedure that may be executed to configure one or more zones within a space.

FIG. 20 shows a flowchart of an example zone configuration procedure 2000 that may be executed to configure one or more zones within a space. The zone configuration procedure 2000 may be executed using configuration software, which may be executed on one or more devices. The zone configuration procedure 2000 may be executed by a sensor (e.g., a visible light sensor, such as the visible light sensor 180) a system controller (e.g., the system controller 110), and/or a network device (e.g., the mobile device 190).

As shown in FIG. 20, the zone configuration procedure 2000 may begin at 2010. At 2012, an image may be recorded by the visible light sensor. The image may be sent to the system controller for processing, or processed locally by the visible light sensor. The image may be processed, at 2014, to discover objects. Nighttime images may be processed, at 2016, to identify lighting types and locations. The lighting types may include functional lights and/or decorative lights. The functional lights may be downlights. The decorative lights may be wallwash lights, wall sconces, and/or other decorative lights. The lighting types may be identified by the location of the light source, the location of the light output in the space, and/or the lighting pattern being output by the light source At 2018, a determination may be made as to whether the lighting is decorative lighting. If the lighting fixtures include decorative lighting fixtures at 2018, the decorative lighting fixtures may be grouped by location. For example, if there are multiple decorative lights along one wall and multiple decorative lights along another wall, the decorative lights on each wall may be grouped into two different zones that each include the decorative lights located on the respective wall. In another example, decorative lights in a cove within the room may be included in a separate group from other decorative lights in the room, such as wallwashes. The grouping may include the decorative lighting fixtures on the same wall, the decorative lighting fixtures in the space, the decorative lighting fixtures within a predefined distance of one another, etc. A lighting zone may be created for controlling the decorative lighting fixtures in each group at 2022. The lighting zone may be included in configuration data that is stored at the visible light sensor for performing load control.

At 2024, a determination may be made as to whether a window is identified in the space. If a window is identified in the space at 2024, lighting fixtures (e.g., functional and/or decorative lighting fixtures) may be identified at 2026 that are within a predetermined distance from the window. The lighting fixtures that are within the predetermined distance from the window may be included in a daylighting zone that is created at 2028. The daylighting zone may be included in configuration data that is stored at the visible light sensor for performing load control.

At 2030, a determination may be made as to whether a presentation area is identified in the space. If a presentation area is identified in the space at 2030, lighting fixtures (e.g., functional and/or decorative lighting fixtures) may be identified at 2032 that illuminate the presentation area. The lighting fixtures that identify the presentation area may be included in a controlled zone that is created at 2034. The controlled zone may be included in configuration data that is stored at the visible light sensor for performing load control.

Figure 21:
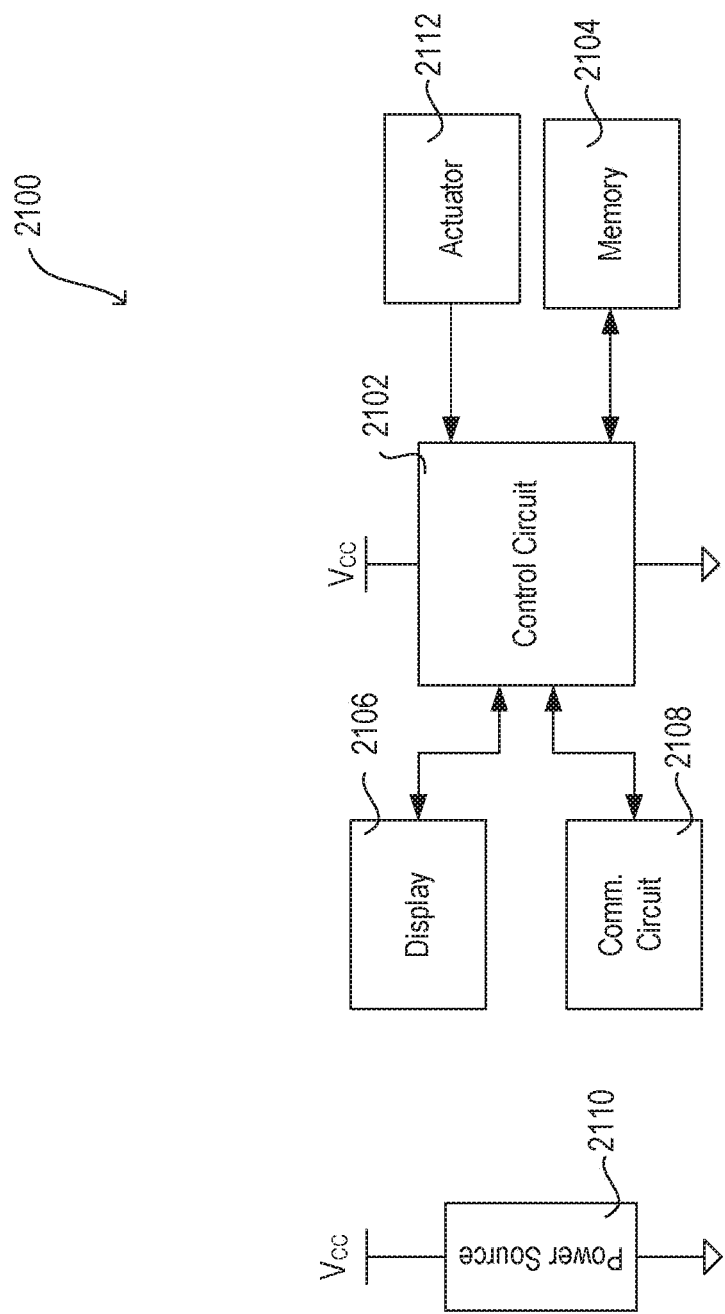
FIG. 21 is a block diagram illustrating an example network device.

FIG. 21 is a block diagram illustrating an example network device 2100 as described herein. The network device 1800 may be a mobile device 190, as shown in FIG. 1, for example. The network device 2100 may include a control circuit 2102 for controlling the functionality of the network device 2100. The control circuit 2102 may include one or more general purpose processors, special purpose processors, conventional processors, digital signal processors (DSPs), microprocessors, integrated circuits, a programmable logic device (PLD), application specific integrated circuits (ASICs), or the like. The control circuit 2102 may perform signal coding, data processing, power control, image processing, input/output processing, and/or any other functionality that enables the network device 2100 to perform as described herein.

The control circuit 2102 may store information in and/or retrieve information from the memory 2104. The memory 2104 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 2100 may include a communications circuit 2108 for transmitting and/or receiving information. The communications circuit 2108 may perform wireless and/or wired communications. The communications circuit 2108 may include an RF transceiver or other circuit capable of performing wireless communications via an antenna. Communications circuit 2108 may be in communication with control circuit 2102 for transmitting and/or receiving information.

The control circuit 2102 may also be in communication with a display 2106 for providing information to a user. The processor 2102 and/or the display 2106 may generate GUIs for being displayed on the network device 2100. The display 2106 and the control circuit 2102 may be in two-way communication, as the display 2106 may include a touch screen module capable of receiving information from a user and providing such information to the control circuit 2102. The network device 2100 may also include an actuator 2112 (e.g., one or more buttons) that may be actuated by a user to communicate user selections to the control circuit 2102.

Each of the modules within the network device 2100 may be powered by a power source 2110. The power source 2110 may include an AC power supply or DC power supply, for example. The power source 2110 may generate a supply voltage VCC for powering the modules within the network device 2100.

Figure 22:
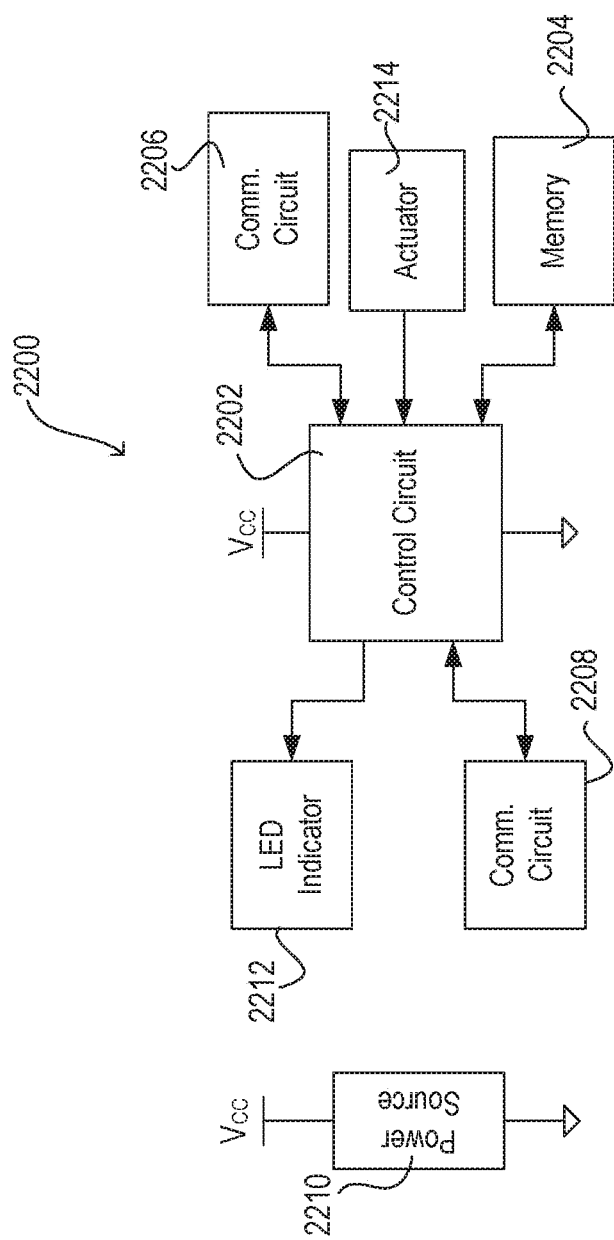
FIG. 22 is a block diagram illustrating an example system controller.

FIG. 22 is a block diagram illustrating an example system controller 2200 as described herein. The system controller 2200 may include a control circuit 2202 for controlling the functionality of the system controller 2200. The control circuit 2202 may include one or more general purpose processors, special purpose processors, conventional processors, digital signal processors (DSPs), microprocessors, integrated circuits, a programmable logic device (PLD), application specific integrated circuits (ASICs), or the like. The control circuit 2202 may perform signal coding, data processing, power control, image processing, input/output processing, or any other functionality that enables the system controller 2200 to perform as described herein. The control circuit 2202 may store information in and/or retrieve information from the memory 2204. The memory 2204 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 2200 may include a communications circuit 2206 for transmitting and/or receiving information. The communications circuit 2206 may perform wireless and/or wired communications. The system controller 2200 may also, or alternatively, include a communications circuit 2208 for transmitting and/or receiving information. The communications circuit 2206 may perform wireless and/or wired communications. Communications circuits 206 and 2208 may be in communication with control circuit 2202. The communications circuits 2206 and 2208 may include RF transceivers or other communications modules capable of performing wireless communications via an antenna. The communications circuit 2206 and communications circuit 2208 may be capable of performing communications via the same communication channels or different communication channels. For example, the communications circuit 2206 may be capable of communicating (e.g., with a network device, over a network, etc.) via a wireless communication channel (e.g., BLUETOOTH®, near field communication (NFC), WIFI®, WI-MAX®, cellular, etc.) and the communications circuit 2208 may be capable of communicating (e.g., with control devices and/or other devices in the load control system) via another wireless communication channel (e.g., WI-FI® or a proprietary communication channel, such as CLEAR CONNECT™).

The control circuit 2202 may be in communication with an LED indicator 2212 for providing indications to a user. The control circuit 2202 may be in communication with an actuator 2214 (e.g., one or more buttons) that may be actuated by a user to communicate user selections to the control circuit 2202. For example, the actuator 2214 may be actuated to put the control circuit 2202 in an association mode and/or communicate association messages from the system controller 2200.

Each of the modules within the system controller 2200 may be powered by a power source 2210. The power source 2210 may include an AC power supply or DC power supply, for example. The power source 2210 may generate a supply voltage VCC for powering the modules within the system controller 2200.

Figure 23:
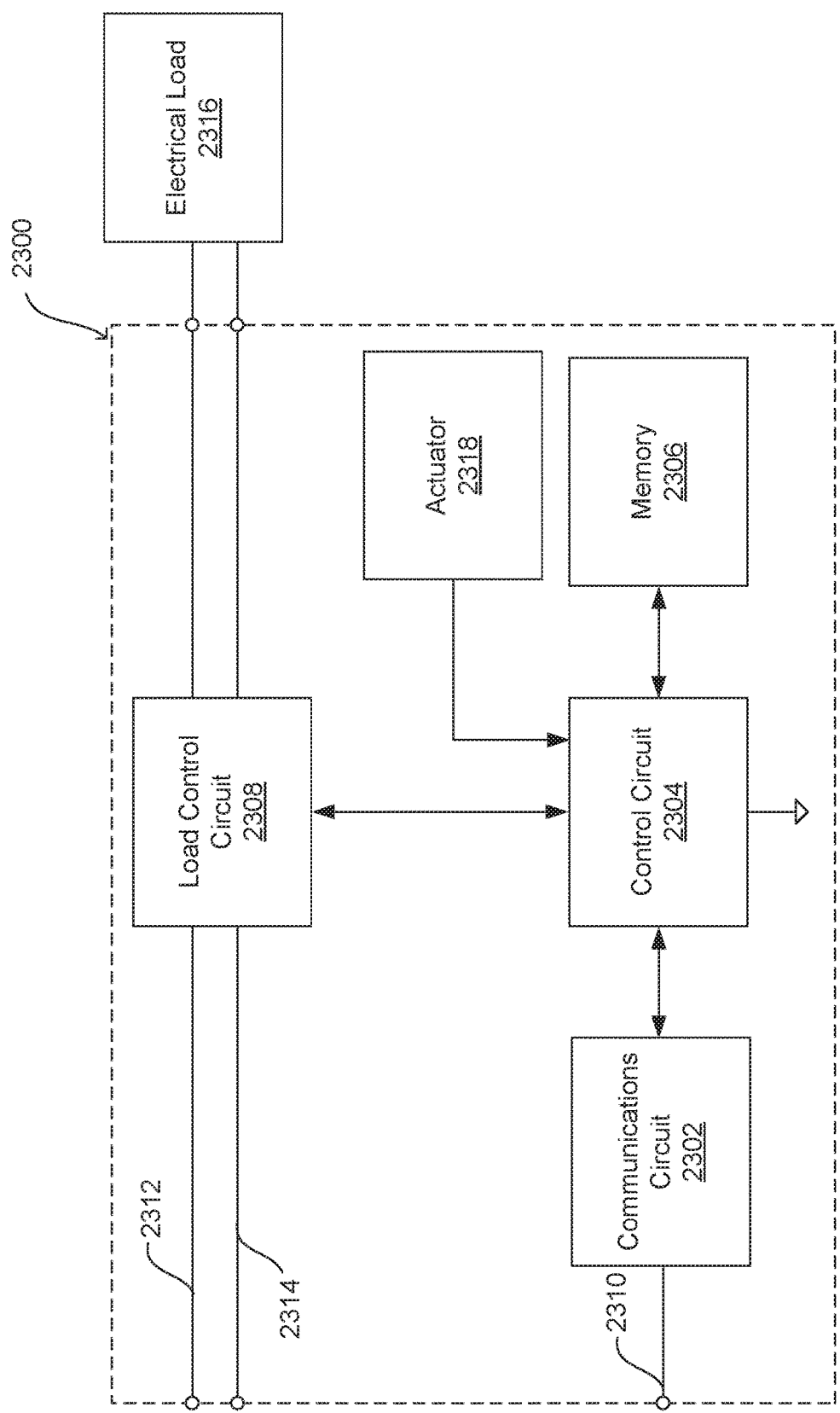
FIG. 23 is a block diagram illustrating an example control-target device.

FIG. 23 is a block diagram illustrating an example control-target device, e.g., a load control device 2300, as described herein. The load control device 2300 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The load control device 2300 may include a communications circuit 2302. The communications circuit 2302 may include a receiver, an RF transceiver, or other communications module capable of performing wired and/or wireless communications via communications link 2310. The communications circuit 2302 may be in communication with control circuit 2304. The control circuit 2304 may include one or more general purpose processors, special purpose processors, conventional processors, digital signal processors (DSPs), microprocessors, integrated circuits, a programmable logic device (PLD), application specific integrated circuits (ASICs), or the like. The control circuit 2304 may perform signal coding, data processing, power control, input/output processing, or any other functionality that enables the load control device 2300 to perform as described herein.

The control circuit 2304 may store information in and/or retrieve information from the memory 2306. For example, the memory 2306 may maintain a registry of associated control devices and/or control configuration instructions. The memory 2306 may include a non-removable memory and/or a removable memory. The load control circuit 2308 may receive instructions from the control circuit 2304 and may control the electrical load 2316 using the received instructions. The load control circuit 2308 may send status feedback to the control circuit 2304 regarding the status of the electrical load 2316. The load control circuit 2308 may receive power via the hot connection 2312 and the neutral connection 2314 and may provide an amount of power to the electrical load 2316. The electrical load 2316 may include any type of electrical load.

The control circuit 2304 may be in communication with an actuator 2318 (e.g., one or more buttons) that may be actuated by a user to communicate user selections to the control circuit 2304. For example, the actuator 2318 may be actuated to put the control circuit 2304 in an association mode and/or communicate association messages from the load control device 2300.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. An apparatus comprising:
    a control circuit configured to:
        determine a lighting level for a first sub-area within a space, wherein the lighting level for the first sub-area indicates the lighting level for the first sub-area in at least one image of the space;
        determine a lighting level for a second sub-area within the space, wherein the lighting level for the second sub-area indicates the lighting level of the second sub-area in the at least one image of the space;
        adjust a first lighting fixture that affects the lighting level for the first sub-area and the lighting level for the second sub-area to achieve a first target light level in the first sub-area and a second target light level in the second sub-area; and
        adjust a second lighting fixture that affects the lighting level for the second sub area to achieve the second target light level in the second sub-area, wherein the adjustment of the second lighting fixture is in response to an amount that the first lighting fixture affects the lighting level for the second sub-area when the first lighting fixture is adjusted.

2. The apparatus of claim 1, wherein the control circuit is further configured to:
    determine, during a configuration procedure prior to an operation for performing load control, a light contribution for the first lighting fixture that affects the lighting level for the first sub-area and a light contribution for the first lighting fixture and the second lighting fixture that affects the lighting level for the second sub-area.

3. The apparatus of claim 2, wherein the control circuit is further configured to:
    determine that the first lighting fixture has a highest light contribution on the first sub-area; and
    determine that the second lighting fixture has a highest light contribution on the second sub-area.

4. The apparatus of claim 1, wherein the control circuit is further configured to:
    determine a first intensity to which to control the first lighting fixture to control the lighting level of the first sub-area to be greater than or equal to the first target light level; and
    determine a second intensity to which to control the second lighting fixture to control the lighting level of the second sub-area to be greater than or equal to the second target light level.

5. The apparatus of claim 4, wherein the control circuit is further configured to:
    determine whether the lighting level for the first sub-area is greater than an upper-limit lighting level that is equal to the first target light level plus an offset amount; and
    adjust the first intensity for the first lighting fixture for the first sub-area to reduce the lighting level for the first sub-area below the upper-limit lighting level without reducing the lighting level for the first sub-area below the target light level.

6. The apparatus of claim 4, wherein the control circuit is further configured to:
    after the first and second intensities are determined, control the first lighting fixture to the first intensity and control the second lighting fixture to the second intensity.

7. The apparatus of claim 1, wherein the control circuit is further configured to:
    determine the first and second target light levels from a predefined light profile.

8. The apparatus of claim 7, wherein the predefined light profile is a uniform light profile, and the first and second target light levels are the same.

9. The apparatus of claim 7, wherein the predefined light profile is a gradient profile, and the first and second target light levels are different.

10. The apparatus of claim 1, wherein the first sub-area and the second sub-area are adjacent sub-areas.

11. The apparatus of claim 1, wherein the control circuit is configured to determine the lighting level of the first sub-area from the at least one image.

12. The apparatus of claim 1, wherein the apparatus comprises a communication circuit, and where in the control circuit is configured to receive at least one message that includes the lighting level for the first sub-area and the lighting level from the second sub-area from another device, and wherein the lighting level for the first sub-area and the lighting level for the second sub-area are each determined from the lighting levels in the at least one message.

13. The apparatus of claim 1, wherein the control circuit is configured to determine the lighting level for the first sub-area and the lighting level for the second sub-area from the at least one image of the space.

14. An apparatus comprising:
 a control circuit configured to:
  determine a lighting level for a first sub-area within a space based on image data of the space;
  determine a lighting level for a second sub-area within the space based on the image data; and
  adjust a first lighting fixture and a second lighting fixture to achieve a uniform lighting level across the first sub-area and the second sub-area, wherein the adjustment of the second lighting fixture is in response to an amount that the first lighting fixture affects the lighting level for the second sub-area when the first lighting fixture is adjusted.

15. The apparatus of claim 14, wherein the control circuit is further configured to:
 determine, during a configuration procedure prior to an operation for performing load control, a light contribution for the first lighting fixture that affects the lighting level for the first sub-area based on the image data and a light contribution for the first lighting fixture and the second lighting fixture that affects the lighting level for the second sub-area based on the image data.

16. The apparatus of claim 15, wherein the control circuit is further configured to:
 determine that the first lighting fixture has a highest light contribution on the first sub-area; and
 determine that the second lighting fixture has a highest light contribution on the second sub-area.

17. The apparatus of claim 14, wherein the control circuit is further configured to:
 determine a first intensity to which to control the first lighting fixture to control the lighting level of the first sub-area to be greater than or equal to the uniform lighting level; and
 determine a second intensity to which to control the second lighting fixture to control the lighting level of the second sub-area to be greater than or equal to the uniform lighting level.

18. The apparatus of claim 17, wherein the control circuit is further configured to:
 determine whether the lighting level for the first sub-area is greater than an upper-limit lighting level that is equal to the uniform lighting level plus an offset amount; and
 adjust the first intensity for the first lighting fixture for the first sub-area to reduce the lighting level for the first sub-area below the upper-limit lighting level without reducing the lighting level for the first sub-area below the uniform lighting level.

19. The apparatus of claim 17, wherein the control circuit is further configured to:
 after the first and second intensities are determined, control the first lighting fixture to the first intensity and the second lighting fixture to the second intensity.

20. The apparatus of claim 14, wherein the first sub-area and the second sub-area are adjacent sub-areas.

\* \* \* \* \*